(12) United States Patent
Bachelder et al.

(10) Patent No.: US 10,599,902 B2
(45) Date of Patent: Mar. 24, 2020

(54) METHODS AND APPARATUS FOR DECODING UNDER-RESOLVED SYMBOLS

(71) Applicant: Cognex Corporation, Natick, MA (US)

(72) Inventors: Ivan Bachelder, Hillsborough, NC (US); James A. Negro, Arlington, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/198,203

(22) Filed: Nov. 21, 2018

(65) Prior Publication Data

US 2019/0108379 A1    Apr. 11, 2019

Related U.S. Application Data

(63) Continuation-in-part of application No. 16/043,029, filed on Jul. 23, 2018, which is a continuation of application No. 15/470,470, filed on Mar. 27, 2017, now Pat. No. 10,032,058, which is a continuation of application No. 14/510,710, filed on Oct. 9, 2014, now Pat. No. 9,607,200.

(51) Int. Cl.
   *G06K 7/14*   (2006.01)

(52) U.S. Cl.
   CPC ......... *G06K 7/1452* (2013.01); *G06K 7/1413* (2013.01); *G06K 7/1439* (2013.01)

(58) Field of Classification Search
   CPC ... G06K 7/1452; G06K 7/1413; G06K 7/1439
   USPC .................................................. 235/462.16
   See application file for complete search history.

(56) References Cited

U.S. PATENT DOCUMENTS

| 5,329,105 A * | 7/1994 | Klancnik ............ G06K 7/1092 235/462.16 |
| 5,398,770 A | 3/1995 | Harden |
| | (Continued) | |

FOREIGN PATENT DOCUMENTS

CN         103339641 A    10/2013

OTHER PUBLICATIONS

Chinese Office Action dated Dec. 18, 2017 in connection with Chinese Application No. 201510670047.3 and English translation thereof.

(Continued)

*Primary Examiner* — Daniel A Hess
(74) *Attorney, Agent, or Firm* — Wolf, Greenfield & Sacks, P.C.

(57) ABSTRACT

The techniques described herein relate to methods, apparatus, and computer readable media configured to decode a symbol in a digital image. A digital image of a portion of a symbol is received, which includes a grid of pixels and the symbol includes a grid of modules. A spatial mapping is determined between a contiguous subset of modules in the grid of modules to the grid of pixels. Causal relationships are determined, using the spatial mapping, between each module and the grid of pixels. A set of valid combinations of values of neighboring modules in the contiguous subset of modules are tested against the grid of pixels using the causal relationships. A value of at least one module of the two or more neighboring modules is determined based on the tested set of valid combinations. The symbol is decoded based on the determined value of the at least one module.

17 Claims, 39 Drawing Sheets

(56) References Cited

U.S. PATENT DOCUMENTS

| | | | |
|---|---|---|---|
| 5,478,999 A * | 12/1995 | Figarella | G06K 7/1093 |
| | | | 235/462.16 |
| 5,486,689 A | 1/1996 | Ackley | |
| 5,514,858 A | 5/1996 | Ackley | |
| 5,539,191 A | 7/1996 | Ackley | |
| 6,102,292 A | 8/2000 | Zocca et al. | |
| 6,681,029 B1 * | 1/2004 | Rhoads | G06K 7/14 |
| | | | 382/100 |
| 6,944,298 B1 * | 9/2005 | Rhoads | G06Q 20/341 |
| | | | 380/205 |
| 9,036,929 B2 | 5/2015 | Nunnink et al. | |
| 9,607,200 B2 | 3/2017 | Bachelder et al. | |
| 10,032,058 B2 | 7/2018 | Bachelder et al. | |
| 2003/0066891 A1 | 4/2003 | Madej et al. | |
| 2006/0266836 A1 | 11/2006 | Bilcu et al. | |
| 2014/0097246 A1 * | 4/2014 | Hu | G06K 19/06037 |
| | | | 235/437 |
| 2016/0104022 A1 | 4/2016 | Bachelder et al. | |
| 2017/0372107 A1 | 12/2017 | Bachelder et al. | |

OTHER PUBLICATIONS

Bailey, Super-resolution of bar codes. Journal of Electronic Imaging. 2001;10(1):213-20.

Esedoglu, Blind Deconvolution of Bar Code Signals. Inverse Problems. 2004;20(1):1-19.

Gallo et al., Reading 1D Barcodes with Mobile Phones Using Deformable Templates. IEEE Transactions on Pattern Analysis and Machine Intelligence. Sep. 2011;33(9):1-10.

U.S. Appl. No. 14/510,710, filed Oct. 9, 2014, Bachelder et al.

U.S. Appl. No. 15/470,470, filed Mar. 27, 2017, Bachelder et al.

U.S. Appl. No. 16/043,029, filed Jul. 23, 2018, Bachelder et al.

* cited by examiner

102A
152    154
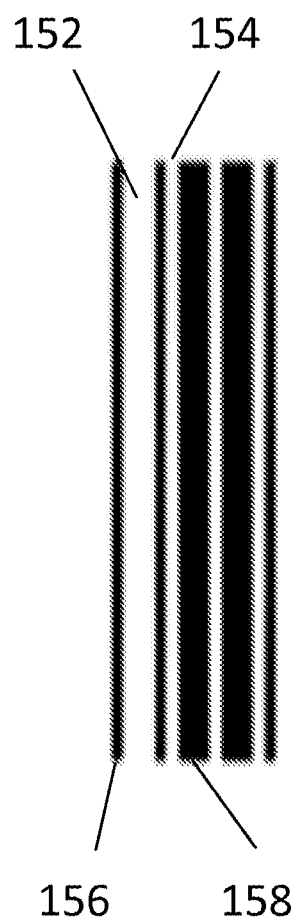
156    158
FIG. 1B
(Prior Art)

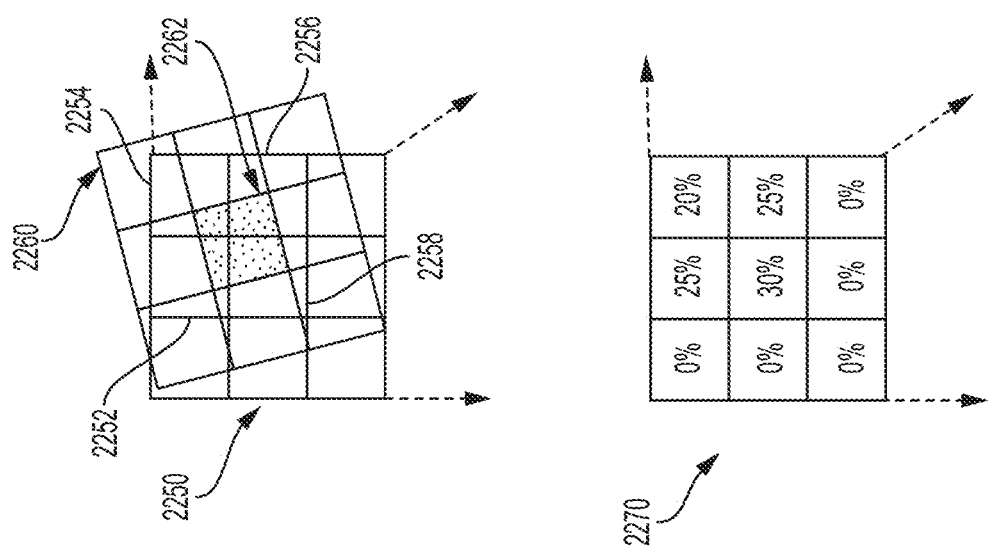

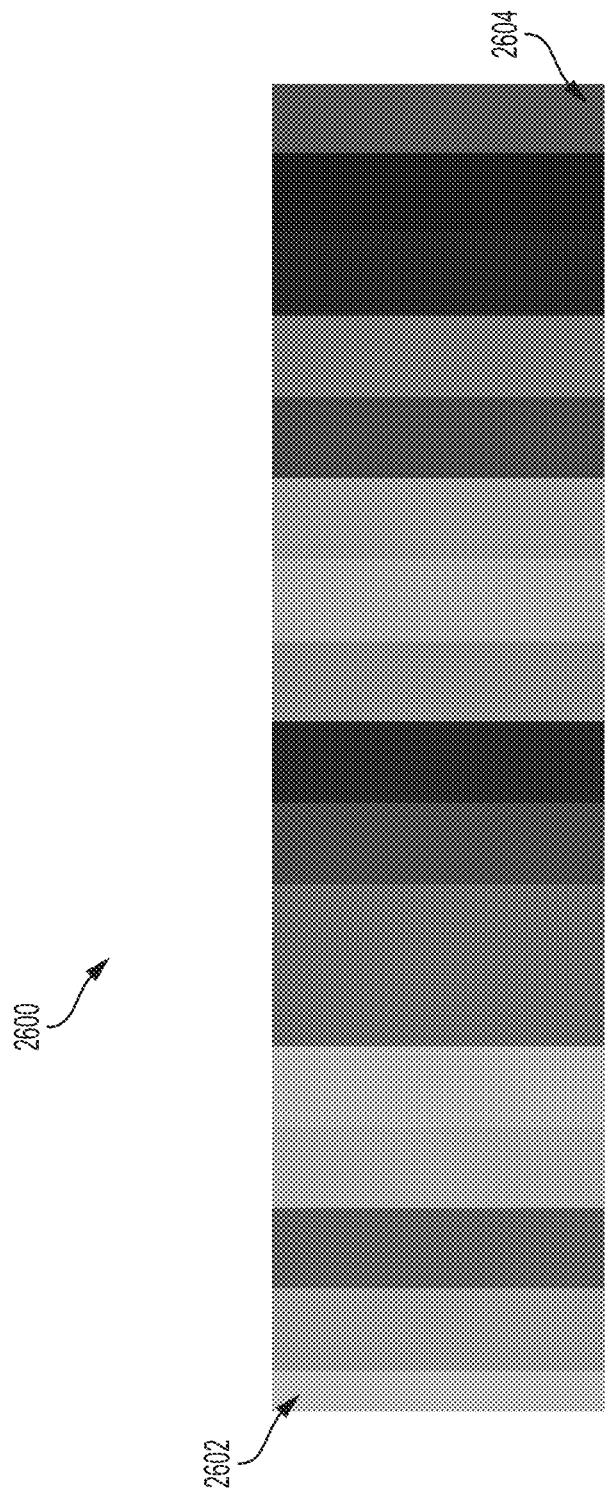

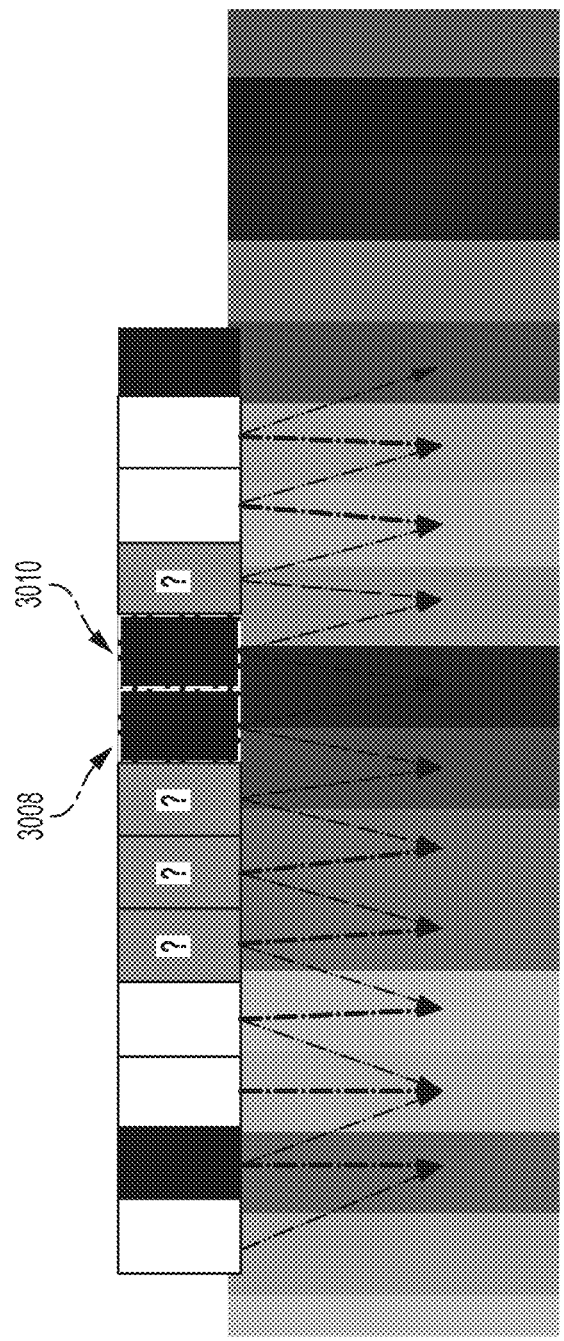

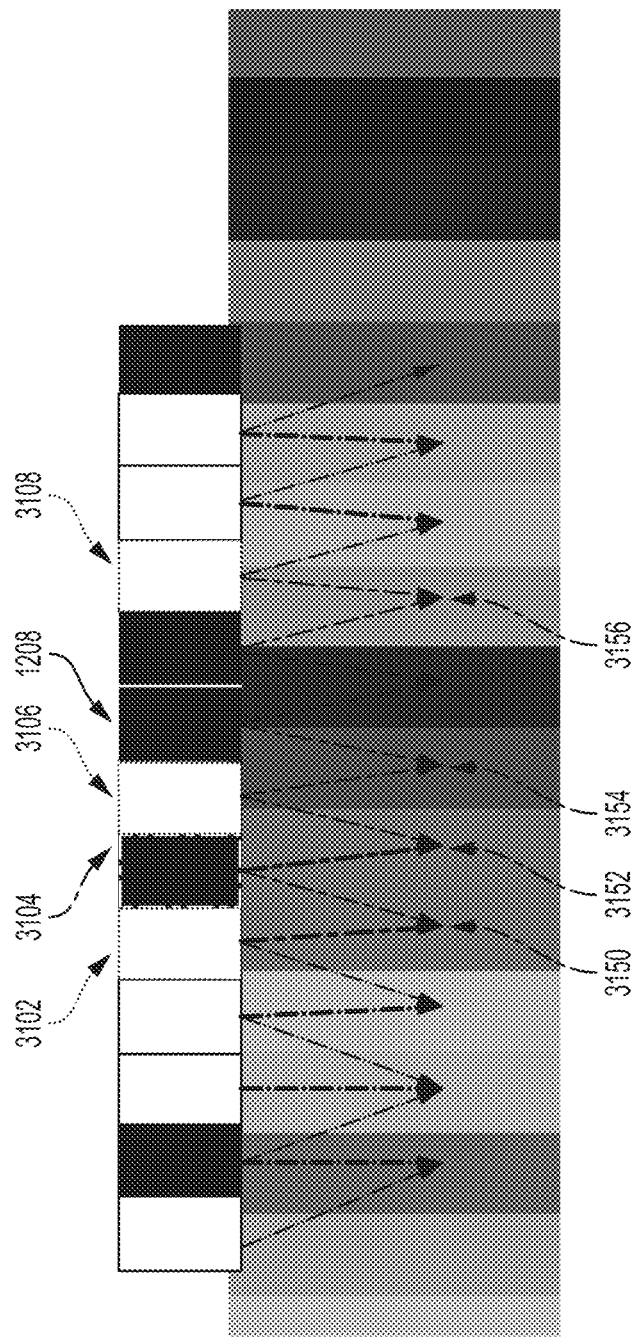

METHODS AND APPARATUS FOR DECODING UNDER-RESOLVED SYMBOLS

RELATED APPLICATIONS

This application is a continuation-in-part claiming the benefit under 35 U.S.C. § 120 of U.S. patent application Ser. No. 16/043,029, entitled "DECODING BARCODES" and filed on Jul. 23, 2018, which is a continuation claiming the benefit under 35 U.S.C. § 120 of Ser. No. 15/470,470, entitled "DECODING BARCODES" and filed on Mar. 27, 2017 (now issued as U.S. Pat. No. 10,032,058), which is a continuation claiming the benefit under 35 U.S.C. § 120 of U.S. patent application Ser. No. 14/510,710, entitled "DECODING BARCODES" and filed on Oct. 9, 2014 (now issued as U.S. Pat. No. 9,607,200), which is hereby incorporated herein by reference in its entirety.

TECHNICAL FIELD

The techniques described herein relate generally to decoding under-resolved two-dimensional symbols, such as two-dimensional barcodes.

BACKGROUND OF INVENTION

Various types of symbols can be used to encode information for various purposes, such as automated part identification. A barcode is a type of symbol that encodes information using a binary spatial pattern that is typically rectangular. A one-dimensional barcode encodes the information with one or more spatially contiguous sequences of alternating parallel bars and spaces (e.g., elements) of varying width. For certain types of one-dimensional barcodes (e.g., often called multi-width barcodes), the width of each element is an integer multiple of modules. A two-dimensional barcode typically encodes information as a uniform grid of module elements, each of which can be black or white.

Typically, barcodes are created by printing (e.g., with ink) or marking (e.g., by etching) bar or module elements upon a uniform reflectance substrate (e.g. paper or metal). The bars or dark modules typically have a lower reflectance than the substrate, and therefore appear darker than the spaces between them (e.g., as when a barcode is printed on white paper using black ink). But barcodes can be printed in other manners, such as when a barcode is printed on a black object using white paint. To differentiate a barcode more readily from the background, the symbol is typically placed relatively distant from other printing or visible structures. Such distance creates a space, often referred to as a quiet zone, both prior to the first bar and after the last bar (e.g., in the case of a one-dimensional barcode), or around the grid of module elements (e.g., in the case of a two-dimensional barcode). Alternatively, the spaces and quiet zones can be printed or marked, and the bars are implicitly formed by the substrate.

However, readers often have difficulty decoding barcodes that are under-resolved, such as barcodes that are under-sampled (e.g., due to low sampling rates or low resolution sensors) and/or blurred (e.g., due to poor focus of the reader, or the effects of motion).

SUMMARY OF INVENTION

In accordance with the disclosed subject matter, apparatus, systems, and methods are provided for decoding under-resolved symbols, such as one-dimensional (1D) multi-width symbols and two-dimensional (2D) symbols. The inventors have recognized that existing techniques to decode 2D symbols cannot sufficiently decode under-resolved 2D symbols. Additionally, the inventors have recognized that existing techniques used to decode under-resolved 1D symbols cannot be simply extended to decode under-resolved 2D symbols (e.g., due to the exponentially larger possible solution set for a 2D symbol compared to a portion such as a character of a 1D symbol), or to decode large portions multi-width 1D symbols without splitting into separate characters. The inventors have developed alternative techniques that determine an initial set of modules of a multi-width 1D or 2D symbol based on known aspects of the symbol and/or a mathematical relationship determined between the modules of the module grid and the pixels in the pixel grid of the image. The initially determined set of modules is leveraged to determine a sufficient number of remaining module values, such that the system can decode the symbol. In some embodiments, the techniques include first leveraging known aspects of symbols to determine a first set of modules of the symbol, then determining (e.g., in an iterative fashion) a second set of modules of the symbol based on the first set of modules and/or the mathematical relationship between pixels in the image and the modules for the symbol, and then trying valid combinations for only the remaining subset of modules that have not yet been deduced (e.g., leveraging previously determined module values) to determine a third set of modules for the module grid. Such techniques decode a sufficient number of modules for the symbol to allow the system to decode the full symbol.

Some aspects relate to a computerized method for decoding a symbol in a digital image. The method includes: receiving a digital image of a portion of a symbol, the digital image comprising a grid of pixels, and the symbol comprising a grid of modules; determining a spatial mapping between a contiguous subset of modules in the grid of modules to the grid of pixels; determining, using the spatial mapping, causal relationships between each module in the contiguous subset of modules and the grid of pixels, each causal relationship representing the degree of influence the value of a module has on each of the values of a subset of pixels in the grid of pixels; testing a set of valid combinations of values of two or more neighboring modules in the contiguous subset of modules against the grid of pixels using the causal relationships; determining a value of at least one module of the two or more neighboring modules based on the tested set of valid combinations; and decoding the symbol based on the determined value of the at least one module.

In some examples, the two or more neighboring modules in the contiguous subset of modules in the grid of modules comprises a three-by-three sub-grid of the grid of modules. At least one module of the two or modules can be a center module of the three-by-three sub-grid.

In some examples, the contiguous subset of modules includes at least one pre-determined module with a known value, and where the set of valid combinations of the values of the two or more neighboring modules includes only those combinations with the known value for the at least one pre-determined module. The pre-determined module can be a module within a finder or timing pattern of the symbol. The known value for the pre-determined module can be deduced based solely upon the value of a single pixel in the grid of pixels, due to the single pixel having a dominant causal relationship with the pre-determined module, as compared to the causal relationships between the other pixels in the subset of pixels and the pre-determined module. Pre-determined modules can include any module with a previously determined value.

In some examples, determining the causal relationships includes identifying using the spatial relationship a degree to which each module in the contiguous subset of modules overlaps each pixel in the grid of pixels to generate a set of degrees of overlap. The degree to which each module in the contiguous subset of modules overlaps with each pixel in the grid of pixels can be represented by a set of sampling coefficients, and as part of a sampling matrix.

In some examples, the grid of pixels and the grid of modules are both two-dimensional.

In some examples, the grid of pixels is a one-dimensional grid of samples from a one-dimensional scan through a two-dimensional image, and the grid of modules is a one-dimensional grid of modules.

In some examples, the symbol is selected from the group consisting of a one dimensional (1D) barcode and a two dimensional (2D) barcode.

Some aspects relate to an apparatus for decoding a symbol in a digital image. The apparatus includes a processor in communication with memory. The processor is configured to execute instructions stored in the memory that cause the processor to: receive a digital image of a portion of a symbol, the digital image comprising a grid of pixels, and the symbol comprising a grid of modules; determine a spatial mapping between a contiguous subset of modules in the grid of modules to the grid of pixels; determine, using the spatial mapping, causal relationships between each module in the contiguous subset of modules and the grid of pixels, each causal relationship representing the degree of influence the value of a module has on each of the values of a subset of pixels in the grid of pixels; test a set of valid combinations of values of two or more neighboring modules in the contiguous subset of modules against the grid of pixels using the causal relationships; determine a value of at least one module of the two or more neighboring modules based on the tested set of valid combinations; and decode the symbol based on the determined value of the at least one module.

In some examples, the two or more neighboring modules in the contiguous subset of modules in the grid of modules comprises a three-by-three sub-grid of the grid of modules.

In some examples, the contiguous subset of modules includes at least one pre-determined module with a known value, and where the set of valid combinations of the values of the two or more neighboring modules includes only those combinations with the known value for the at least one pre-determined module.

In some examples, determining the causal relationships comprises identifying using the spatial relationship a degree to which each module in the contiguous subset of modules overlaps each pixel in the grid of pixels to generate a set of degrees of overlap.

In some examples, the grid of pixels and the grid of modules are both two-dimensional.

In some examples, the grid of pixels is a one-dimensional grid of samples from a one-dimensional scan through a two-dimensional image, and the grid of modules is a one-dimensional grid of modules.

In some examples, the symbol is selected from the group consisting of a one dimensional (1D) barcode and a two dimensional (2D) barcode.

Some embodiments relate to at least one non-transitory computer-readable storage medium. The non-transitory computer readable medium stores processor-executable instructions that, when executed by at least one computer hardware processor, cause the at least one computer hardware processor to perform the acts of: receiving a digital image of a portion of a symbol, the digital image comprising a grid of pixels, and the symbol comprising a grid of modules; determining a spatial mapping between a contiguous subset of modules in the grid of modules to the grid of pixels; determining, using the spatial mapping, causal relationships between each module in the contiguous subset of modules and the grid of pixels, each causal relationship representing the degree of influence the value of a module has on each of the values of a subset of pixels in the grid of pixels; testing a set of valid combinations of values of two or more neighboring modules in the contiguous subset of modules against the grid of pixels using the causal relationships; determining a value of at least one module of the two or more neighboring modules based on the tested set of valid combinations; and decoding the symbol based on the determined value of the at least one module.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 1B illustrates the dimensions of a two-width symbology;

FIG. 22B shows an example of a portion of the sampling matrix that indicates the percentage that pixels in the pixel grid overlap an exemplary module of the module grid, according to some embodiments.

FIG. 26 shows an exemplary image of a multi-width 1D symbol, according to some embodiments.

FIG. 30B shows modules of the exemplary module grid deduced based on relationships between the modules and the pixels, according to some embodiments.

FIG. 31 shows additional modules in the module grid determined based on known modules, according to some embodiments.

DETAILED DESCRIPTION OF INVENTION

Figure 1A:
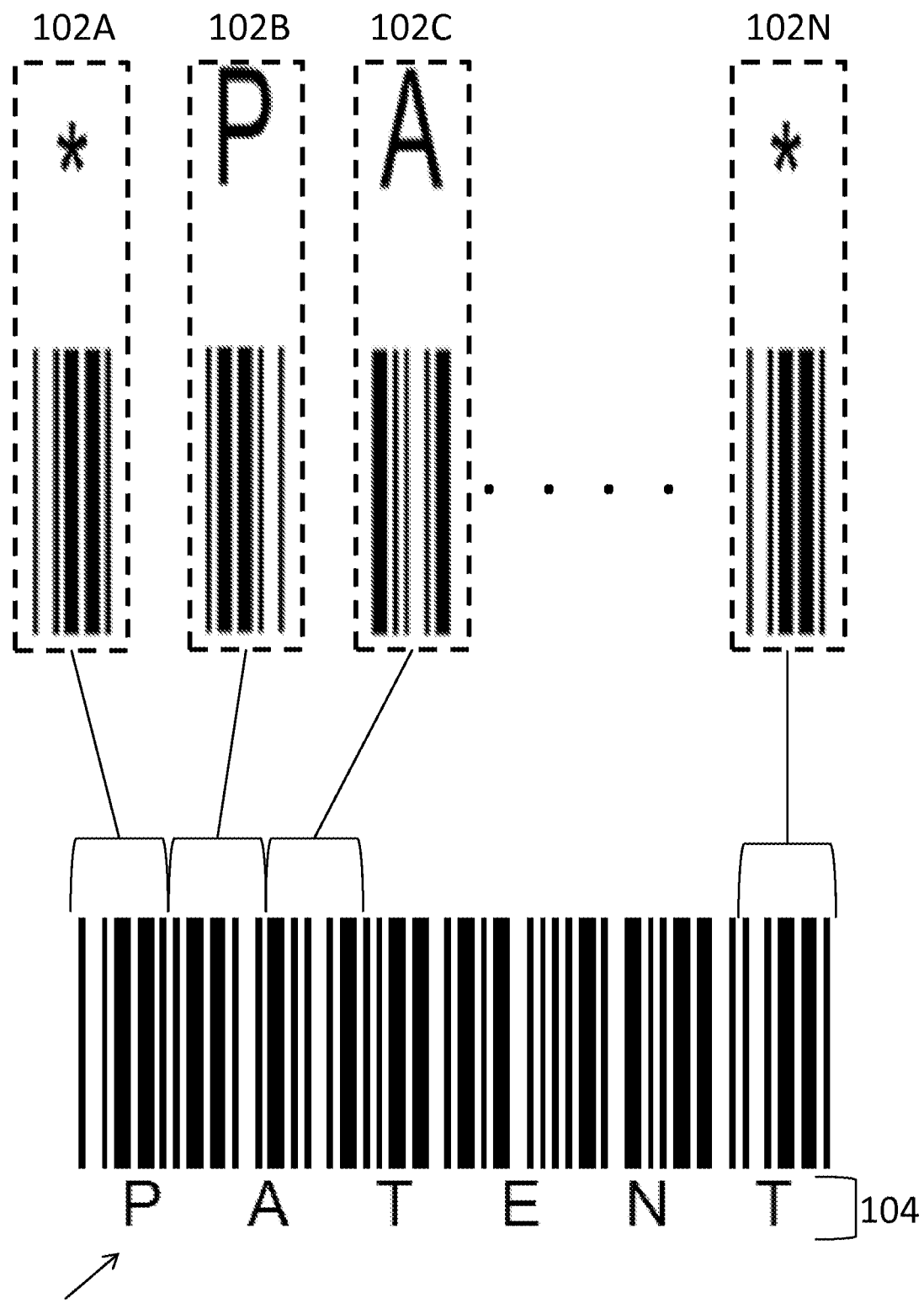
FIG. 1A illustrates a barcode generated using a two-width symbology.

The techniques discussed herein can be used to decode under-resolved symbols (e.g., under-sampled and/or blurry symbols). The inventors have appreciated that 1D and 2D symbol decoding techniques often require certain image resolutions to decode the symbols, such as an image resolution of at least 2 pixels per module (e.g., where a module is a single black or white element of the symbol grid). The inventors have developed techniques, as discussed further herein, that improve symbol decoding technology to decode symbols using lower resolution images. For example, the techniques can be used to decode 1D symbols (e.g., multi-width 1D symbols) and/or 2D symbols captured with resolutions under one pixel per module, such as 0.8 pixels per module, and lower resolutions.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Any one of a number of barcode designs, called symbologies, can be used for a barcode. Each symbology can specify bar, space, and quiet zone dimensional constraints, as well as how exactly information is encoded. Examples of barcode symbologies include Code 128, Code 93, Code 39, Codabar, I2of5, MSI, Code 2 of 5, and UPC-EAN. Barcodes can include traditional "linear" symbologies (e.g., Code 128 and Code 39), where all of the information is encoded along one dimension. Barcodes can also include individual rows of "stacked" 2D symbols (e.g., DataBar, PDF417, MicroPDF, and the 2D components of some composite symbols), all of which essentially allow barcodes to be stacked atop one another to encode more information.

Many barcode symbologies fall into two categories: two-width and multiple-width symbologies. Examples of two-width symbologies include, for example, Code 39, Interleaved 2 of 5, Codabar, MSI, Code 2 of 5, and Pharmacode. Each element of a two-width symbology is either narrow or wide. A narrow element has a width equal to the minimum feature size, X. A wide element has a width equal to the wide element size, W. The wide element size W is typically a fixed real multiple of the minimum feature size. Two-level symbologies thereby allow each element to represent one of two possible values, X or W.

Multiple-width symbologies include, for example, Code 128, Code 93, UPC-EAN, PDF417, MicroPDF, and DataBar. Each element of a multiple-width symbology is an integer multiple, n, of the minimum feature size (e.g., where n is an integer between 1 and the maximum width of an element, which can depend on the symbology). The term module is often used to refer to the minimum feature size of a multi-level barcode, such that each element of a multi-level barcode symbol is made up of an integer number of modules. For many multiple-width symbologies (e.g., such as Code 128, Code 93, and UPC-EAN), n ranges between 1 and 4, but can be much larger (e.g., as with DataBar, where n can range between 1 and 9).

The data for any element sequence in a two- or multiple-width barcode is encoded by a corresponding sequence of quantized element widths. The sequence of element widths for an element sequence is often referred to as the element width pattern of an element sequence. The element width pattern for a two-width element sequence is a binary pattern consisting of narrow ('X') and wide ('W') elements. For example, the element width pattern for a bar (W), space (X) bar (X), space (X), bar (X), space (W), bar (X), space (X) and bar (W), where X is the minimum feature size and W is the wide element width, is represented as WXXXXWXXW. The element width pattern for a multiple-width element sequence is a pattern of integers indicating the width in modules for each corresponding element in the sequence. For example, the element width pattern for a bar (n=1), space (n=1), bar (n=1), space (n=3), bar (n=2), space (n=3) is represented as 111323.

Barcode elements are often grouped into sequential characters (e.g., letters and numbers) that can be decoded from their respective elements into alpha-numeric values. In some embodiments, the data is determined directly from the entire sequence of element widths (e.g., Pharmacode barcodes). The possible characters that can be encoded for any particular symbology is referred to as its character set. Depending on the symbology, there are several different types of characters in a character set, including delimiters and data characters. Typically, there are just a few different possible delimiter character patterns, but a large number of possible data character element width patterns. It is the string of data character values, represented from one end of the barcode to the other, that largely define the encoded string for the entire barcode.

Delimiter characters, sometimes called guard patterns, often occur at the beginning and end of the barcode. Delimiter characters can be used to allow readers to, for example, detect the symbol, determine where to start and stop reading, and/or determine the symbology type. Delimiter characters placed at the beginning and end of the barcode are often called start and stop characters, respectively. Some symbologies (e.g. UPC-A and DataBar) also have delimiter patterns within the symbol, delineating sections of the data characters. Finally, some symbologies (e.g. Code 128) have different start delimiters that determine how to interpret the data characters.

Data characters are the characters that encode the actual information in the barcode. The element width pattern for a data character is associated with an alpha-numeric value. A special data character called the checksum character is often also specified. The value of this character is essentially a sum of the values of all of the other data characters, allowing a reader to detect a misread string. The sequence of alpha-numeric value for all of the data characters form a raw string that is then converted, sometimes using special formatting rules, into the actual encoded set of elements for the barcode.

Regardless of type, each character value of a character set is associated with a unique element width pattern. For example, the element width patterns for an 'A' and 'B' in the Code 39 character set are WXXXXWXXW and XXWXX-WXXW, respectively. As explained above, the element width pattern WXXXXWXXW for 'A' is therefore a bar (W), space (X) bar (X), space (X), bar (X), space (W), bar (X), space (X) and bar (W) where X is the minimum feature size and W is the wide element width. The element width patterns for 'A' and 'B' in the Code 128 character set are 111323 and 131123, respectively.

It is important to note that, for most symbologies, all characters of a particular type have the same physical width in the barcode. For example, characters of two-width symbologies usually have constant numbers of narrow bars, narrow spaces, wide bars, and wide spaces, and typically begin with a bar element. Characters for certain two-width symbologies (e.g. Code39) also end with a bar, and separate individual characters using a special space called an inter-character gap of consistent, but arbitrary width. Such symbologies with inter-character gaps between characters are generally referred to as discrete symbologies, while symbologies without such gaps are referred to as continuous symbologies. In contrast, multiple-width symbology characters often have a fixed number of total modules that are each exactly one module wide, have a fixed number of bars and spaces, and typically begin with a bar and end with a space (and therefore have no inter-character gap).

FIG. 1A illustrates a barcode 100 generated using two-width symbology Code 39. Barcode 100 contains a set of element sequences 102A, 102B, 102C through 102N (collectively referred to herein as element sequence 102). The set of element sequences encode the string PATENT 104. Each letter in the string PATENT 104 is encoded using a data character, such as element sequence 102B that encodes data character P and element sequence 102C that encodes data character A. Element sequences 102A and 102N encode the delimiter character, indicated with *. Therefore element sequences 102A and 102N mark the beginning and the end of the barcode 100. As shown in FIG. 1A, each element sequence 102 has the same physical width in the barcode 100.

FIG. 1B is an enlarged view of element sequence 102A. Element sequence 102A includes element 154, which is a space with the minimum feature size X. Element sequence 102A includes element 152, which is a space with the wide element size W. Element sequence 102A includes element 156, which is a bar with the minimum feature size X. Element sequence 102A includes element 158, which is a bar with the wide element size W.

Figure 2:
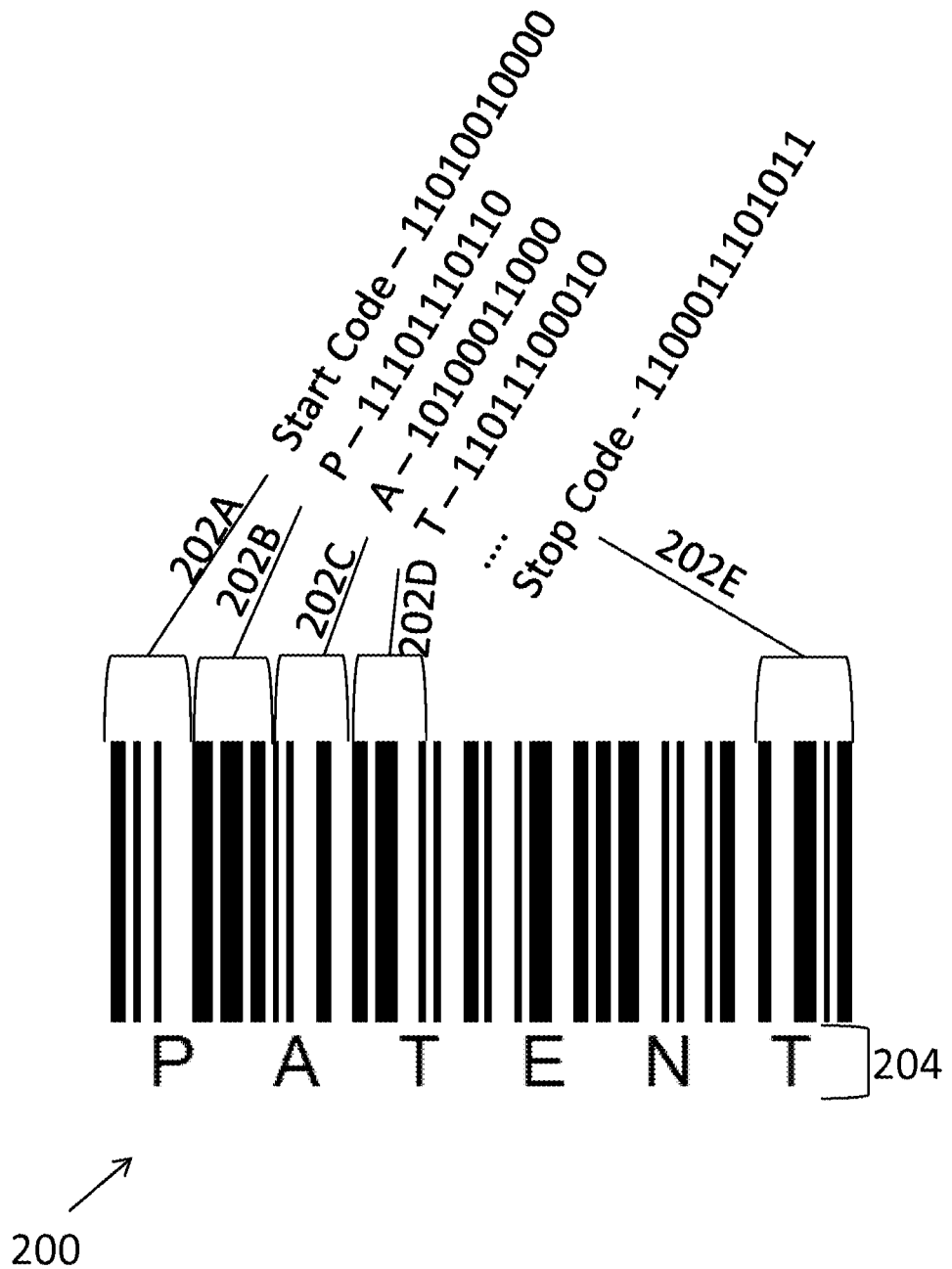
FIG. 2 illustrates a barcode generated using a multiple-width symbology.

FIG. 2 illustrates a barcode 200 generated using multiple-width symbology Code 128. Barcode 200 contains a set of element sequences 202A, 202B, 202C, 202D through 202E (collectively referred to herein as character sequence 202). The set of element sequences encode the string PATENT 204. Like with FIG. 1A, each letter in the string PATENT 204 is encoded using a data character, such as element sequence 202B that encodes data character P and element sequence 202C that encodes data character A. Element sequence 202A encodes the start delimiter sequence for the barcode 200. Element sequence 202E encodes the stop delimiter sequence for the barcode 200. Therefore delimiter element sequences 202A and 202E mark the beginning and the end of the barcode 200.

As shown in FIG. 2, each element sequence 202A-E has the same physical width in the barcode 200. FIG. 2 shows the element width patterns for character sequence 202. The element width pattern for the start delimiter character element sequence 202A is 11010010000. The element width pattern for the P data character element sequence 202B is 11101110110. The element width pattern for the A data character element sequence 202C is 10100011000. The element width pattern for the T data character element sequence 202D is 11011100010. The element width pattern for the stop delimiter character element sequence 202E is 1100011101011.

Barcode readers, which are devices for automatically decoding barcodes, generally fall into two categories: laser scanners or image-based readers. In either type of reader, decoding is typically performed by measuring the one-dimensional (1D) positions of the edges of the barcode elements along one or more scans passing through either the physical barcode, or through a discrete image of the barcode, from one end to the other. Each scan is typically a line segment, but can be any continuous linear contour.

For each barcode reader scan of a barcode, a discrete signal (e.g., often referred to as a scan signal) is first extracted. A scan signal typically consists of sequential sampled intensity measurements along the scan, herein called scan samples. Each scan sample can represent the measured reflectance (relative darkness or lightness, measured by reflected light) over a small area, or scan sample area, of the barcode, centered at the corresponding position along the scan. The pattern of scan sample positions along the scan is referred to here as a scan sampling grid. This grid is often nearly uniform, which means that the distance, or scan sampling pitch, between sample positions along the scan is effectively constant. The scan sampling pitch essentially determines the scan sampling resolution of the sampled signal, typically measured as the number of scan samples per module (where a module as used here is synonymous with the minimum feature size for two-width symbologies). However, it is possible that the effective scan sampling pitch actually changes substantially but continuously from one end of the scan to the other due to perspective effects caused by the barcode being viewed at an angle or being wrapped around an object that is not flat (e.g. a bottle).

The width of the scan sample area for each sample, relative to the scan sample pitch, can govern the amount of overlap between the samples along the scan. An increase in the overlap among samples can increase the blur of the scan signal. A decrease in the overlap among samples can increase the possibility of not measuring important features of the signal. The height of each scan sample area governs how much information is integrated perpendicular to the scan. A larger the height of a scan sample can result in sharper element edges in the signal when the scan is perpendicular to the bars (e.g., so that the scan can take advantage of the redundant information in the bars in the perpendicular direction). However, as the scan angle increases relative to the bar so that it is no longer perpendicular to the bar, the more blurred these edges may become.

For laser scanners, a scan signal is extracted by sampling over time the reflected intensity of the laser as it sweeps along the scan contour through the physical barcode (e.g., as the laser sweeps along a line through the barcode). Each sample area is essentially the laser "spot" at an instant in time. The shape of the laser spot is typically elliptical, with major axis oriented perpendicular to the scan, which can afford the sample area width and height tradeoffs mentioned previously. Since the signal being sampled is analog, the sampling rate over time can govern the resolution, or sampling pitch. The sampling rate over time for a laser may be limited, for example, by the resolving power of the laser (e.g., how well the small spot of the laser can be focused), the maximum temporal sampling rate, and/or the print quality of the barcode.

For image-based readers, a discrete image of the barcode is acquired, such as by using camera optics and an imaging sensor (e.g., a CCD array). The resulting image can be a 2D sampling of the entire barcode. Each image sample, or pixel, of that image is itself a measurement of the average reflectance of a small area of the barcode centered at the corresponding point in an image sampling grid. This grid is often uniform or nearly uniform, which means that the distance between image sample positions, or image sampling pitch, is constant. This sampling pitch essentially determines the image resolution, typically measured as the number of pixels per module ("PPM"). However, as with laser scanning, it is possible that the effective image sampling pitch actually changes substantially but continuously from one end of the barcode to the other due to perspective effects.

A scan signal can then be extracted for any scan over an image of the barcode by sub-sampling the image (e.g., sampling the already sampled signal) along the scan. The scan sampling pitch is determined by the sampling rate over space (e.g., not time, as with laser scanners). One of skill in the art can appreciate that there are many ways to perform this sub-sampling operation. For example, the image processing technique projection can be used for a scan line segment. For projection, the height of the projection essentially determines height of the scan sample area for each sample, integrating information perpendicular to the scan. As another example, the technique described in U.S. patent application Ser. No. 13/336,275, entitled "Methods and Apparatus for One-Dimensional Signal Extraction," filed Dec. 23, 2011, can be used, which is hereby incorporated by reference herein in its entirety. For example, the effective scan sample area for each scan sample can be elliptical, analogous to the elliptical spot size used in laser-scanners.

Figure 3:
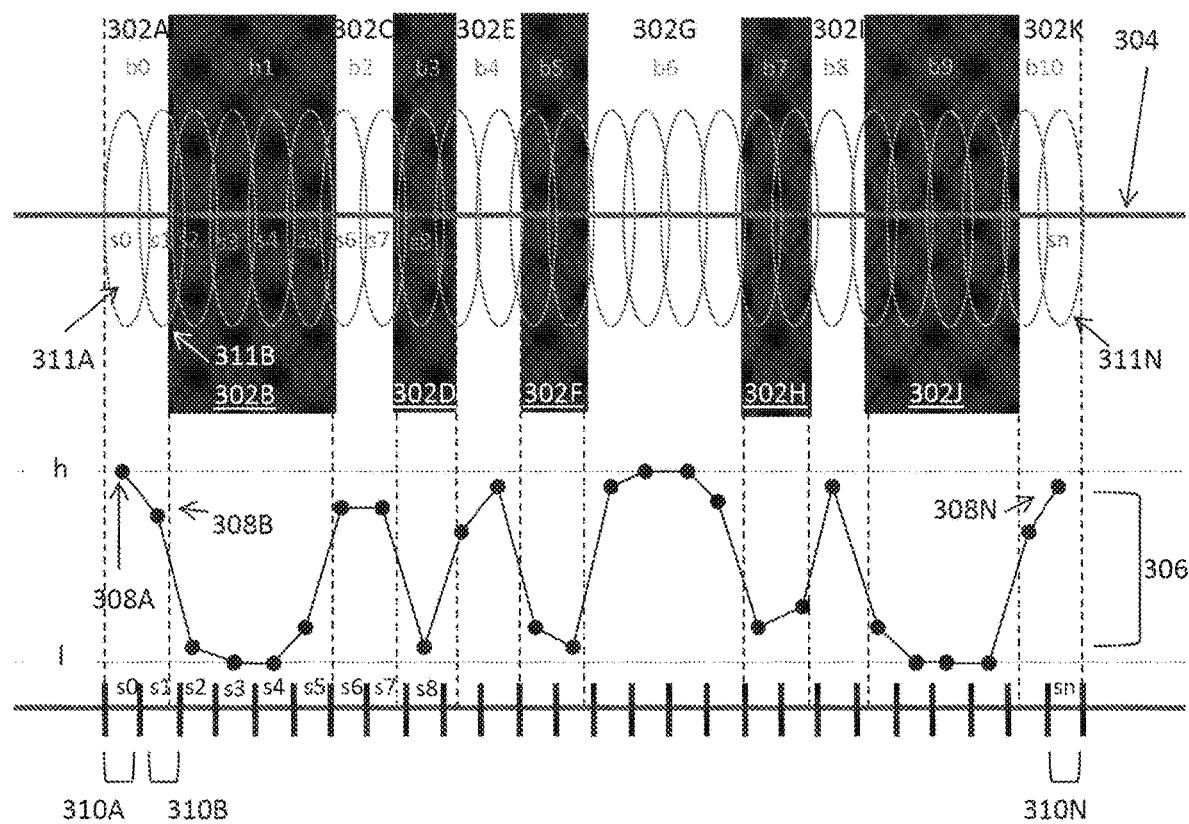
FIG. 3 illustrates an exemplary scan signal.

FIG. 3 illustrates an exemplary scan signal for an element sequence 302, which consists of barcode elements 302A-302K, collectively bar code elements 302. The scan 304 is perpendicular to the barcode elements 302. FIG. 3 shows the scan signal 306 derived from the scan 304. The scan signal 306 includes scan samples 308A, 308B through 308N, collectively referred to herein as scan samples 308. Each scan sample 308 represents the measured reflectance over a corresponding elliptical scan sample area s0 311A through sn 311N, within a 1D range along the scanline 304 corresponding to the scan sample bins s0 310A through sn 310N. For example, scan sample 308A represents the measured reflectance over scan sample area 311A, corresponding to scan sample bin 310A, scan sample 308B represents the measured reflectance over scan sample area 311B, corresponding to scan sample bin 310B, and scan sample 308N represents the measured reflectance over scan sample area 311N, corresponding to scan sample bin 310N. The scan sample 308A has a high reflectance indicated as "h" because the sample 310A is extracted by scan sample area 311A, which is entirely within space element 302A. The scan sample 308B has a lower reflectance because the sample area 308B is not entirely within a space element 302A, and is also integrating information from bar element 302B.

An important distinction from laser scanners, however, is that the sampling resolution of a scan signal extracted using an image-based reader is inherently limited by the underlying sampling resolution of the acquired image (e.g., the pixels). That is, there is no way for the sub-sampled scan signal to recover any additional finer detail other than that included in each pixel. As described in U.S. patent application Ser. No. 13/336,275, this limitation is often at its worse when the 1D scan is a line segment that is oriented with the pixel grid (e.g., perfectly horizontal or vertical to the pixel grid of the acquired image). In contrast, the best possible scan sampling pitch may be equal to the underlying image sampling pitch. This limitation can therefore improve with a greater off-axis scan line angle. In some embodiments, the best possible scan sampling pitch of (1/sqrt(2)) times the image sampling pitch can be achieved when the scan is a line segment that is oriented at 45 degrees to the pixel grid, thereby reflecting the greater information often found when barcodes are oriented diagonally. Therefore a general disadvantage of this resolution limitation can often be offset by the ability to cover and analyze a much larger area than would be possible with a laser scanner. Such a resolution limitation nevertheless often needs to be addressed.

Both image-based readers and laser scanners often need to contend with problems when a sharp signal (e.g., one that is not blurry) cannot be acquired. Both image-based readers and laser scanners often have limited depth-of-field, which is essentially the distance range from the reader over which the acquired image or laser scan signal will be in focus. In addition to depth-of-field limitations, image-based readers can be blurry. Blur refers to the amount by which a 1D scan signal is smeared due to lack of focus or other effects. For example, a 1D scan signal may be blurry due to the process by which it is extracted from a low-resolution image. As another example, blur can be caused by motion depending on the speed of the objects on which the barcodes are affixed, relative to the exposure time necessary to obtain images with reasonable contrast under the available lighting conditions.

Regardless of reader type or scan signal extraction method, a typical way to decode a barcode is to detect and measure the 1D positions of all of the element edges (also referred to as boundaries) along one or more of these scan signals. The position of each detected edge along a scan is a product of their fractional position within the scan signal and the scan sampling pitch. Such edges can be used to directly deduce the widths of the barcode elements, which can then be further classified into their discrete element sizes (e.g. narrow, wide, 1×, 2×, etc., depending on the type of symbology being used). More typically for multiple-width symbologies, however, the successive distances between neighboring edges of the same polarity (light-to-dark or dark-to light-transitions) are computed and classified (e.g., into 1×, 2×, etc.), and then used to deduce the character from its "edge-to-similar-edge" pattern, as known in the art. This indirect computation can be made in order to avoid misclassifications, or misreads) due to pronounced print growth, which is the amount by which bars appear wider and spaces narrower due to the printing process, or vice versa, typically due to ink spread. For two-width symbologies, print growth can be avoided by classifying bars and spaces separately.

Element edges can be detected using a number of different techniques known in the art, including for example discrete methods for locating the positions of maximum first derivative, or zero crossings in the second derivative, and/or wave shaping techniques for locating the boundaries of resolved elements.

However, detecting edges can be complicated by image acquisition noise and printing defects. Image acquisition noise and/or printing defects can cause false edges to be detected, as well as causing issues with low contrast (e.g. due to poor lighting, laser intensity, etc.) or blur (e.g., due to motion or poor focus), which cause certain edges not to be detected at all. Various methods for pre-filtering (e.g. smoothing) or enhancing (e.g., debluring, or sharpening) the signal, filtering out false edges or peaks and valleys, and so on, have been devised in an attempt to increase measurement sensitivity to true edges. However, even employing such methods, as the signal resolution drops, the need for greater measurement sensitivity becomes more difficult to balance against the increasing problem of differentiating false edges from real ones, as does measuring the locations of such edges with the required accuracy.

Adding the ability to combine or integrate decoded character or edge information between multiple scans across the same barcode can help (e.g., when there is localized damage to the barcode). However, even with such integration, image-based decoders that use edge-based techniques often tend to start failing between 1.3 and 1.5 pixels per module (PPM) for the scan line, depending on image quality, focus, and the orientation of the barcode relative to the pixel grid.

Essentially, as the effective resolution of the scan signal decreases, both with scan sampling resolution and blur, it becomes harder to resolve individual elements of the barcode. Narrow elements are particularly difficult to resolve, and at some resolution such narrow elements eventually blend into one another to the point where the transitions between them are completely unapparent. Difficulty in resolving is particularly problematic for an under-sampled signal. For example, as the transition between two elements (e.g., between a bar and a space) moves towards the center of a scan sample (e.g., exactly ½ sample out-of-phase), the scan sample effectively results in a sample value being the average reflectance of both elements rather than a measure of the reflectance of the high or low reflectance of the individual bars and spaces. As an exemplary problematic case, the resolution is nearly 1 sample per module, and multiple narrow elements lined up with successive samples with a half phase shift, such that the scan signal has a uniform reflectance value, with no apparent edges whatsoever.

In addition to the problems of detecting edges and differentiating from noise, the accuracy with which the scan positions of such transitions can be measured can also decrease with both sampling resolution (e.g., due to the fact that each edge transition has fewer samples over which to interpolate the place where the transition occurs) and/or blur (e.g., because the gradual transition along a blurry edge becomes more difficult to measure in the presence of noise). This can result in telling the difference between, for example, a narrow and wide bar becomes impossible from the edges. Techniques have been devised to attempt to handle the inaccuracy due to blur, such as by concentrating on using the locations of edge pairs to locate the centers of each element, which are more stable at least to the effects of blurring, and using the relative positions between these center locations, rather than the distances between the edges, to decode the symbol. However, the centers of measured element edge boundaries are typically only more stable when the apparent edge locations have errors in opposite directions. For example, apparent edge locations may have errors in opposite directions for blurred elements having sufficient resolution (e.g., say, greater than 1.5 PPM), but not necessarily when the signal is under-sampled, where edge errors due to quantization effects are often more predominantly a function of the local phase (relative position) of the scan sampling grid relative to the pixel grid and element boundaries.

In an effort to reduce the resolution limitations, several methods have been devised to attempt to deduce the positions of missing narrow elements after determining the centers and widths of the wide elements. These methods can use constraints on the number of narrow elements between the wide elements, which are different but general for two-width and multiple-width barcodes. Methods have also been devised to attempt to recognize characters from edges, but allow for undetected edges. For example, probabilistic techniques can be employed to decode characters by matching edge-based (geometric) deformable templates. However, such methods are typically devised for blurred barcodes with sufficient sampling resolution, not for under-sampled barcodes. In fact, such techniques may specify that the standard edge-based decoding techniques should be used when the signal is deemed to be in focus. Locating and measuring the widths of even the wide elements, which continue to rely on determining the edges (boundaries), becomes difficult as the SPM decreases, such as below 1.1 samples per module. Furthermore, some of the algorithms cannot be implemented efficiently enough for practical use on industrial readers.

Further compounding these problems are trends towards adopting image-based readers in place of laser scanners (e.g., due to their wide coverage benefits), and towards reducing the cost of image-based reader systems by keeping sizes small and minimizing the number of readers. For example, this is the case in logistics applications, wherein barcodes must be read that are affixed to often randomly oriented boxes or totes on wide conveyor belts. Minimizing the number of readers requires maximizing the amount of volume (e.g., area and depth) that each reader must cover, which in turn reduces both the relative image resolution (PPM) and increases blur (due to depth-of-field limitations), both of which decrease effective image sampling resolution.

There is a need to improve the under-resolved decoding capabilities of barcode readers beyond simply blurred barcodes (e.g., particularly for image-based readers). Additionally, due to the difficulty with edge-based methods at low resolutions (e.g., below 1.1 PPM), there is a need for methods that can decode barcodes by directly analyzing the scan signal values. A technique that attempted to overcome these limitations is to use pattern matching techniques. Some pattern matching techniques attempt to decode a barcode by modeling each character in a barcode as a 1D deformable template. The 1D deformable template is allowed to scale in the horizontal dimension (e.g., to account for an unknown module size), translate in the horizontal direction (e.g., to account for an to an uncertain position along the scan line), stretch in the vertical direction (e.g., to account for unknown contrast), and translate in the vertical direction (e.g., to account for unknown background lighting intensity). However, such pattern matching techniques cannot account for the quantization effects of dramatically under-sampling the barcode, say at 1.0 PPM or below. For example, under-sampling can causes patterns to morph unrecognizably relative to the template.

Barcodes can be considered as being composed of a sequence of barcode units, with each unit having an associated width and binary encoding value. For example, for two-width barcodes, the barcode unit can have one of two widths: narrow, 'X', or wide, 'W.' As another example, for a multiple-width barcode, the barcode unit can have a width that is some multiple, n, of X. The binary encoding value can indicate whether the barcode unit is part of a bar or space. For example, B can be used to indicate the barcode unit is for bar, and S for a space. In some embodiments, numeric values can be used, e.g. B=0 and S=1, or B=−1 and S=1. Therefore each element width pattern can be associated with a unit width pattern and a unit encoding pattern.

In some examples, the barcode units can be elements, in which case a unit width pattern is the element width pattern, and the associated unit encoding pattern is an alternating pattern of bar and space values (e.g., BSBSBSBSB) with the appropriate starting value of either a bar or a space (e.g., since the elements always alternate between bars and spaces, except over an inter-character gap).

In some examples, each barcode unit is chosen to make the unit width pattern uniform. For two-width barcodes, for example, the barcode units may not be made smaller than an element, since a wide element cannot in general be further reduced to an integer number of narrow elements. For multiple-width barcodes, for example, a unit can be as small as a module, since each element width is be denoted by an integer number of module widths. Using module units can result in a uniform unit width pattern of narrow widths. In some embodiments, a particular multiple-width unit width pattern consists of some sequence of uniform modules, and the associated unit encoding pattern consists of bar and space values that together represent the encoded data for that sequence. For example, XXXXXXXXXXX is the unit width pattern for all unit width patterns of length eleven modules, but the unit encoding pattern will vary for each element width pattern. For example, BSBSSSBBSSS is the unique unit encoding pattern for the 11X element width pattern 111323.

In some embodiments, for two-width symbologies the information in the element width pattern is directly encoded by the unit width pattern, with the unit encoding pattern alternating. For example, as described previously the unit encoding pattern is an alternating pattern of bar and space values (e.g., BSBSBSBSB). In some embodiments, for multiple-width symbologies the information in the element width pattern is indirectly encoded by the unit encoding pattern, with the unit width pattern being composed of uniform minimum features. For example, XXXXXXXXXXX is the unit width pattern for all unit width patterns of length eleven modules, so it indirectly encodes the element width pattern because without more information the element width pattern cannot be deduced. But the unit width pattern (e.g., BSBSSSBBSSS for the 11X element width pattern 111323) will include eleven features (e.g., eleven Bs and Ss).

Advantageously, analyzing a two-width symbology or a multiple-width symbology using element units, each unique data character in the symbology can be associated with a unique unit (e.g., element) sequence. The unit encoding pattern can be an alternating binary pattern that is the same size for all characters. Analyzing a multiple-width symbology using module units, each unique data character in the symbology can be associated with a unique unit (e.g., module) pattern, and the unit (e.g., module) sequence can be the same for all characters.

For example, when using module units for the two-width symbology Code39 the unique unit width pattern for an 'A' is its element width pattern WXXXXWXXW, and the unique unit width pattern for a 'B' is its element width pattern XXWXXWXXW. But all Code39 data characters are associated with the same length nine binary unit encoding pattern, BSBSBSBSB. Similarly for Code128, when using element units, the unique unit width pattern for an 'A' is its element width pattern 111323, and the unit width pattern for 'B' is its element width pattern 131123. But all Code128 characters are associated with the same length six binary unit encoding pattern, BSBSBS.

As another example, when using module units for the multiple-width symbology Code128, the unit width pattern for all characters is the same length eleven uniform sequence, XXXXXXXXXXX, but the unique unit encoding pattern for an 'A' is BSBSSSBBSSS (e.g., corresponding to the element width pattern 111323), and the unique unit encoding pattern for a 'B' is BSSSBWBBSSS (e.g., corresponding to the element width pattern 131123).

By representing barcodes and barcode characters as being composed as units, sampling quantization effects can be modeled mathematically. For example, the model can be generated based on:

(1) (a) a contiguous sequence of barcode elements (e.g., without any inter-character gap), and (b) associated quantized widths for each of the barcode elements, expressed as an element width pattern;

(2) the starting position of the first element of the barcode element sequence, in sample coordinates (e.g., in fractional numbers of sample pitches, with the fractional part essentially being the beginning "phase" relative to the sampling grid); and (3) the minimum feature size (X) and wide element width (W), if applicable (or, equivalently, the wide-to-narrow ratio), measured in fractional numbers of samples.

Using such information, the relationship between those barcode elements and the raw signal can be expressed using a single matrix equation, $$A*b=s \qquad \text{Equation 1}$$

Where:

A is a unit sampling coefficients matrix, a sparse matrix of sampling coefficients, that depends on a unit grid, defining the positions of unit boundaries along the scan, comprised of:

The unit sub-sequence that spans the barcode element sequence;

The minimum feature size, X;

The wide element size, W (if applicable);

The starting position of the first barcode element in the sequence;

b is the binary unit encoding pattern of bar and space values; and s is the vector representing normalized scan samples.

Each row of the sampling coefficients matrix A can correspond to a sample, and each column can correspond to a unit (e.g., module for multiple-width barcodes, or element for two-width barcodes). The values in each row can be selected to add to 1.0, and the values of each column can be selected add to the respective unit (e.g., module or element) width (e.g., X or W).

The $i^{th}$ normalized sample for the vector s, s(i), can be given by the following equation:

$$s(i)=B+[(r(i)-l(i))\times(S-B)]/(h(i)-l(i)) \qquad \text{Equation 2}$$

Where:

r is the vector representing a contiguous portion of the scan signal over the sample bins; and h and l are vectors of values representing the discrete approximation to the signal envelope of r, such that:

h(i) is the estimate for the reflectance of a space at sample i; and l(i) is the estimate for the reflectance of a bar at sample i.

The vector r can be assumed to cover the range of positions for the entire unit sub-sequence. In some embodiments, the values of r can be the measured reflectance values. Each row i of A can be a vector of the respective proportions of the barcode units in the unit width pattern that are integrated by the bin for sample i to get a measure of the reflectance for that scan sample. In some embodiments the unit coefficients depend on the unit grid, which can represent the positions of the transitions between the units. The unit grid may be affected by the phase (e.g., starting point), minimum feature size, print growth, wide-to-narrow ratio (if any), and/or the like.

Figure 4:
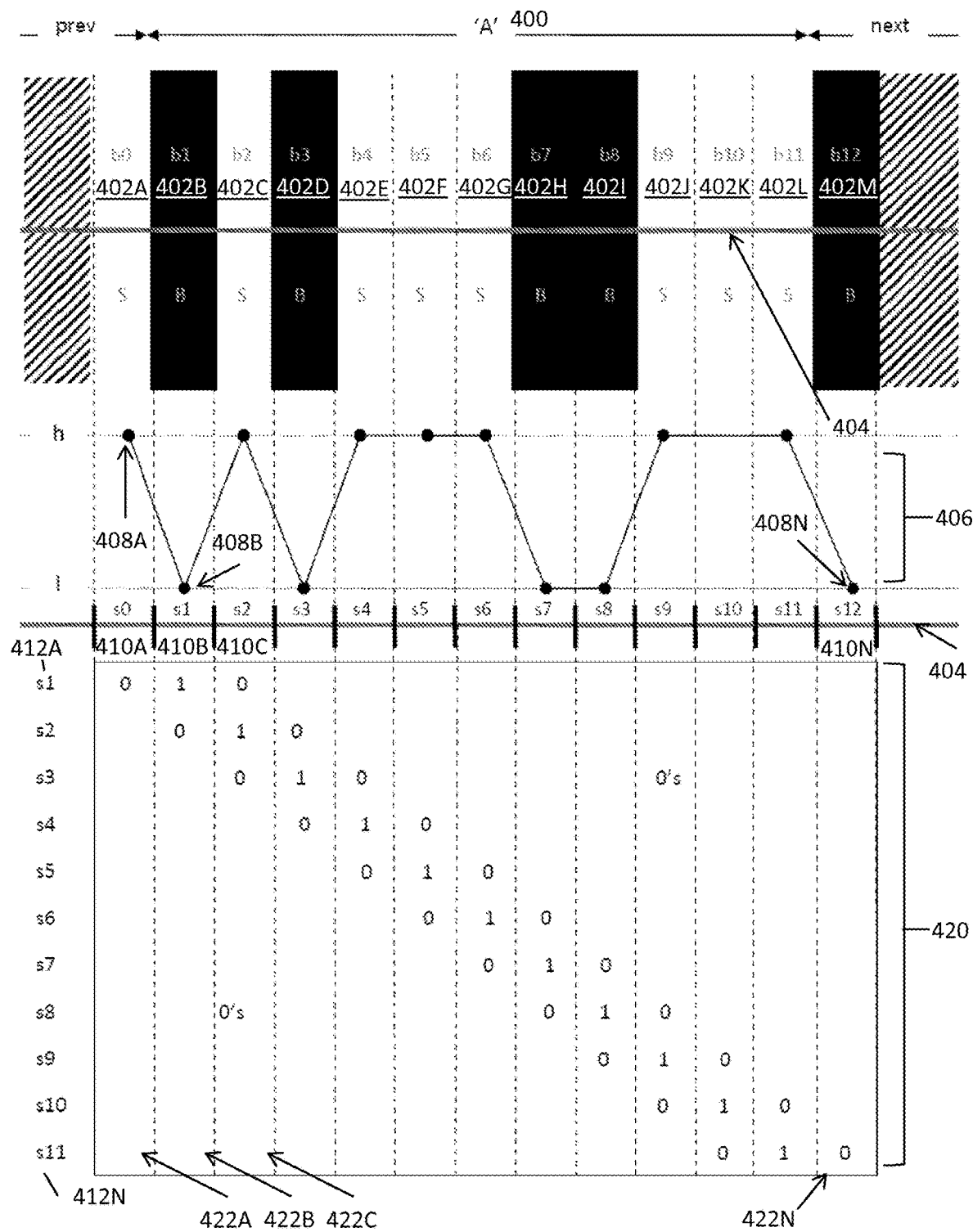
FIG. 4 illustrates an exemplary scanline subsampling and sampling coefficients for a multi-width barcode at 1 SPM and 0 phase for decoding barcodes, in accordance with some embodiments.

FIG. 4 illustrates an exemplary scanline subsampling and sampling coefficients for a multi-width barcode at 1 sample per module ("SPM") and 0 phase for decoding barcodes, in accordance with some embodiments. FIG. 4 shows the A data character modules 400, which consists of barcode modules b1 402B, b2 402C, b3 402D, b4 402E, b5 402F, b6 402G, b7 402H, b8 402I, b9 402J, b10 402K, and b11 402L. The character units 402 include these modules as well as the last module of the previous character b0 402A (a space), and the first module of the previous character b12 402M (a bar).

FIG. 4 shows the scan signal 406 derived from the scan 404. The scan signal 406 includes scan samples 408A, 408B through 408N, collectively referred to herein as scan samples 408. The scan samples 408 represent samples for a corresponding scan sample bins s0 410A, s1 410B through s12 410N, collectively referred to as scan sample bins 410. For example, scan sample 408A represents the scan sample for scan sample bin s0 410A. Because each scan sample bin 410 is aligned with the start of the character units 402, the scan sample bins 410 have zero (0) phase relative to the character units 402. FIG. 4 also shows the unit sampling coefficients matrix 420. Each row of the unit sampling coefficients matrix 420 s1 412A through s11 412N (collectively referred to herein as rows 412) corresponds to a sample, and is a vector of the sampling coefficients for character units in the unit width pattern. Each column 422A through 422N (collectively, columns 422) of the unit sampling coefficients matrix 420 corresponds to a unit (e.g., module). As shown in FIG. 4, the width of each scan sample bin 410 corresponds to the width of a module of the barcode character 400, because the sampling pitch is exactly the module width. The unit sampling coefficients matrix 420 includes zeros at all locations besides those shown including a one (not all zeros are shown for simplicity). Row s1 412A includes a one at column two 422B because scan sample bin s1 410B coincides with the entire module b1 402B, row s2 412B includes a one at column three 422C because scan sample bin s2 410B coincides with the entire module b2 402C, and so on.

Figure 5:
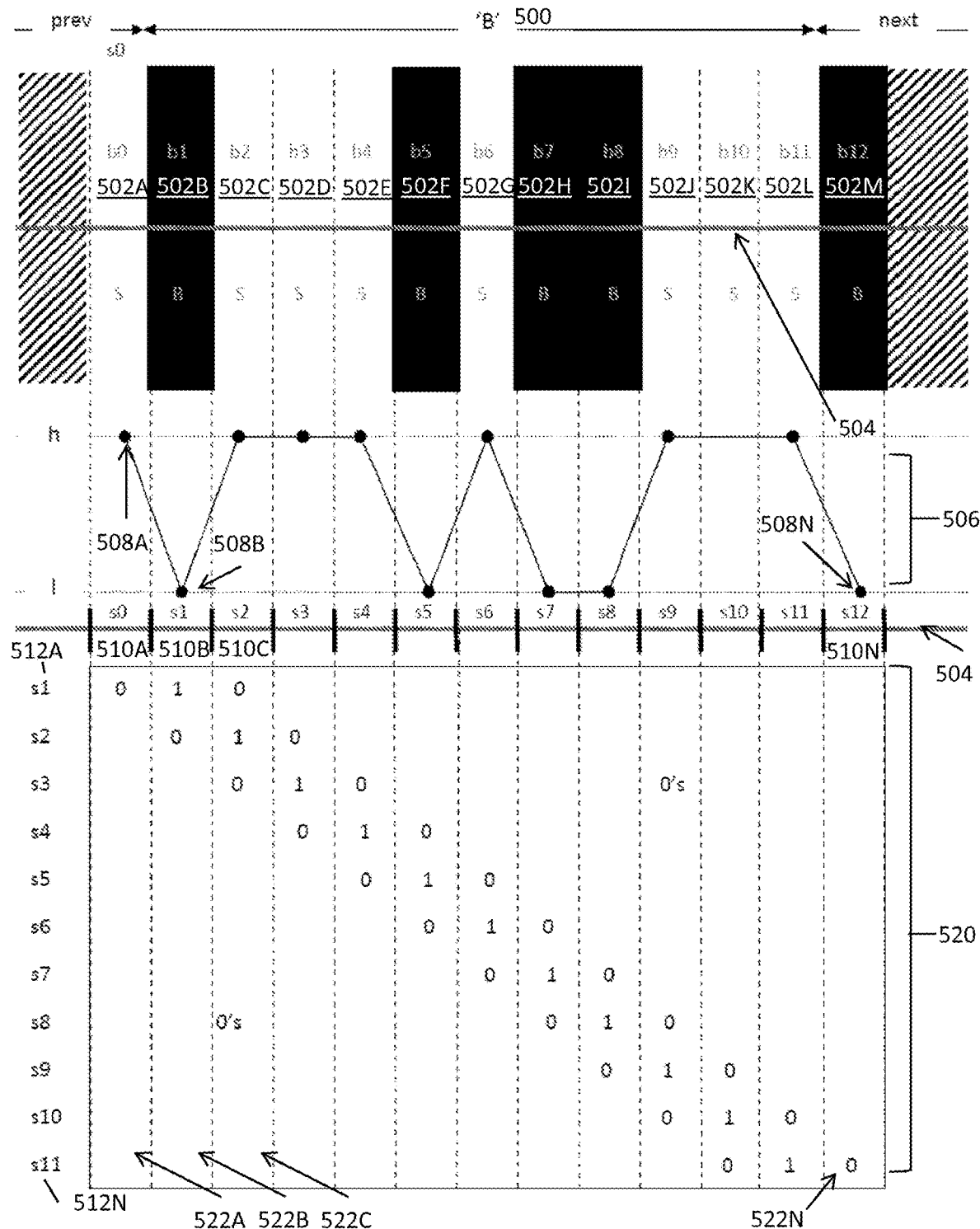
FIG. 5 illustrates an exemplary scanline subsampling and sampling coefficients for a multi-width barcode at 1 SPM and 0 phase for decoding barcodes, in accordance with some embodiments.

FIG. 5 illustrates an exemplary scanline subsampling and sampling coefficients for a multi-width barcode at 1 SPM and 0 phase for decoding barcodes, in accordance with some embodiments. FIG. 5 shows the B data character element sequence 500, which consists of barcode modules b1 502B, b2 502C, b3 502D, b4 502E, b5 502F, b6 502G, b7 502H, b8 502I, b9 502J, b10 502K, and b11 502L. The character units 502 include these modules as well as the last module of the previous character b0 502A (a space), and the first module of the previous character b12 502M (a bar).

FIG. 5 shows the scan signal 506 derived from the scan 504. The scan signal 506 includes scan samples 508A, 508B through 508N, collectively referred to herein as scan samples 508. The scan samples 508 represent samples for a corresponding scan sample bin s0 510A, s1 510B through s12 510N. For example, scan sample 508A represents the scan sample for scan sample bin s0 510A. FIG. 5 also shows the unit sampling coefficients matrix 520. Because each scan sample 510 is aligned with the start of the barcode modules 502, the units 502 have zero (0) phase relative to the scan sample bins 510. Each row of the unit sampling coefficients matrix 520 s1 512A through s11 512N (collectively referred to herein as rows 512) corresponds to a sample, and is a vector of sampling coefficients for the barcode units in the unit width pattern. Each column 522A through 522N of the unit sampling coefficients matrix 520 corresponds to a unit (e.g., module). Like in FIG. 4, the width of each scan sample bin 510 corresponds to the width of a module of the barcode 500. The unit sampling coefficients matrix 520 includes zeros at all locations besides those shown including a one (not all zeros are shown for simplicity). Row s1 512A includes a one in the second column 522B because scan sample bin s1 510B coincides with the entire module for bar b1 502B, row s2 512B includes a one at the third column 522C because scan sample bin s2 510B coincides with the entire module for bar b2 502C, and so on. Note that the resulting unit sampling coefficients matrix 520 is the same as unit sampling coefficients matrix 420 in FIG. 4 because, like with FIG. 4, the units 502 are at zero phase relative to the scan sample bins 510, and the module size is exactly equal to the module size.

Figure 6:
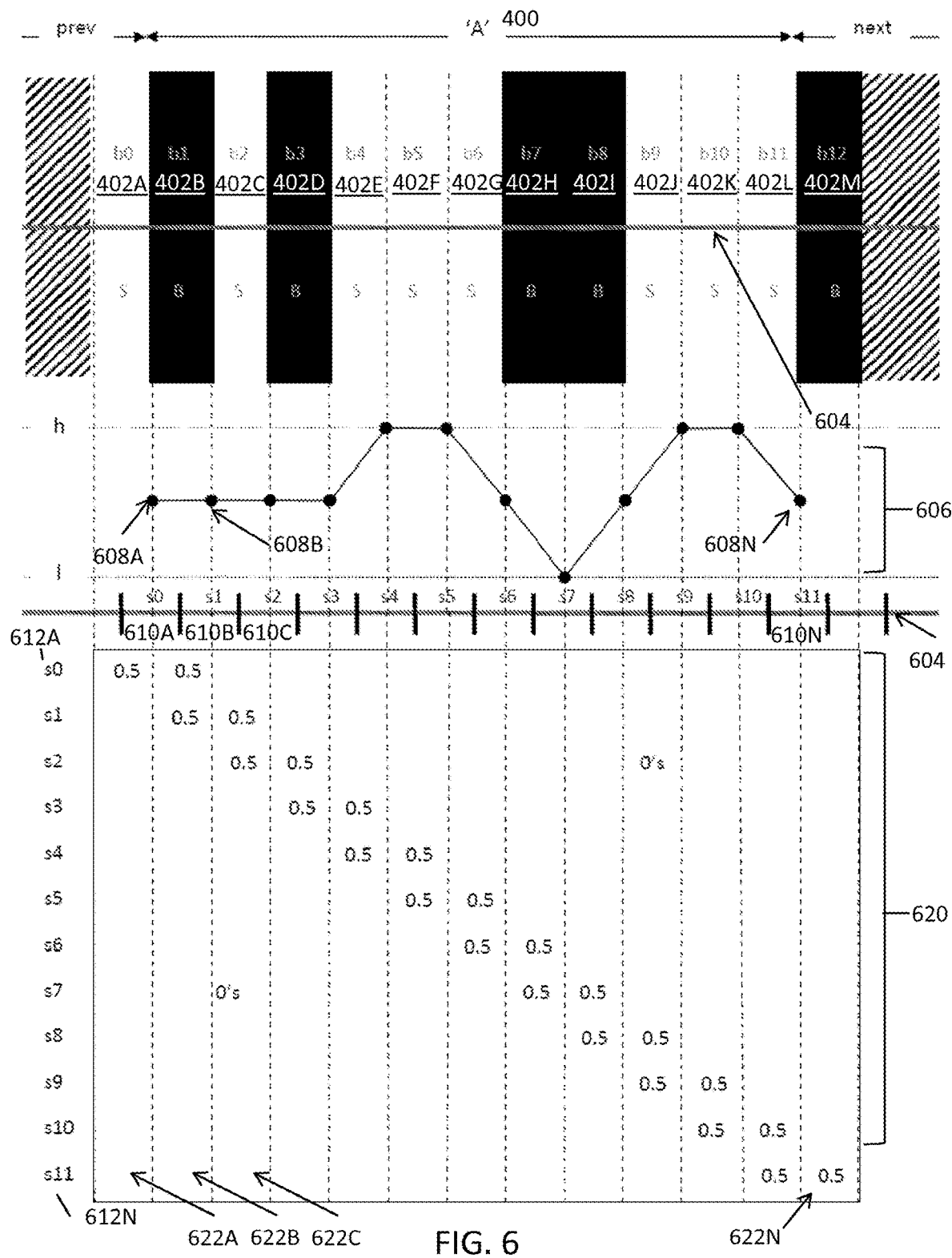
FIG. 6 illustrates an exemplary scanline subsampling and sampling coefficients for a multi-width barcode at 1 SPM and 0.5 phase for decoding barcodes, in accordance with some embodiments.

FIG. 6 illustrates an exemplary scanline subsampling and sampling coefficients for a multi-width barcode at 1 SPM and 0.5 phase for decoding barcodes, in accordance with some embodiments. FIG. 6 shows the A data character module sequence 400 from FIG. 4. FIG. 6 shows the scan signal 606 derived from the scan 604. The scan signal 606 includes scan samples 608A, 608B through 608N, collectively referred to herein as scan samples 608. The scan samples 608 represent samples for a corresponding scan sample bin s0 610A, s1 610B through s11 610N. For example, scan sample 608A represents the scan sample for scan sample bin s0 610A, which is between high and low because half its area is covered by b0 and half of its area is covered by b1. Because each unit 402 is offset with the start of each scan sample bin 610 by half of the width of a scan sampling pitch bin, and because the sampling pitch is exactly equal to the module size, the units 402 are at (0.5) phase relative to the scan sample bins 610.

FIG. 6 also shows the unit sampling coefficients matrix 620. Each row of the unit sampling coefficients matrix 620 s0 612A through s11 612N (collectively referred to herein as rows 612) corresponds to a sample, and is a vector of sampling coefficients for the barcode units in the unit width pattern. Each column 622A through 622N (collectively, columns 622) of the unit sampling coefficients matrix 620 corresponds to a unit (e.g., module). While the width of each scan sample bin 610 is equal to the width of each barcode module, each scan sample bin 610 is half covered by each of two consecutive barcode elements 402. The unit sampling coefficients matrix 620 includes zeros at all locations besides those shown including one half (½) (not all zeros are shown for simplicity). Row s0 612A includes a 0.5 at column one 622A because scan sample bin s0 610A is half covered by bar b0 402A, and includes a 0.5 at column two 622B because scan sample bin s0 610A contains is half covered by bar b1 402B. Row s1 612B includes a 0.5 at column two 622B because scan sample bin s1 610B is half covered by bar b1 402B, and includes a 0.5 at column three 622C because scan sample bin s1 610B is half covered by bar b2 402C.

Figure 7:
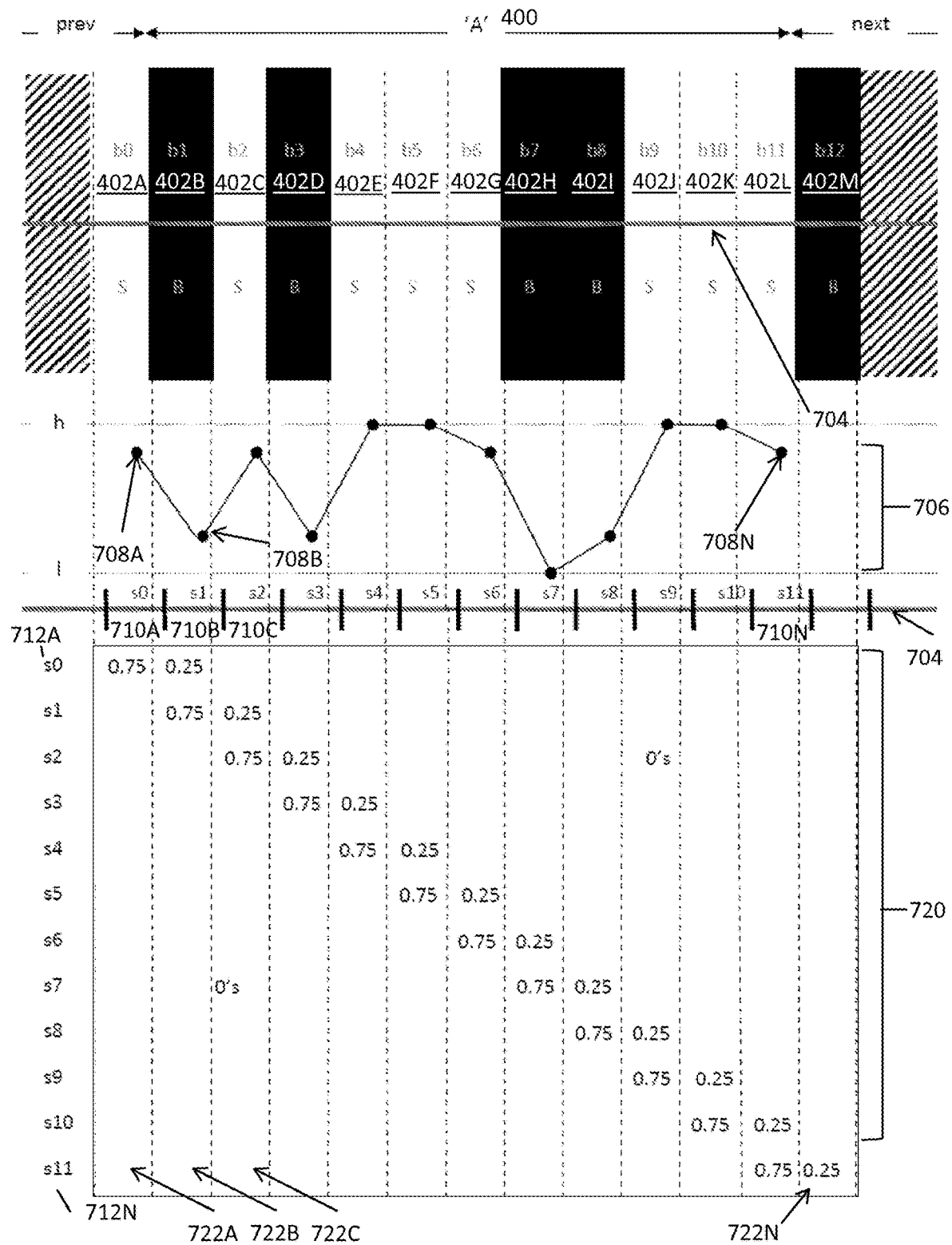
FIG. 7 illustrates an exemplary scanline subsampling and sampling coefficients for a multi-width barcode at 1 SPM and −0.25 phase for decoding barcodes, in accordance with some embodiments.

FIG. 7 illustrates an exemplary scanline subsampling and sampling coefficients for a multi-width barcode at 1 SPM and −0.25 phase for decoding barcodes, in accordance with some embodiments. FIG. 7 shows the A data character element sequence 400 from FIG. 4. FIG. 7 shows the scan signal 706 derived from the scan 704. The scan signal 706 includes scan samples 708A, 708B through 708N, collectively referred to herein as scan samples 708. The scan samples 708 represent samples for a corresponding scan sample bin s0 710A, s1 710B through s11 710N. For example, scan sample 708A represents the scan sample for scan sample bin s0 710A, which is three-quarters of the way towards high from low because scan sample bin s0 is covered 0.75% by module b0 having a reflectance of h and 0.25% by module b1 having a reflectance of 1. Because each unit 402 is offset backwards from the start of each scan sampling bin 410 by one quarter of the width of a module, the units 402 are at (−0.25) phase relative to the scan sample bins 710.

FIG. 7 also shows the unit sampling coefficients matrix 720. Each row of the unit sampling coefficients matrix 720 s0 712A through s11 712N (collectively referred to herein as rows 712) corresponds to a sample, and is a vector of the sampling coefficients for the barcode units in the unit width pattern. Each column 722A through 722N (collectively, columns 722) of the unit sampling coefficients matrix 720 corresponds to a unit (e.g., module). While the width of each scan sample bin 710 is equal to the width of each barcode module, each scan sample bin 710 is 0.75% covered and 0.25% covered by two consecutive barcode units 402, respectively, due to the −0.25 phase. The unit sampling coefficients matrix 720 includes zeros at all locations besides those shown including non-zero values (not all zeros are shown for simplicity). Row s0 712A includes a 0.75 in the first column 722A because scan sample bin s0 710A is covered ¾ by module b0 402A, and includes a 0.25 in the second column 722B because scan sample bin s0 710A is covered ¼ by module b1 402B. Row s1 712B includes a 0.75 in the second column 722B because scan sample bin s1 710B is covered ¾ by module b1 402B, and includes a 0.25 in the third column 722C because scan sample bin s1 710B is covered ¼ by module b2 402C.

Figure 8:
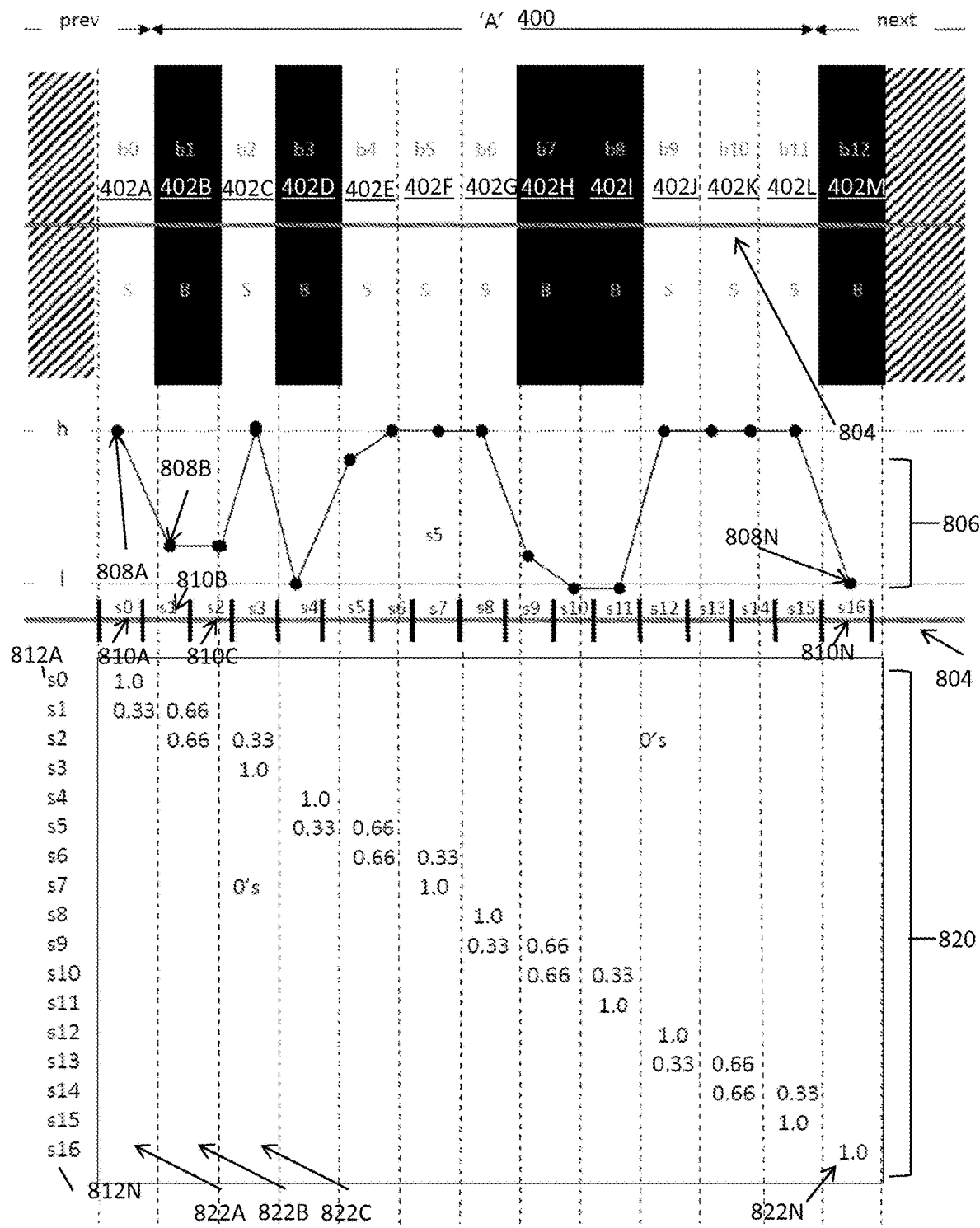
FIG. 8 illustrates an exemplary scanline subsampling and sampling coefficients percentages for a multi-width barcode at 1.33 SPM and 0.33 phase for decoding barcodes, in accordance with some embodiments.

FIG. 8 illustrates an exemplary scanline subsampling and sampling coefficients for a multi-width barcode at 1.33 SPM and ⅓ phase for decoding barcodes, in accordance with some embodiments. FIG. 8 shows the A data character module sequence 400 from FIG. 4. FIG. 8 shows the scan signal 806 derived from the scan 804. The scan signal 806 includes scan samples 808A, 808B through 808N, collectively referred to herein as scan samples 808. The scan samples 808 represent samples for a corresponding scan sample bin s0 810A, s1 810B through s16 810N. For example, scan sample 808A represents the scan sample for scan sample bin s0 810A, which is a high value because scan sample bin s0 is covered entirely by b0. As another example, scan sample 808B represents the scan sample for scan sample bin s1 810B, which is ⅔ of the way to low from high because scan sample bin s1 is covered ⅓ by the reflectance of b0 and ⅔ by the reflectance of b1. Because unit 402B (the beginning of the character modules) starts to the right of s1 810B, the units 402 are at one third (⅓) phase relative to the scan sample bins 810.

FIG. 8 also shows the unit sampling coefficients matrix 820. Each row of the unit sampling coefficients matrix 820 s0 812A through s16 812N (collectively referred to herein as rows 812) corresponds to a scan sample, and is a vector of the sampling coefficients of barcode units in the unit width pattern. Each column 822A through 822N (collectively, columns 822) of the unit sampling coefficients matrix 820 corresponds to a unit (e.g., module). The width of each scan sample bin 810 is equal to ⅔ of a barcode module due to the 1.33 SPM. The unit sampling coefficients matrix 820 includes zeros at all locations besides those shown including non-zero values (not all zeros are shown for simplicity). For example, row s0 812A includes a 1.0 in the first column 822A because scan sample bin s0 810A is covered entirely by module b0 402A (and no portion of any other module). Row s1 812B includes a 0.33 in the first column 822A because scan sample bin s1 810B is covered ⅓ by unit b0 402A, and includes a 0.66 in the second column 822B because scan sample bin s1 810B is covered ⅔ by module b2 402C.

Figure 9:
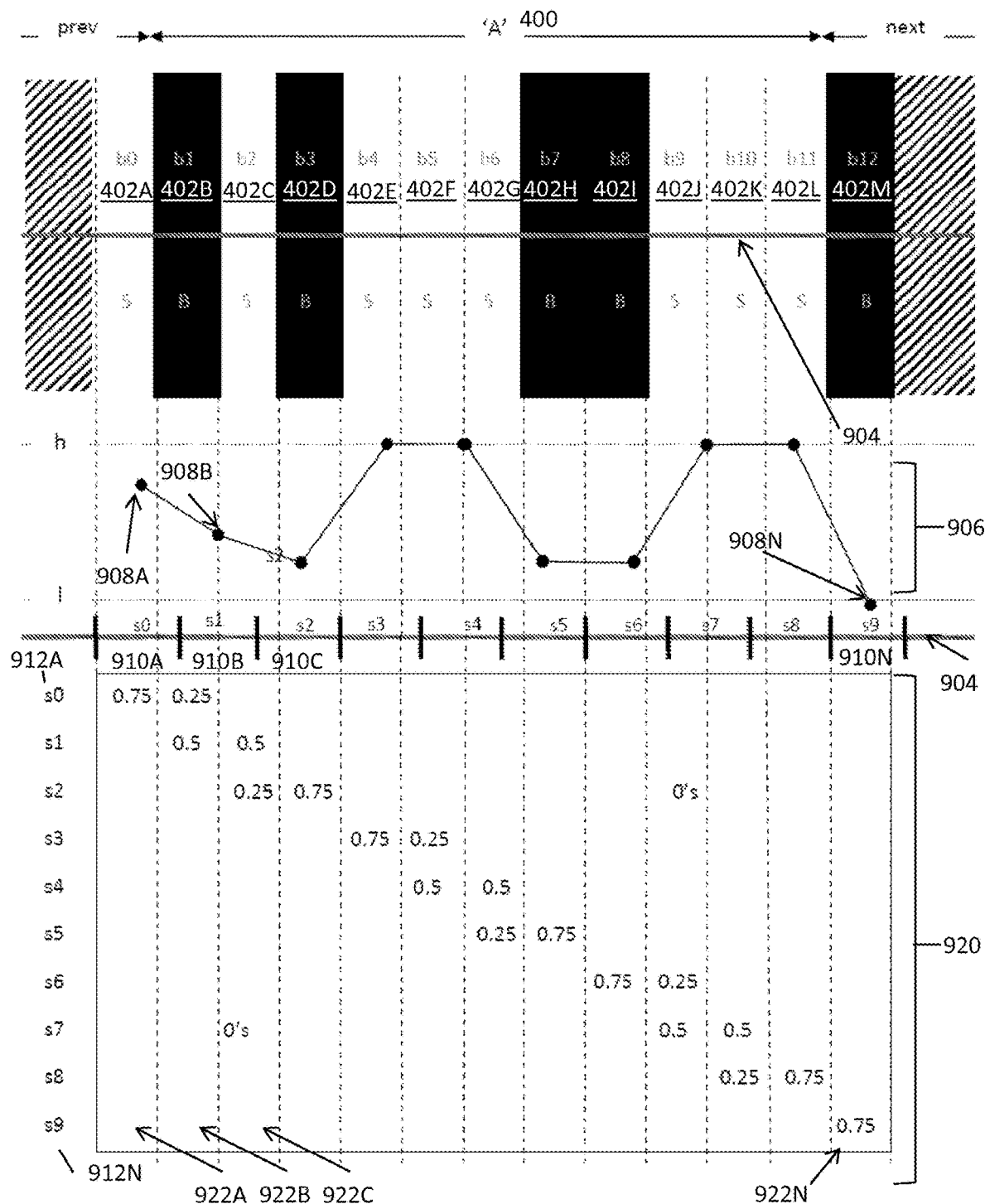
FIG. 9 illustrates an exemplary scanline subsampling and sampling coefficients for a multi-width barcode at 0.75 SPM and −0.25 phase for decoding barcodes, in accordance with some embodiments.

FIG. 9 illustrates an exemplary scanline subsampling and sampling coefficients for a multi-width barcode at 0.75 SPM and −0.25 phase for decoding barcodes, in accordance with some embodiments. FIG. 9 shows the A data character module sequence 400 from FIG. 4. FIG. 9 shows the scan signal 906 derived from the scan 904. The scan signal 906 includes scan samples 908A, 908B through 908N, collectively referred to herein as scan samples 908. The scan samples 908 represent samples for a corresponding scan sample bin s0 910A, s1 910B through s9 910N. For example, scan sample 908A represents the scan sample for scan sample bin s0 910A, which is a value representative of the 0.75 the reflectance of b0 402A and 0.25 the reflectance of b1 402B. As another example, scan sample 908B represents the scan sample for scan sample bin s1 910B, which is half the covered by module b0 and half covered by module b1. Because unit 402B (the first of the character modules) starts to the left of s1 910B by 0.25 the sampling pitch, the units 402 are at negative a quarter (−¼) phase relative to the scan sample bins 910.

FIG. 9 also shows the unit sampling coefficients matrix 920. Each row of the unit sampling coefficients matrix 920 s0 912A through s9 912N (collectively referred to herein as rows 912) corresponds to a scan sample, and is a vector of sampling coefficients of the barcode units in the unit width pattern. Each column 922A through 922N (collectively, columns 922) of the unit sampling coefficients matrix 920 corresponds to a unit (e.g., module). The width of each scan sample bin 910 is equal to 1 and ⅓ of a barcode element due to the 0.75 SPM. The unit sampling coefficients matrix 920 includes zeros at all locations besides those shown including non-zero values (not all zeros are shown for simplicity). For example, row s0 912A includes a 0.75 in the first column 922A because scan sample bin s0 910A is covered ¾ by unit b0 402A, and includes a 0.25 in the second column 922B because scan sample bins0 910A is ¼ covered by unit b1 402B. Row s1 912B includes a 0.5 in the first column 822A because scan sample bin s1 810B is ½ covered by unit b1 402B, and includes a 0.5 in the second column 922B because scan sample unit s1 910B is ½ covered by unit b2 402C.

Figure 10:
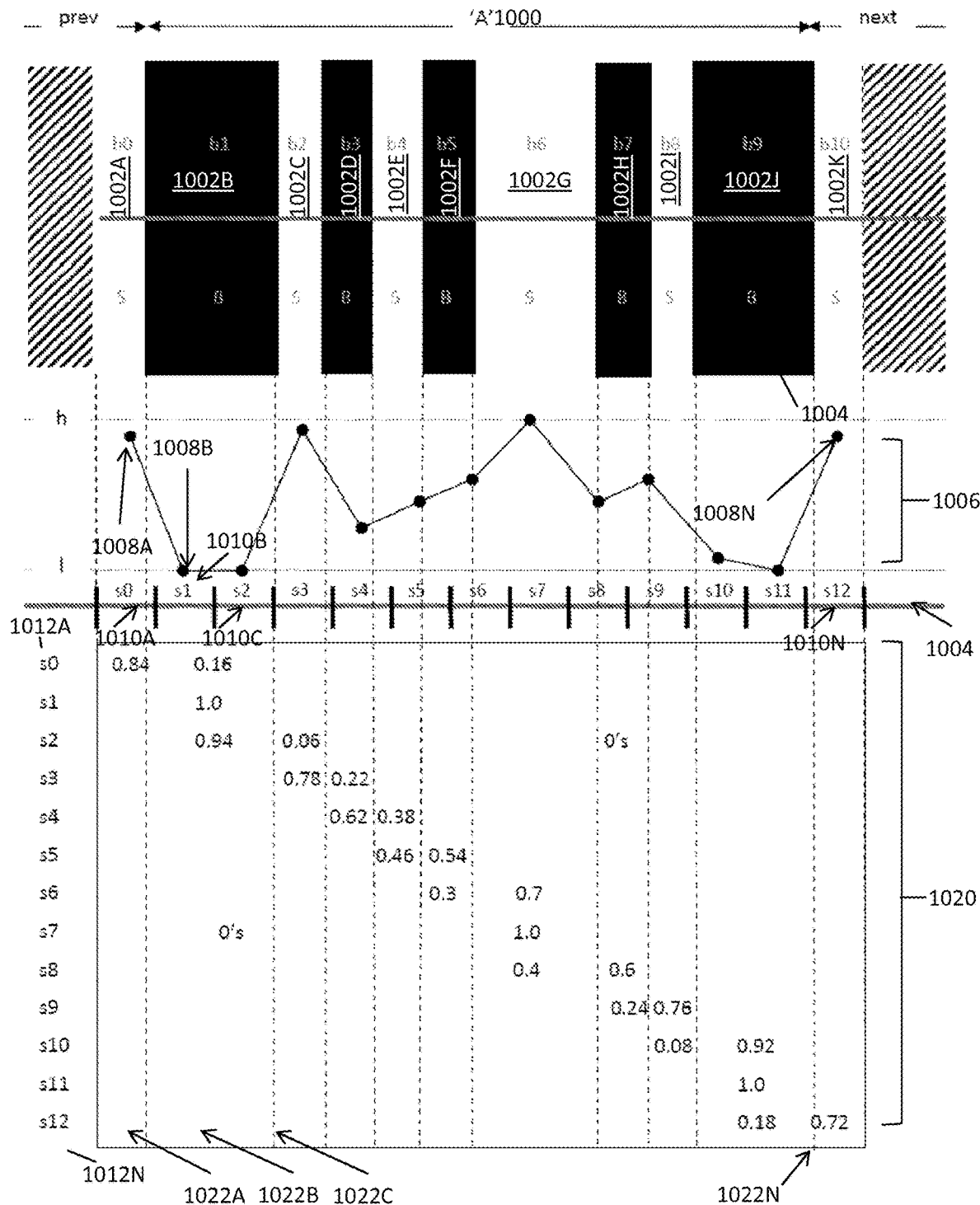
FIG. 10 illustrates an exemplary scanline subsampling and sampling coefficients for a two-width barcode at 0.84 SPM, 2.1 width (W) and −0.16 phase for decoding barcodes, in accordance with some embodiments.

FIG. 10 illustrates an exemplary scanline subsampling and sampling coefficients for a two-width barcode at 0.84 SPM, a width (W) of 2.1, and −0.16 phase for decoding barcodes, in accordance with some embodiments. FIG. 10 shows the A data character element sequence 1000, which consists of barcode elements b0 1002A, b1 1002B, b2 1002C, b3 1002D, b4 1002E, b5 1002F, b6 1002G, b7 1002H, b8 1002I, b9 1002J, and b10 1002K, collectively referred to as barcode units (elements) 1002.

FIG. 10 shows the scan signal 1006 derived from the scan 1004. The scan signal 1006 includes scan samples 1008A, 1008B through 1008N, collectively referred to herein as scan samples 1008. The scan samples 1008 represent samples for a corresponding scan sample bin s0 1010A, s1 1010B through s9 1010N. For example, scan sample 1008A represents the scan sample for scan sample bin s0 1010A, which is a value representative of 0.84 the reflectance of unit b0 1002A 0.16 the reflectance of unit b1 1002B. As another example, scan sample 1008B represents the scan sample for scan sample bin s1 1010B, which is entirely covered by unit b1 1002B. Because unit 1002B (the first element of the character) starts to the left of scan sample bin s1 1010B, the units 1002 are at −0.16 phase relative to the scan sample bins 1010.

FIG. 10 also shows the unit sampling coefficients matrix 1020. Each row of the unit sampling coefficients matrix 1020 s0 1012A through s12 1012N (collectively referred to herein as rows 1012) corresponds to a scan sample, and is a vector of the sampling coefficients for barcode units in the unit width pattern. Each column 1022A through 1022N (collectively, columns 1022) of the unit sampling coefficients matrix 1020 corresponds to a unit (e.g., element). The unit sampling coefficients matrix 1020 includes zeros at all locations besides those shown including non-zero values (not all zeros are shown for simplicity). For example, row s0 1012A includes a 0.84 in the first column 1022A because 84% of scan ample bin s0 1010A is covered by unit b0 1002A, and includes a 0.16 in the second column 1022B because 16% of scan sample bin s0 1010A is covered by unit b1 1002B. Row s1 1012B includes a 1.0 in the second column 1022B because all of scan sample bin s1 910B is covered by unit b1 1002B.

In some embodiments, multiple-width symbologies employ module units, as depicted in FIGS. 4-9. Since the unit width pattern (e.g., and therefore unit grid) can be the same for all possible element width patterns, there can be one unit sampling coefficients matrix for any particular section of the symbol over which the apparent module size remains constant (e.g., a character, several characters, or even the entire barcode). Decoding such a section of the barcode can be performed, for example, by solving a linear system of equations for the actual unit encoding pattern (e.g., module values), and then converting that to the element width pattern and ultimately to its associated alphanumeric value. In some embodiments, decoding can be done by using elements for multiple-width symbologies, described further below.

Figure 11:
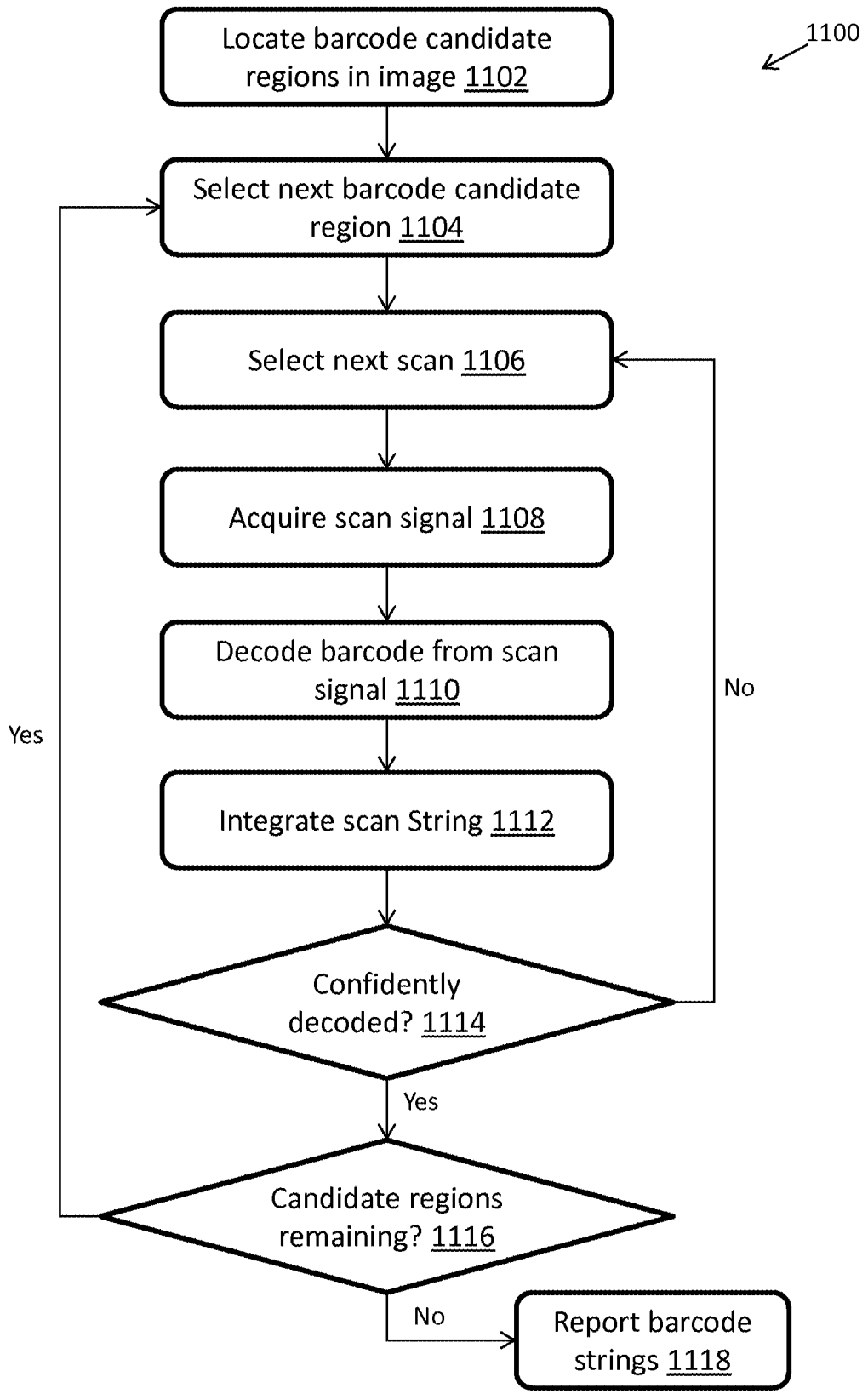
FIG. 11 illustrates an exemplary computerized method of a general image-based decoding algorithm for decoding barcodes, in accordance with some embodiments.

FIG. 11 illustrates an exemplary computerized method 1100 of a general image-based decoding algorithm for decoding barcodes, in accordance with some embodiments. At step 1102, the reader locates barcode candidate regions in an acquired image (e.g., of a barcode on an item on a conveyor belt). At step 1104, the reader selects a next barcode candidate region. For example, the next candidate region is one that has the most bar-like features within. The reader can initialize the integrated string for this candidate. At step 1106, the reader selects a next scan from a set of scans through the candidate region (e.g., scan 404 from FIG. 4). Scans can be, for example, line segments that are roughly parallel to other scans and span from one end of the barcode candidate to the other. The reader can select a scan using different orders. For example, the reader can select a next scan in order from top to bottom, from center to outside, and or the like.

At step 1108, the reader acquires a scan signal (e.g., scan signal 406), such as by using projection. At step 1110, the reader decodes the barcode from the scan signal. The decoding process is described further in conjunction with FIG. 13. At step 1112, the reader integrates the scan string. For example, the reader can combine the decoded string from the scan (including character scores) with the integrated string so far for this candidate scan. At step 1114, the barcode reader determines whether barcode is confidently decoded (e.g., based on a confidence threshold). If the reader determines that the barcode is not confidently decoded, the reader proceeds back to step 1106 and performs steps 1108 through 1112 on the next selected scan (if any remain). If additional candidate regions remain, the method 1100 proceeds back to step 1104. If complete, the method 1100 reports the barcode string. The barcode string can include non-confidently decoded barcodes, partially decoded barcodes, and/or the like.

Figure 12:
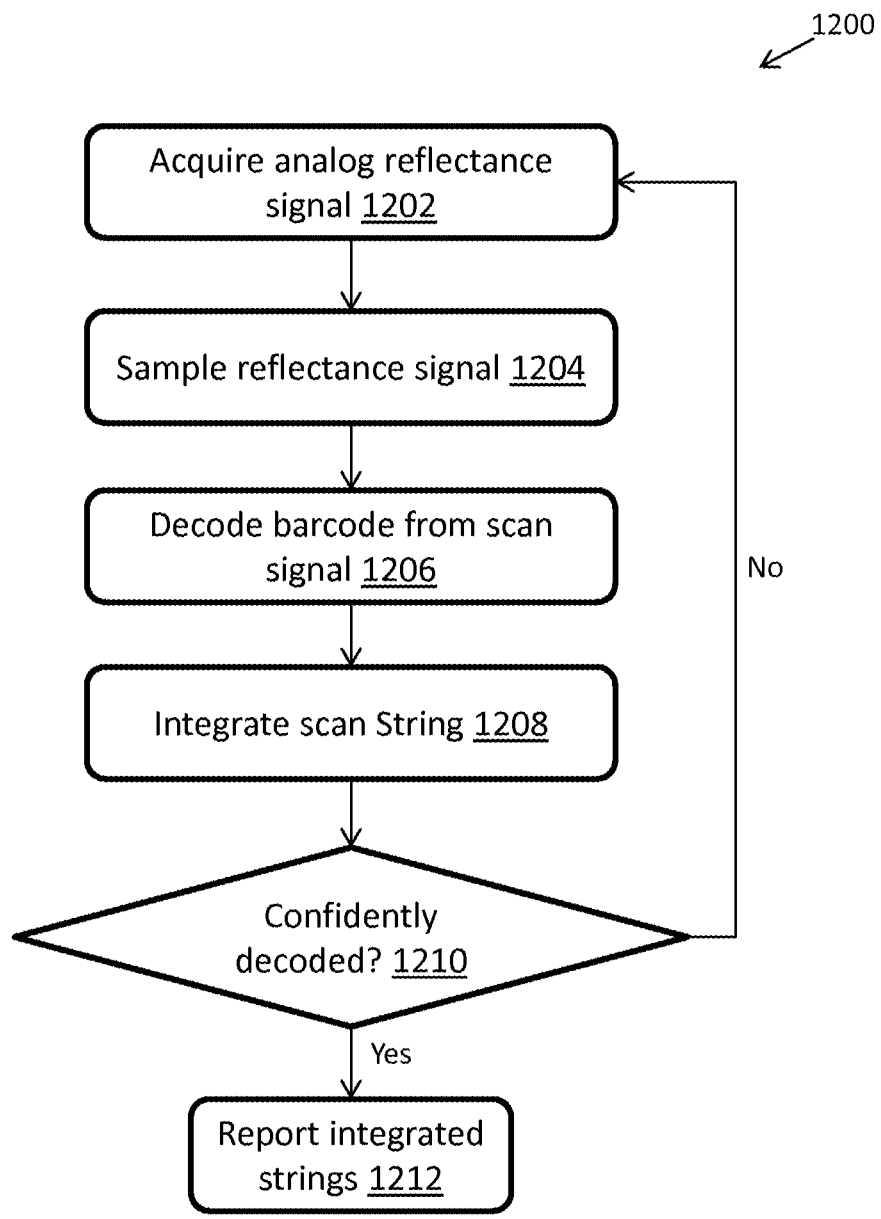
FIG. 12 illustrates an exemplary computerized method of a laser scanner decoding algorithm for decoding barcodes, in accordance with some embodiments.

FIG. 12 illustrates an exemplary computerized method 1200 of a laser scanner decoding algorithm for decoding barcodes, in accordance with some embodiments. At step 1202, the laser scanner acquires an analog reflectance signal. The analog reflectance signal is the reflectance of barcode along linear scan across the barcode, as measured by laser and detector. At step 1204, the laser scanner samples the reflectance signal (e.g., by extracting a discrete digital scan signal by temporal sampling). At step 1206, the laser scanner decodes the barcode from the scan signal. The decoding process is described further in conjunction with FIG. 13. At step 1208, the laser scanner integrates the scan string. At step 1210, the laser scanner determines whether the barcode is confidently decoded. If the laser scanner determines that the barcode is not confidently decoded, the laser scanner proceeds back to step 1202 and acquires a new analog reflectance signal. Otherwise method 1200 proceeds to step 1212 and reports the integrated strings.

Figure 13A:
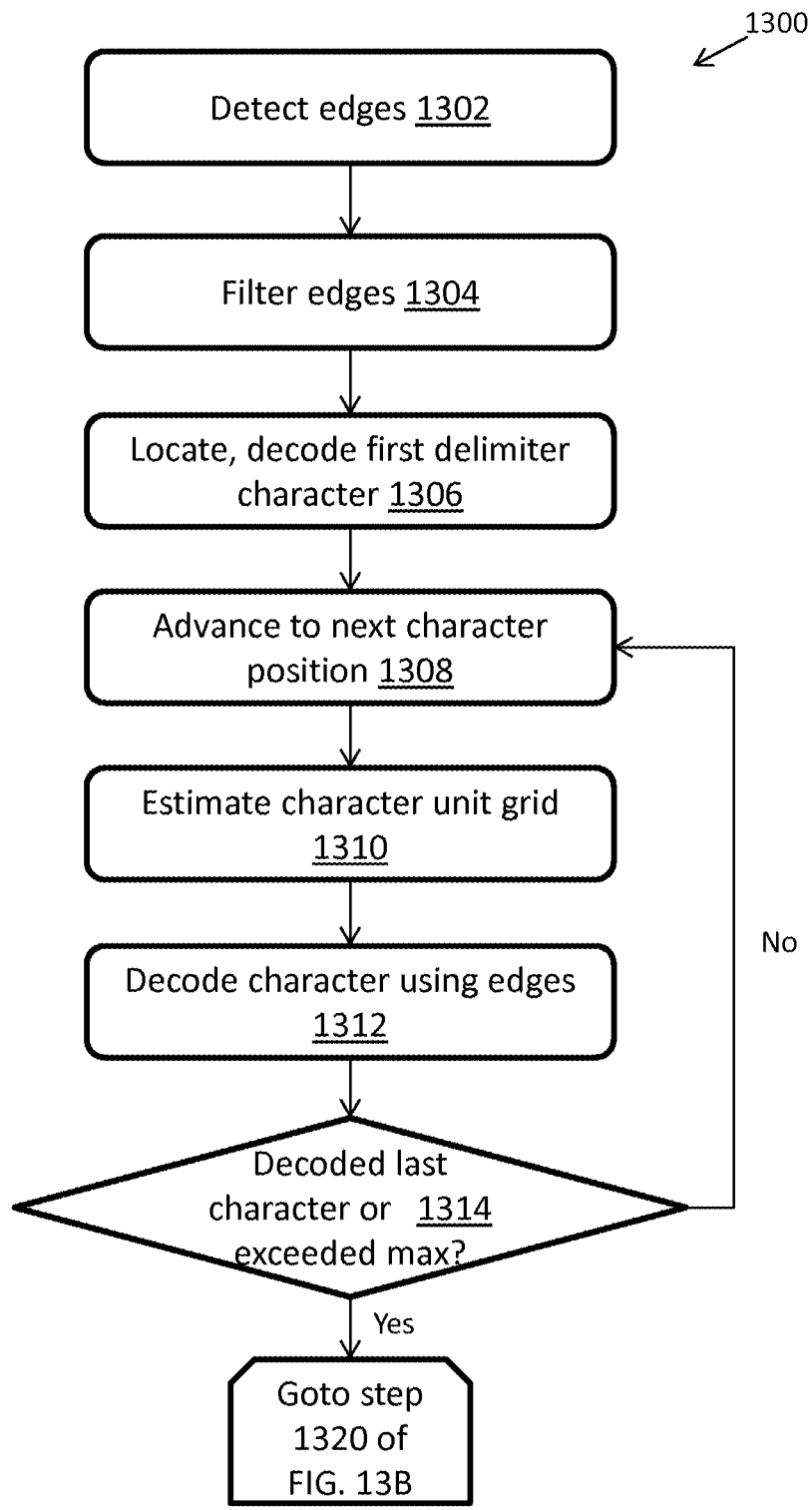
FIGS. 13A-B illustrate an exemplary computerized method for decoding a barcode from a scan signal, in accordance with some embodiments.
Figure 13B:
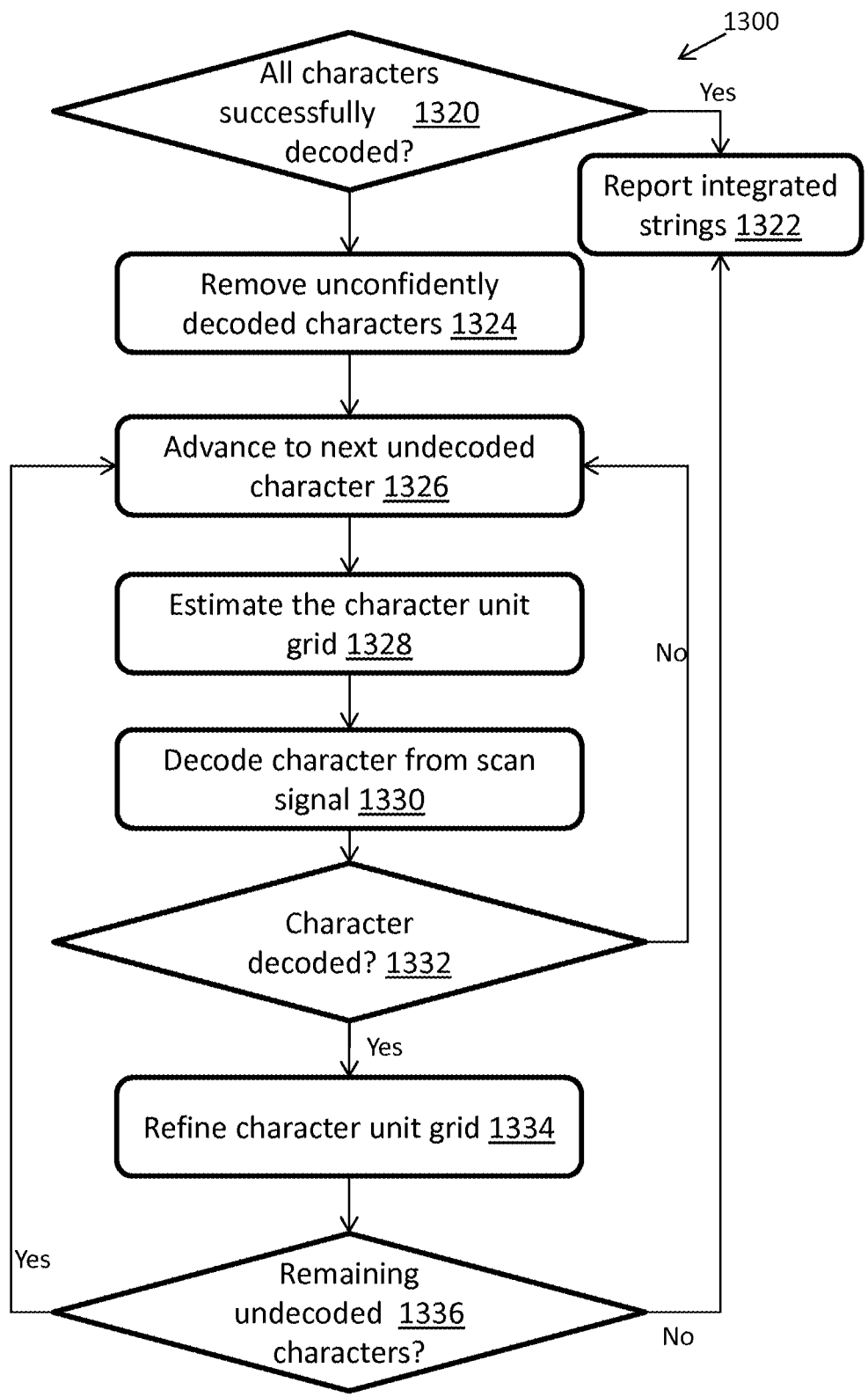

FIGS. 13A-B illustrate an exemplary computerized method 1300 for decoding a barcode from a scan signal, in accordance with some embodiments. At step 1302, the reader detects edges (e.g., 1D positions of transitions between elements) in the scan signal. One of skill in the art can appreciate that various techniques can be used to detect edges, such as using derivative peaks, second derivative zero crossings, peak/valley transitions (ANSI edges), and/or other edge detection methods. At step 1304, the reader filters the edges. For example, the reader can filter out false edges (e.g. based on contrast), and/or add missing edges when a minimum feature size is known. At step 1306, the reader locates and decodes the first delimiter character. In some embodiments, the reader can locate and decode the delimiter character in the reverse direction along the scan (e.g., by reversing the scan signal).

At step 1308, the reader advances to the next character position. For example, the reader can add the measured character length of the current character (e.g., which at the start from step 1306 will be the delimiter pattern), plus any measured inter-character gap, to determine the starting position of the current character. If the current character wasn't properly decoded (e.g., not within confidence ranges), the reader can use estimates of the character size. At step 1310, the reader estimates the character unit grid. In some embodiments, the character unit grid includes the starting position (e.g., phase), minimum feature size (e.g., X), wide/narrow ratio (if applicable), and inter-character gap. In some embodiments, the reader can be configured to use the last measured statistics of the previous decoded character, accounting for the number of characters that could not be decoded afterwards. In some embodiments, the inter-character gap for the first character beyond the delimiter can be measured using the first edge distance.

At step 1312, the reader decodes the character using edges. One of skill in the art can appreciate that this can be performed using techniques known in the art, such as by measuring edge-to-similar-edge distances, classifying the edge-to-similar-edge distances (e.g., including rounding each edge distance to the nearest integer multiple of X or W), looking up the character value, and updating the character grid (e.g., including the position, minimum feature size, and element width) and score (e.g., to update how well the edges matched, such as by using the fractional differences from the nearest integer multiples of X). At step 1314, the reader determines whether the last delimiter character was decoded or, whether the max number of characters was exceeded for the symbology. If not, the method proceeds back to step 1308. Otherwise, the method proceeds to step 1320 of FIG. 13B. At step 1320, the reader determines whether all characters were successfully decoded. If yes, the method 1300 proceeds to step 1322 and reports the integrated strings. If not, the method 1300 proceeds to step 1324 to remove unconfidently decoded characters. For example, the reader can be configured to avoid misreads. The reader can be set with a high confidence threshold to detect potential misreads (e.g., so such characters are marked as undecoded). For example, such characters may include those characters prior to undecoded characters (e.g., due to errors in character unit grid estimates and/or missing and/or extra edges).

At step 1326, the reader advances to the next undecoded character. For example, the reader can start at the beginning of the character string, and advance forward to the next undecoded character. At step 1328, the reader estimates the character unit grid. At step 1330, the reader decodes the character from the scan signal. If the character is not decoded, the method proceeds back to step 1326. If the character is decoded, the method proceeds to step 1334 and refines the character unit grid. In some embodiments, step 1334 is optional. The reader can search through small perturbations in each of the character unit grid measurements and assess how the score changes for the decoded character. The reader can select the character unit grid that yields the best score, thereby determining a modified start position, inter-character gap (if applicable), minimum feature size, and/or wide-to-narrow ratio (if applicable). If there are remaining undecoded characters, the method proceeds to step 1326. Otherwise the method proceeds to step 1322 and reports the integrated strings.

Referring to step 1330, decoding separate characters can, for example, accommodate a varying scan sampling pitch as a function of position along the scan, such as that caused by optical perspective effects and/or non-linear warping of the symbol around curved objects. Therefore a barcode reader can be configured to use a constant scan sampling pitch over the relatively small positional range of a character. A single minimum feature size and wide bar width (if applicable), e.g., measured in scan sample pitch units, can be used to describe the unit grid for a character. Advantageously, using characters can also allow a barcode reader to solve for each character unit encoding pattern by examining all possible combinations of unit encoding patterns (e.g., 103 combinations for multiple-width Code128) and choosing the unit encoding pattern that results in an expected (e.g., predicted) normalized scan samples, Ab, that is the closest match for the portion of the measured normalized scan samples, s.

In some embodiments a barcode reader can be configured to directly solve for the unit encoding pattern using standard linear algebra techniques (e.g. using the standard least squares formulation $b=(A^T A)^{-1} s$, which would minimize the Euclidean length of Ab−s). A may become numerically unstable as the module size approaches 1.0, and below 1.0 A becomes singular. Therefore techniques can be used to stabilize the solution. For example, constraint minimization (e.g. using Lagrange multipliers to incorporate some other linear constraint) can be used to stabilize the solution. As another example, the psuedoinverse (e.g. $b=A^+ s$) can be used to stabilize the solution. The solution can be constrained in any of a number of other ways, for example, mathematically constraining the solution to be a binary vector. However, some constraints may be less beneficial than others, as they may result in a non-linear set of equations that are not easily or efficiently solved.

A character-by-character technique can be used to decode two-width barcodes and/or to decode multiple-width characters (e.g., when using unit elements). A reader can therefore be configured to decode a barcode character by identifying the unit sampling coefficients matrix (e.g., and associated element width pattern and character value) that results in the best score (e.g., the one that essentially matches the sample scan the best) when multiplied by a binary unit encoding pattern vector representing alternating bars and spaces (same for all possible characters).

In some embodiments, the barcode reader determines the scan signal envelope vectors l and H prior to and/or during the process finding the best match character (e.g., so that the measured and predicted (expected) scan signal values can be directly compared). In some embodiments, the barcode reader is configured to assume that the scan signal envelope is constant over a single character (e.g., to make the computations easier). For example, a barcode reader can use a single pair of envelope values, l and h, rather than a vector. For example, such a configuration can be used to essentially assume that the underlying lighting of the barcode doesn't change much over the course of a single character.

In some embodiments, the barcode reader can be configured to assume that the signal envelope is not much different than that of the previously decoded character. After decoding, the barcode reader can refine the envelope by measuring the minimum and maximum signal values within the wider bars of the decoded character. In some embodiments, the barcode reader can determine the envelope parameters l and h directly for each possible character as part of the matching process. For example, the barcode reader can be configured to matching the expected Ab directly against the actual measured raw signal r (e.g., by allowing an arbitrary uniform scale and single offset). In some embodiments, the barcode reader can be configured to select the values of scalars a and c that minimize $sum_i(a\ r(i)+c-s(i))^2$ (e.g., the sum over all n values of i, where n is the length of the portion of the scan signal). The relationships $a=(S-B)/(h-l)$ and $c=B-al$ can then be used to determine h and l, which yields:

$l=(DB-v_c)/v_a$ $h=l+D(S-B)/v_a$      Equations 3 and 4 where:

$v_a=m_2y_2-ny_1$ $v_c=m_2y_1-m_1y_2$ $D=m_2{}^2=nm_1$ $m_1=sum(r(i)^2)$ $m_2=sum(r(i))$ $y_1=sum(s(i)r(i))$ $y_2=sum(s(i))$ In some embodiments, the barcode reader can be configured to verify computed l and h against expected ranges for these numbers (e.g. based on nearby characters) so that the barcode reader can determine whether the character corresponding to b should be considered further.

Figure 14A:
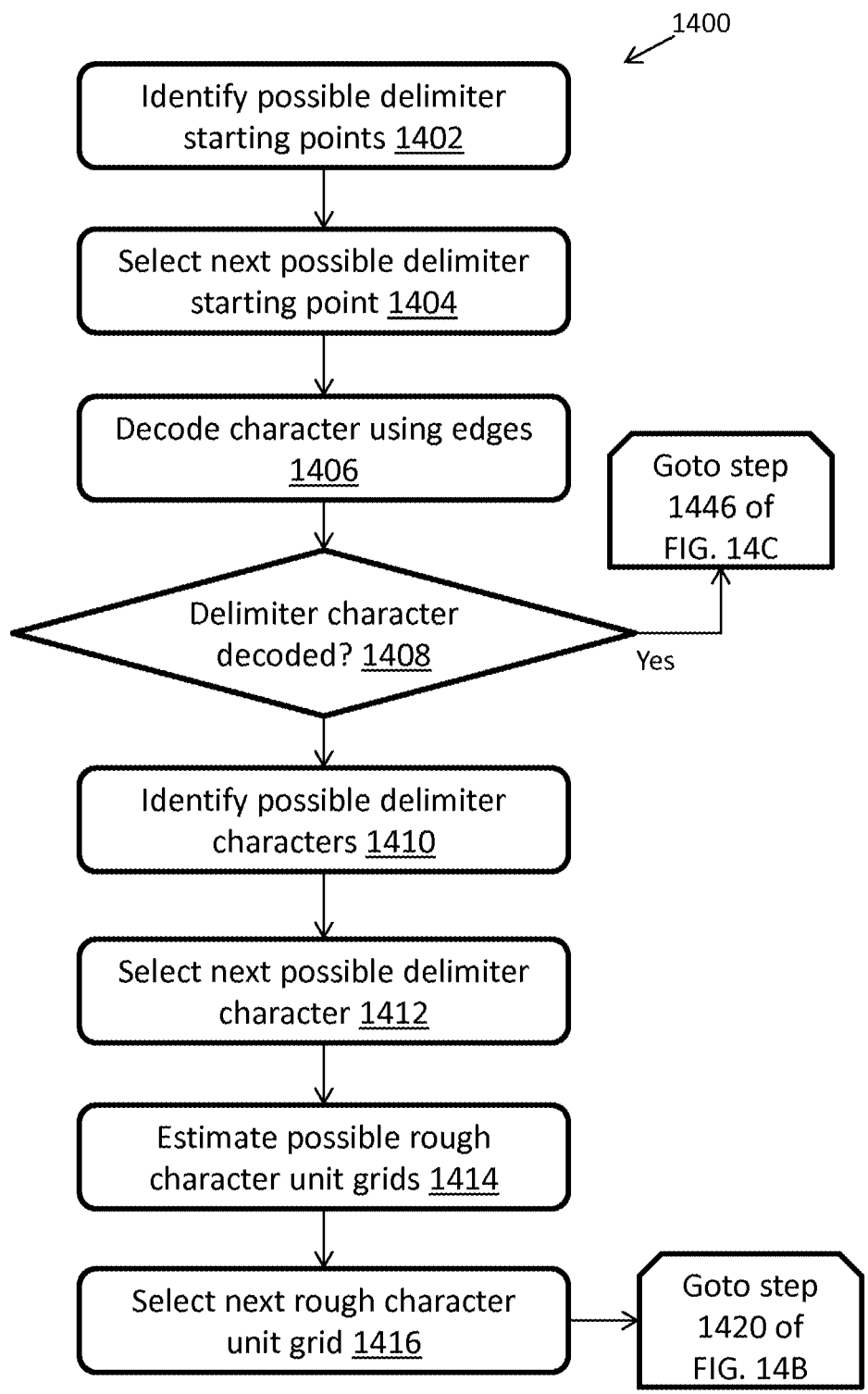
FIGS. 14A-C illustrate an exemplary computerized method for locating and decoding a first delimiter character for decoding barcodes, in accordance with some embodiments.
Figure 14B:
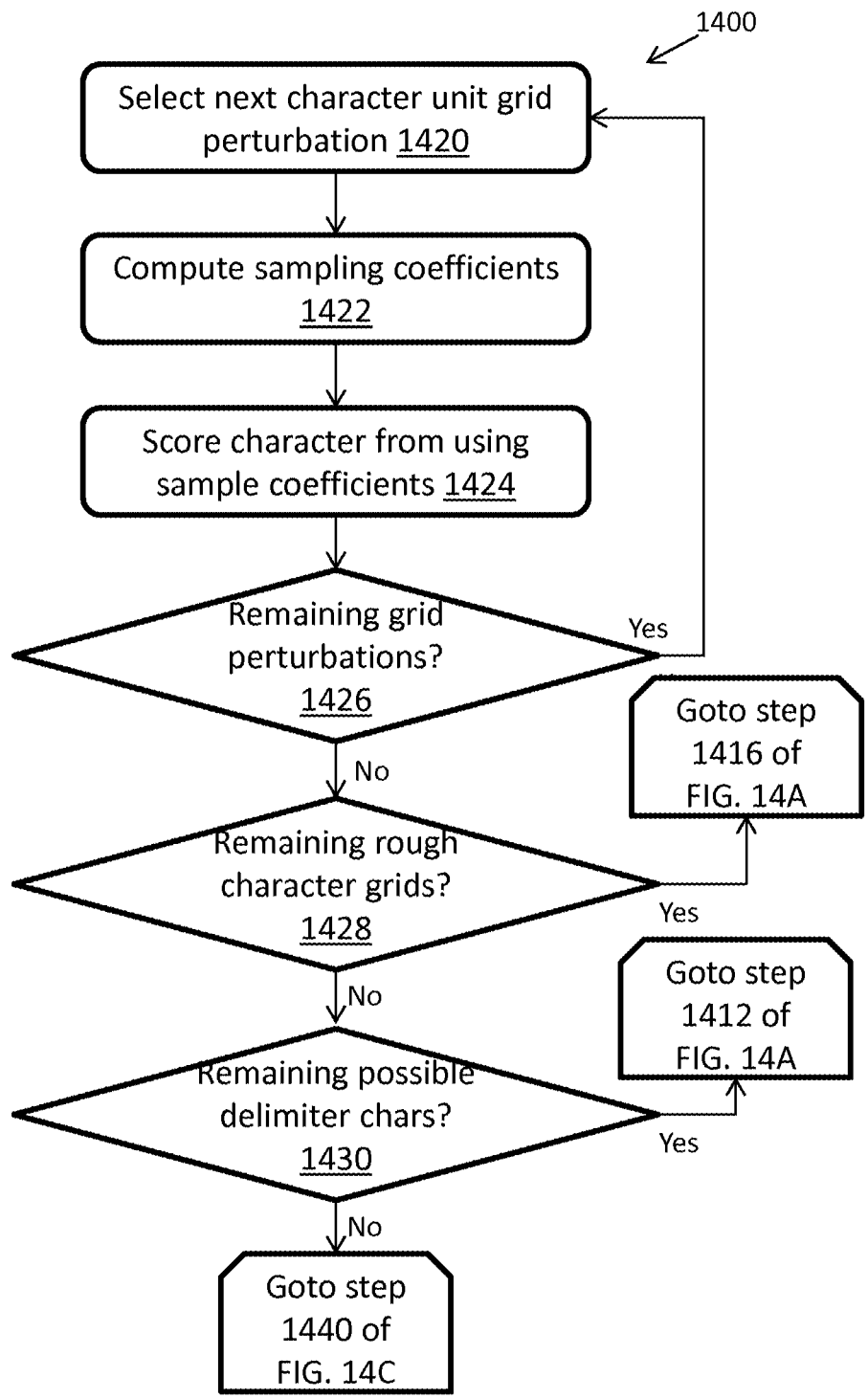
Figure 14C:
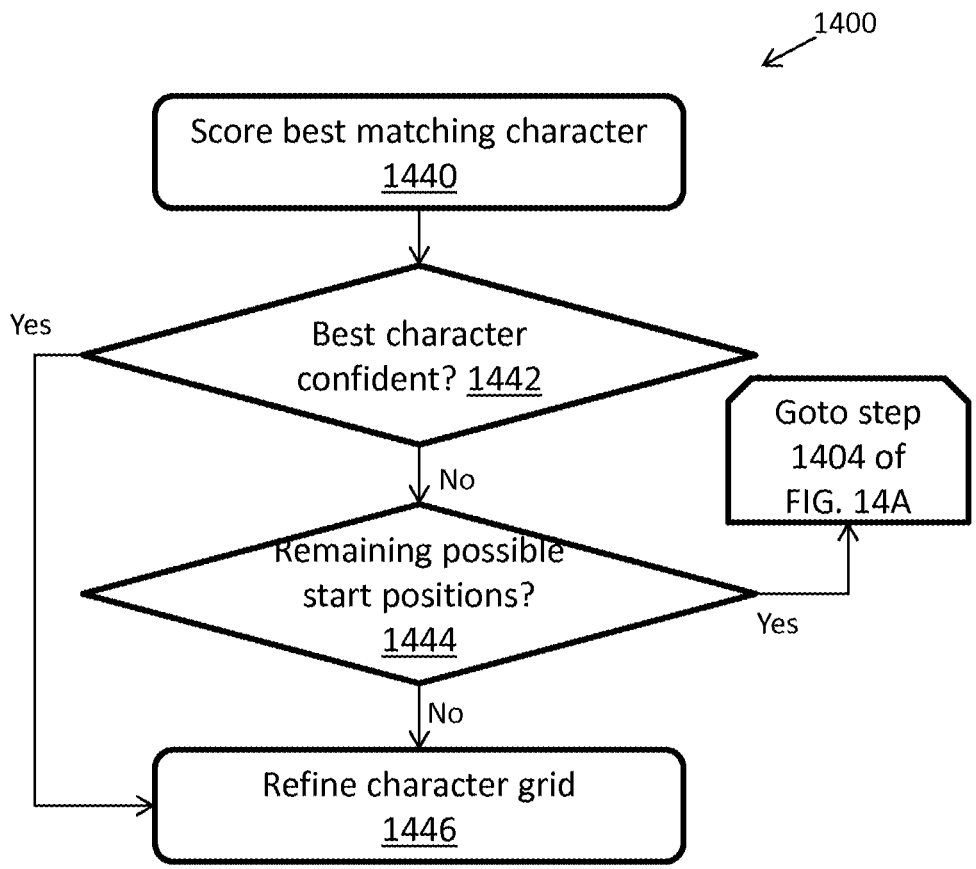

FIGS. 14A-C illustrate an exemplary computerized method 1400 for locating and decoding a first delimiter character for decoding barcodes, in accordance with some embodiments. At step 1402, the reader identifies possible delimiter starting points. For example, the reader can consider each edge as a possible starting location, where the polarity of the edge (light-to-dark or dark-to-light) determines the polarity of the barcode (light-on-dark or dark-on-light). As another example, the reader can consider only edges with reasonable quiet zones (e.g., with no significant features (e.g. edges) in the scan signal prior for a distance relative to the subsequent edge distance).

At step 1404, the reader selects the next possible delimiter starting point from among the remaining identified possible delimiter starting points. At step 1406, the reader decodes the character using edges. At step 1408, the method 1400 determines whether the delimiter character was decoded. If yes, the method proceeds to step 1446 in FIG. 14C. at step 1410, the reader identifies possible delimiter characters. For example, some symbologies have more than one start or stop pattern. In some embodiments as described above, stop patterns can be detected in the reverse direction along the scan signal, since the decoding operation may be occurring in the reverse direction. At step 1412 the reader selects the next possible delimiter character.

At step 1414, the reader estimates possible rough character unit grids. For example, the reader can estimate the possible minimum feature sizes, and wide/narrow ratio (if applicable), from a portion of the signal at the end of the barcode. For example, the reader can estimate that the print growth is roughly 0, and that the inter-character gap (if applicable) is 1×. Other estimates can be made by, for example, identifying possible measured edge to start pattern edge correspondences, assuming some edges may be missing due to the fact that the signal is unresolved, and performing a least squares fit. The correspondences with the best fit (e.g., above an error threshold) are chosen and associated with a best fit character grid. In some embodiments, for two-width symbologies, estimation can alternatively be accomplished without edges by locating the centers of the wide elements and performing a similar correspondence operation.

At step 1416, the reader selects a next rough character unit grid, and the method proceeds to step 1420. At step 1420, the reader selects the next character unit grid perturbation. For example, the reader can select the character unit grid that differs from the estimate, but is within the estimated maximum error. In some embodiments, the reader can vary one parameter (e.g., such as minimum feature size) in small steps. At step 1422, the reader computes the unit sampling coefficients matrix, which is described further in FIG. 15. At step 1424, the reader scores the character from the unit sampling coefficients matrix, which is described further in FIG. 16. If the reader determines that the score is sufficient (e.g. better than a predetermined threshold), the reader can record the score for that character, and the associated character unit grid.

At step 1426, the reader determines whether there are any remaining grid perturbations. If there are remaining grid perturbations, the reader proceeds to step 1420. If no, the method proceeds to step 1428 and determines whether there are any remaining rough character grids. If character grids remain, the method proceeds to step 1416 in FIG. 14A. If no character grids remain, the method proceeds to step 1430 and determines whether there are remaining possible delimiter characters. If there are remaining possible delimiter characters, the method proceeds to step 1412 of FIG. 14A.

If there are no remaining possible delimiter characters, the method proceeds to step 1440 of FIG. 14C. At step 1440, the reader scores the best matching character. For example, the reader can select the character/grid combination with the best score. At step 1442, the reader determines whether the best character score is sufficient. For example, if the best-matching character score is not good enough, or is not better than the next best possible character score by more than the confidence threshold, the reader can determine it has not found a delimiter character. If the best character score is sufficient, the reader proceeds to step 1446. If the best character score is not sufficient, the reader proceeds to step 1444 and determines whether there are remaining possible delimiter start positions. If there are remaining possible delimiter start positions, the method proceeds to step 1404 in FIG. 14A. If there are not remaining possible delimiter start positions, the method proceeds to step 1446 and (optionally) refines the character grid. For example, the reader can search through small perturbations in each of the character grid measurements and assess how the score changes for the decoded character. In some embodiments, the reader chooses the character grid that yields the best score, thereby determining a modified start position, inter-character gap (if applicable), minimum feature size, and/or wide-to-narrow ratio (if applicable).

Figure 15:
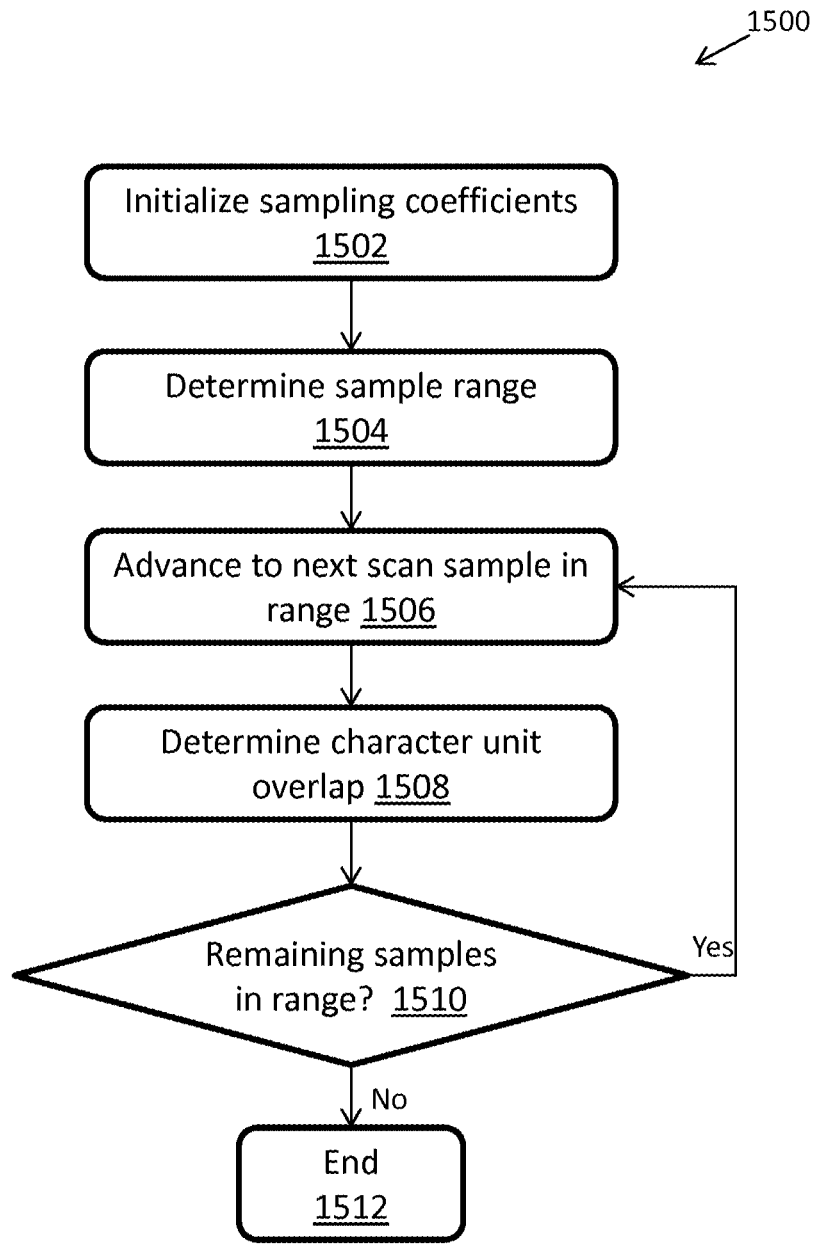
FIG. 15 illustrates an exemplary computerized method for determining a unit sampling coefficients for decoding barcodes, in accordance with some embodiments.

FIG. 15 illustrates an exemplary computerized method 1500 for determining a unit sampling coefficients for decoding barcodes, in accordance with some embodiments. At step 1502, the reader initializes the unit sampling coefficients. The unit sampling coefficients matrix is of size n×m, where n is the number of actual 1D signal values, and m is either the number of modules (e.g., for a multiple-width symbol) or elements (e.g., for a two-width symbol, or multiple-width with element units) in a character, plus 2 (e.g., representing the elements or inter-character gaps before and after the character). The reader initializes all values to 0. In a preferred embodiment, the coefficients matrix is represented using a sparse matrix representation.

At step 1504, the reader determines the sample range. For example, the reader can determine the first and last samples with centers that lie within the character (e.g., centers within one of the character modules or elements, and not the previous to or following element or inter-character gap). At step 1506, the reader advances to the next scan sample in range. For example, this is the first sample in range if none has yet been considered. As described above, the sample can correspond to a row of the coefficients matrix with the same index. The sample is typically associated with a bin, which is a positional range of the scan line over which it is assumed to integrate information. A sample bin can be centered about the sample position, and can have a width equal to the sample spacing.

At step 1508, the reader determines the character unit overlap. For example, using the character unit grid, the reader computes the percentage of the sample bin that is overlapped by each character unit (e.g., taking print growth, g, into account). For multiple-width symbols, the reader can use units equal to modules. For two-width symbols, the reader can use units equal to elements. The reader can record these values in order across the row of the coefficients matrix associated with the sample. In some embodiments, when the X−g>0.5 sample pitches, there are likely at most three non-zero percentages per row, and overlap can be determined by locating the closest module i to the sample j, and setting the coefficients matrix A according to the equations:

$$q(i)=(w(i)-1)/2$$

$$A(j,i-1)=\max(+d(i,j)-q(i)+g/2,0)$$

$$A(j,i+1)=\max(-d(i,j)-q(i)+g/2,0)$$

$$A(j,i)=1-A(j,i-1)-A(j,i+1) \hspace{2em} \text{(Equations 5-8)}$$

Where:

w(i) is the width of element i (e.g., which is X for narrow elements or modules, or W for wide elements); and d(i,j) is the signed difference between the center of unit i and the center of sample j (e.g., where all positions are real values in sample coordinates).

At step 1510, the reader determines whether there are any remaining scan samples in range. If there are remaining scan samples in range, the method proceeds to step 1506. If there are no further remaining scan samples in range, the method proceeds to step 1512 and terminates.

In some embodiments, the barcode reader is configured to determine the score for a character using a function of the errors, e=s−Ab. Examples of this function include the sum of the squared errors, the sum of the absolute errors, the maximum error, and/or the like. In some embodiments, the errors are "back-propagated" through the coefficients matrix to compute errors in the original character units (modules or elements). Back-propagation can be accomplished by computing a unit error vector e(b) according to the following equation:

$$e(b)=A^T e' \hspace{2em} \text{Equation 9}$$

where:

e(b) is the unit error vector; and e' is the vector of absolute signal errors, defined by e'(i)=|e(i)|.

The overall error for the pattern b can be computed, for example, using the sum of the squared unit errors, the sum of the unit errors, the maximum unit error, and/or the like. In some embodiments, the sum of the squared unit errors is used for data characters (e.g., since getting even a single unit incorrect can result in a costly misread). In some embodiments, the sum of the unit errors is used for delimiters (e.g., where misreads are not as detrimental, but missing a delimiter can result in not even attempting to decode a symbol).

Figure 16:
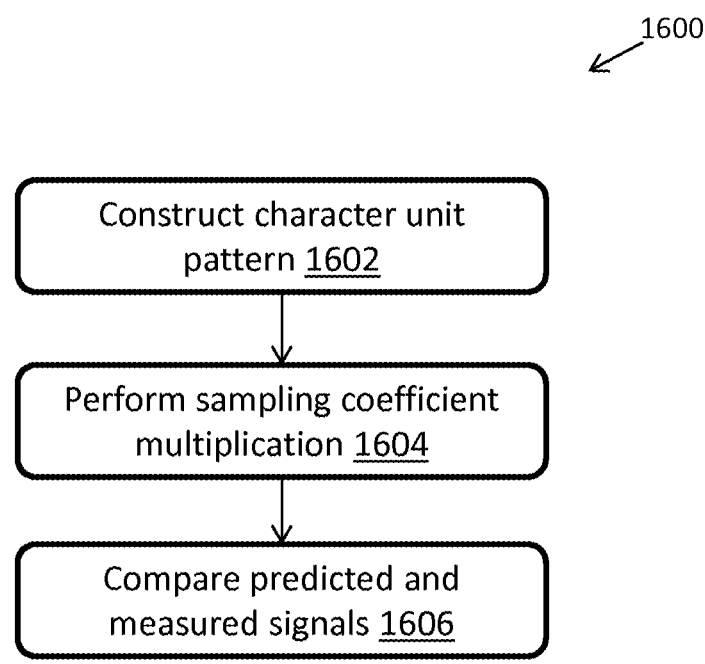
FIG. 16 illustrates an exemplary computerized method for scoring a character from a scan signal for decoding barcodes, in accordance with some embodiments.

FIG. 16 illustrates an exemplary computerized method 1600 for scoring a character from a scan signal for decoding barcodes, in accordance with some embodiments. At step 1602, the reader constructs a character unit pattern. For example, in some embodiments the reader identifies the binary unit encoding pattern associated with the character. For example, for multiple-width characters the unit encodation pattern is the pattern of modules that can be part of bars or spaces, derived from the character element width pattern. For two-width characters, for example, the unit encodation pattern is the pattern of element values that is always an alternating sequence of bar and space values, starting with the appropriate value (bar or space).

At step 1604, the reader performs unit sampling coefficient multiplication. For example, the reader can multiply the unit sampling coefficients matrix by the unit encodation pattern to obtain the predicted (or expected) signal vector. At step 1606, the reader can compare the predicted and measured signals. In some embodiments, the reader can be configured such that the comparison should produce one or more character scores that indicates how well the predicted signal matches the measured signal. This can be accomplished in a variety of ways, as previously described. In some embodiments, the reader can subtract the two values after normalizing the actual signal by the local signal envelope (e.g., the minimum and maximum signal range, corresponding to the apparent reflectance of the bars and spaces in the signal).

Figure 17:
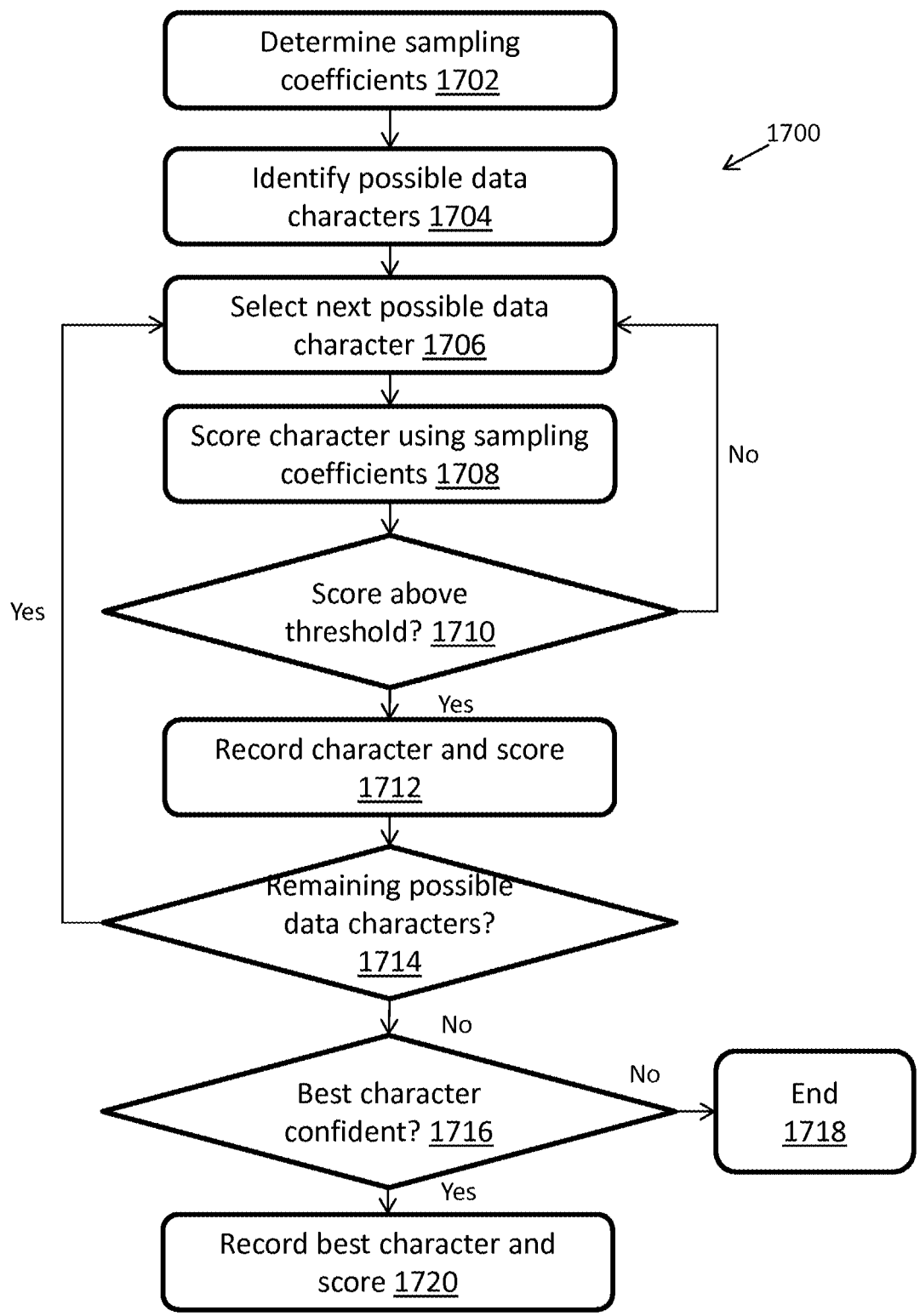
FIG. 17 illustrates an exemplary computerized method for decoding a character from a scan signal of a multi-width barcode for decoding the barcode, in accordance with some embodiments.

FIG. 17 illustrates an exemplary computerized method 1700 for decoding a character from a scan signal of a multi-level barcode for decoding the barcode, in accordance with some embodiments. Referring to step 1702, the reader determines the unit sampling coefficients, e.g., as explained in FIG. 16. At step 1704, the reader identifies possible data characters. For example, for some codes like Code128, all data characters might be possible. For other codes, like UPC-EAN, only characters from the appropriate sub-groups (A, B, or C) might be possible. At step 1706, the reader selects the next possible data character. At step 1708, the reader scores the character using the unit sampling coefficients.

At step 1710, the reader determines whether the score is high enough. If the score is not high enough, the method proceeds to step 1706. If the score is high enough, the reader proceeds to step 1712 and records the character and score. At step 1714, the reader determines whether there are remaining possible data characters. If there are remaining possible data characters, the reader proceeds to step 1706. If there are not any remaining possible data characters, the reader proceeds to step 1716 and the reader determines whether the best score is better than the second best score (if any) by at least the confidence threshold. If the reader is confident that it identified the best character, the reader proceeds to step 1720 and records the best character and score. If the reader is not confident, then the character is not decoded.

Figure 18:
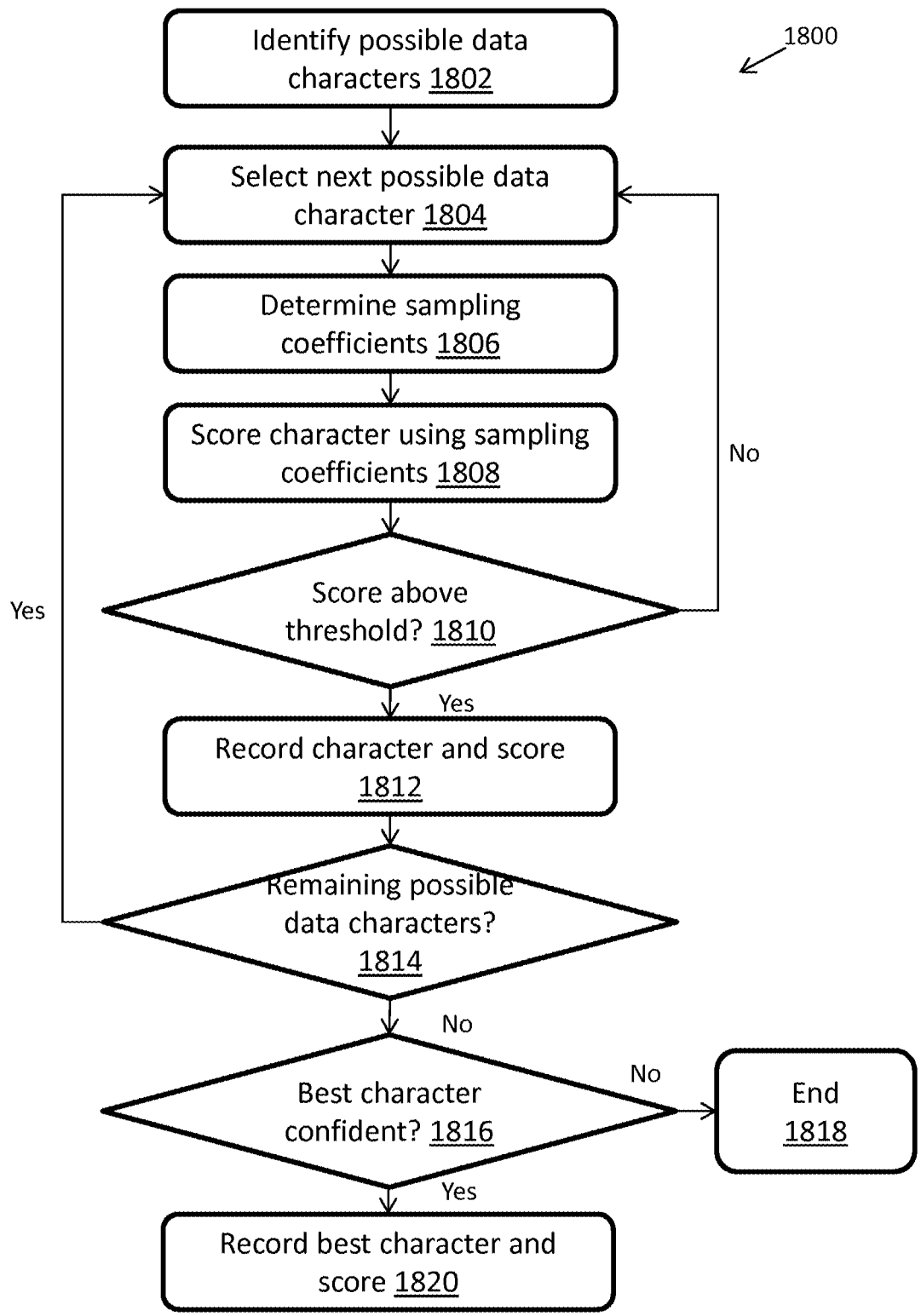
FIG. 18 illustrates an exemplary computerized method for decoding a character from a scan signal of a two-width or multi-width barcode for decoding the barcode, in accordance with some embodiments.

FIG. 18 illustrates an exemplary computerized method 1800 for decoding a character from a scan signal of a two-level or multi-level barcode for decoding the barcode, in accordance with some embodiments. At step 1802, the method identifies possible data characters. For example, for some codes like Code39, all data characters might be possible. For other codes, like Codabar, only characters with the appropriate length might be possible. At step 1804, the method selects the next possible data character. At step 1806, the method determines the unit sampling coefficients (e.g., as described in conjunction with FIG. 15). At step 1808, the method scores the character using the unit sampling coefficients (e.g., as described in conjunction with FIG. 16).

At step 1810, the reader determines whether the score is above a predetermined threshold. If the score is not above a predetermined threshold, the method proceeds back to step 1804. If the score is above a predetermined threshold, the method proceeds to step 1812 and records the character and score. At step 1814, the method determines whether there are remaining possible data characters. If there are remaining possible data characters, the method proceeds to step 1804. If there are not remaining possible data characters, the method proceeds to step 1816. At step 1816, the reader determines whether the best score is better than the second best score (if any) by at least the confidence threshold. If the reader is confident that it identified the best character, the reader proceeds to step 1820 and records the best character and score. If the reader is not confident, then the character is not decoded and the method terminates at step 1818.

Figure 19A:
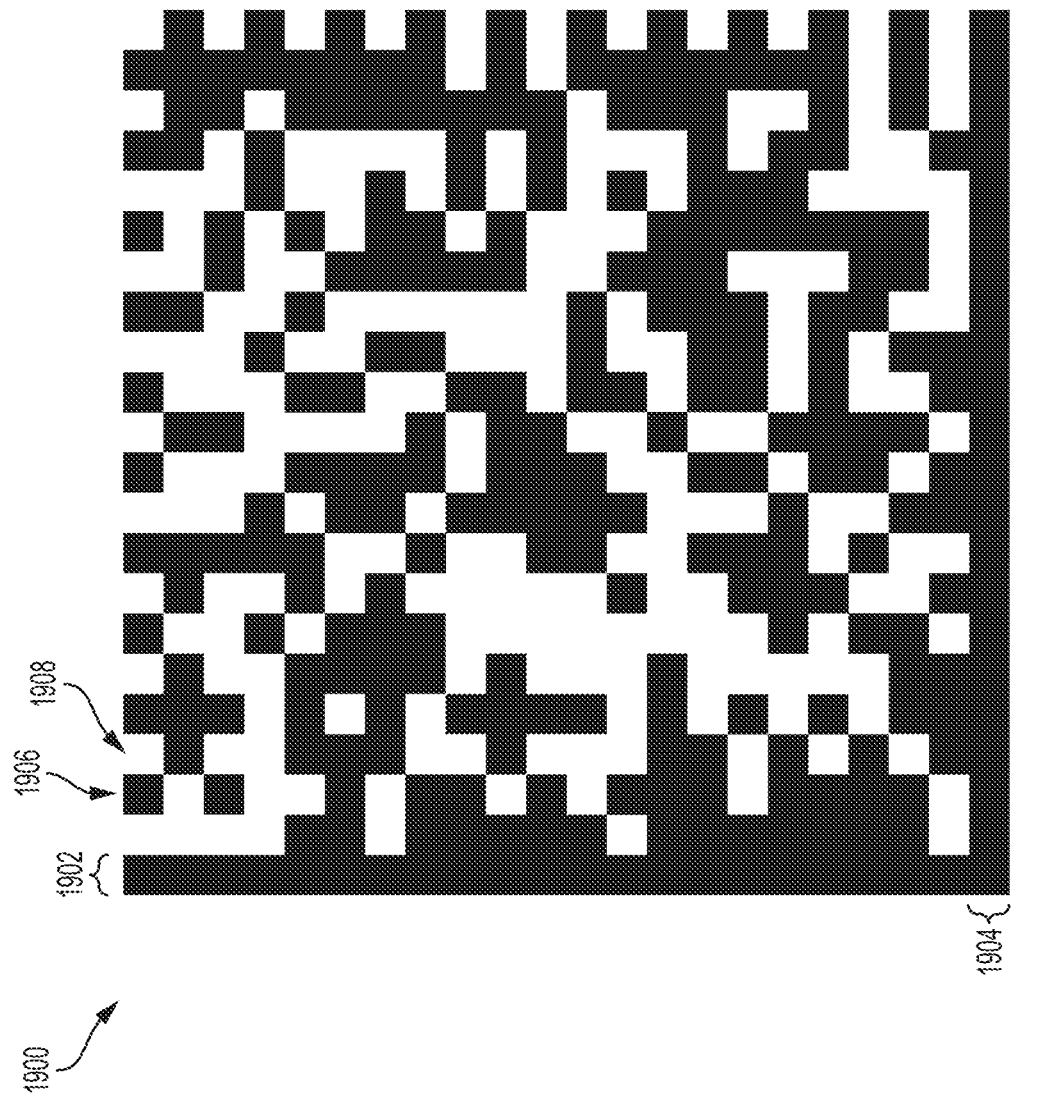
FIG. 19A shows an exemplary DataMatrix 2D symbol, according to some examples.
Figure 19B:
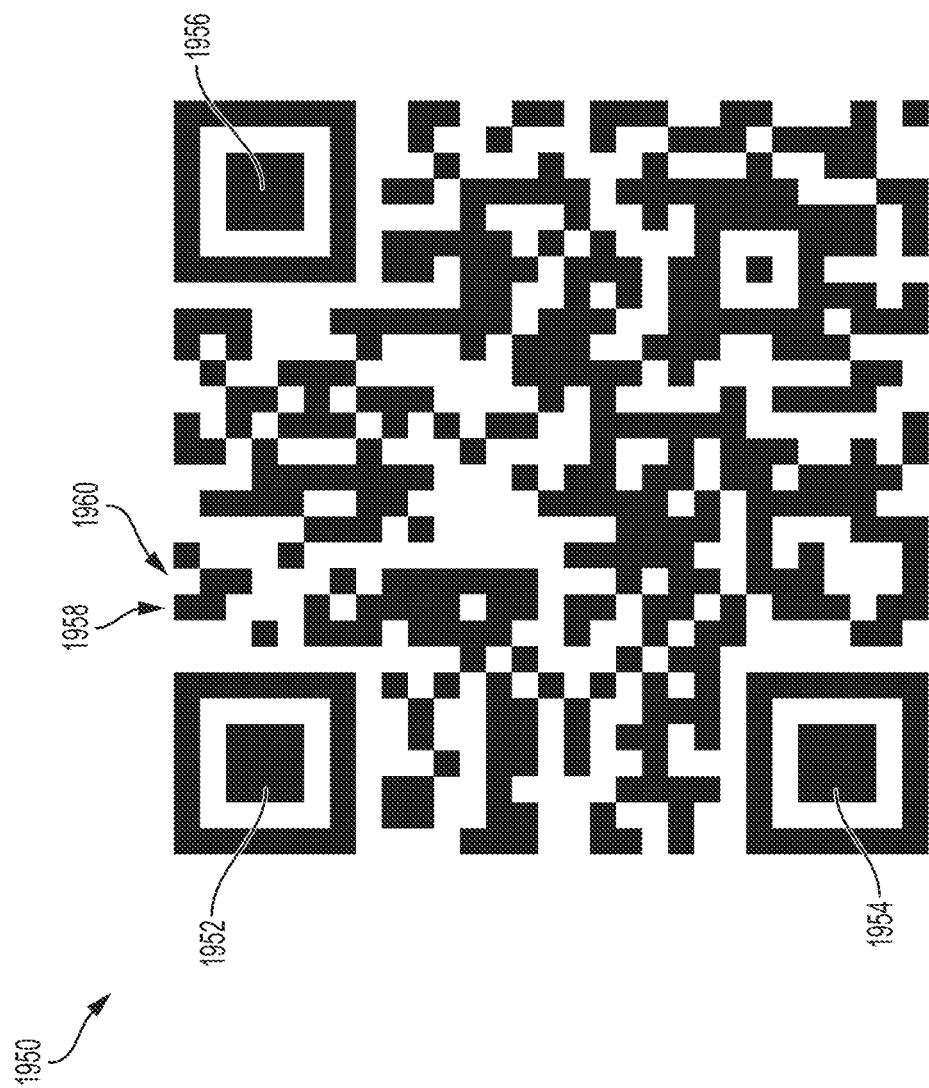
FIG. 19B shows an exemplary QR Code symbol, according to some examples.

Various 2D symbologies can be used to encode information, such as DataMatrix, QR Code, Aztec Code, MaxiCode, Vericode, and other 2D symbols, as discussed above. FIG. 19A shows an exemplary DataMatrix 2D symbol 1900, according to some examples. The left-most column 1902 and the lower-most row 1904 form the DataMatrix "L," which are present for all DataMatrix symbols and used to locate and determine the orientation of DataMatrix symbols in an image. The DataMatrix symbol 1900 is made up of a set of modules (e.g., the black and white modules, such as the black module 1906 and the white module 1908) that are used to encode information for the symbol. FIG. 19B shows an exemplary QR Code symbol 1950, according to some examples. Instead of an "L" pattern like in the DataMatrix symbol 1900, the QR Code symbol 1950 includes three bullseyes 1952, 1954 and 1956 that are used to locate and determine the orientation of the QR Code symbol 1950 in an image. Like the DataMatrix symbol 1900, the QR Code symbol 1950 includes a set of modules that are used to encode information for the symbol, such as the black module 1958 and the white module 1960.

Various multi-width 1D symbologies can be used to encode information, such as Code 128, Code 93, UPC-EAN, PDF417, MicroPDF, DataBar, and other symbologies. As discussed above, FIG. 2 shows an exemplary barcode 200 generated using multiple-width symbology Code 128, with a set of modules 202A-202E.

As noted above, there can be a number of reasons that an imaging application may capture under-resolved symbols, such as under-sampling and/or blur. For example, some imaging applications use mounted sensors to image objects moving along a conveyor belt. Such sensors can be mounted sufficiently far away from the conveyor belt (and thus objects carried by the conveyor belt) to achieve a larger field of view (FOV). However, to achieve a larger FOV, the trade-off is a reduced resolution of the objects and/or symbols on the objects, which can result in under-resolved images of the objects and symbols. As another example, the symbols may be located towards the bottom-side of an object so that the codes are further away from the sensors, etc., which can also lead to under-resolved images of the symbol. It can therefore be desirable to use techniques to decode under-resolved 1D and 2D symbols.

Techniques exist to decode under-resolved 1D symbols. For 1D symbols, the techniques can leverage character aspects of the symbol. Also, since there are significantly fewer possibilities of values for a 1D symbol character compared to a 2D symbol, 1D techniques can largely try all possible valid combinations of values to decode a symbol. For example, for 128 code barcodes, there are 103 regular character patterns, so given this limited set of patterns some 1D techniques essentially just try all character patterns. For example, the techniques described herein provide for decoding under-resolved 1D symbols.

Unlike with 1D symbols, it is often not feasible to determine unknown module values by simply trying all possible combinations of module values. For example, enumerating and evaluating all possible binary 2D patterns for a 2D symbol ($2^n$, where n is the number of modules in the symbol) is often impractical and cannot produce a result in a realistic timeframe. Trying all possible binary 2D patterns in a brute-force fashion can also be less sensitive to module errors because a module is a very small percentage of the entire pattern and therefore has a small effect on the overall error relative to other errors such as those due to inaccuracies in the found location of the symbol. As another example, enumerating and evaluating all possible multi-width patterns for a 1D symbols is similarly impractical without considering individual characters independently.

The techniques described herein provide for decoding under-resolved images of symbols, such as the 2D barcodes shown in FIGS. 19A-19B and the multi-width 1D barcode shown in FIG. 2. As discussed further herein, the techniques can include developing a mathematical relationship between the known pixel values in the image of the symbol, and the unknown (black or white) module values. For example, in some non-limiting embodiments, an under-constrained set of linear equations can be represented as a sparse sampling matrix. Each coefficient element (i,j) the sampling matrix can be an estimate of the percentage overlap between the $i^{th}$ pixel in the image and the $j^{th}$ module in the symbol. The techniques can include analyzing the coefficients and values for the pixels that modules overlap, logically deducing module possibilities, and/or filling in module values in an iterative fashion. Considering 2D symbol modules in an iterative fashion can quickly reduce the number of overall possibilities (e.g., much less than $2^n$), which can make determining unknown 2D module values feasible.

Figure 20:
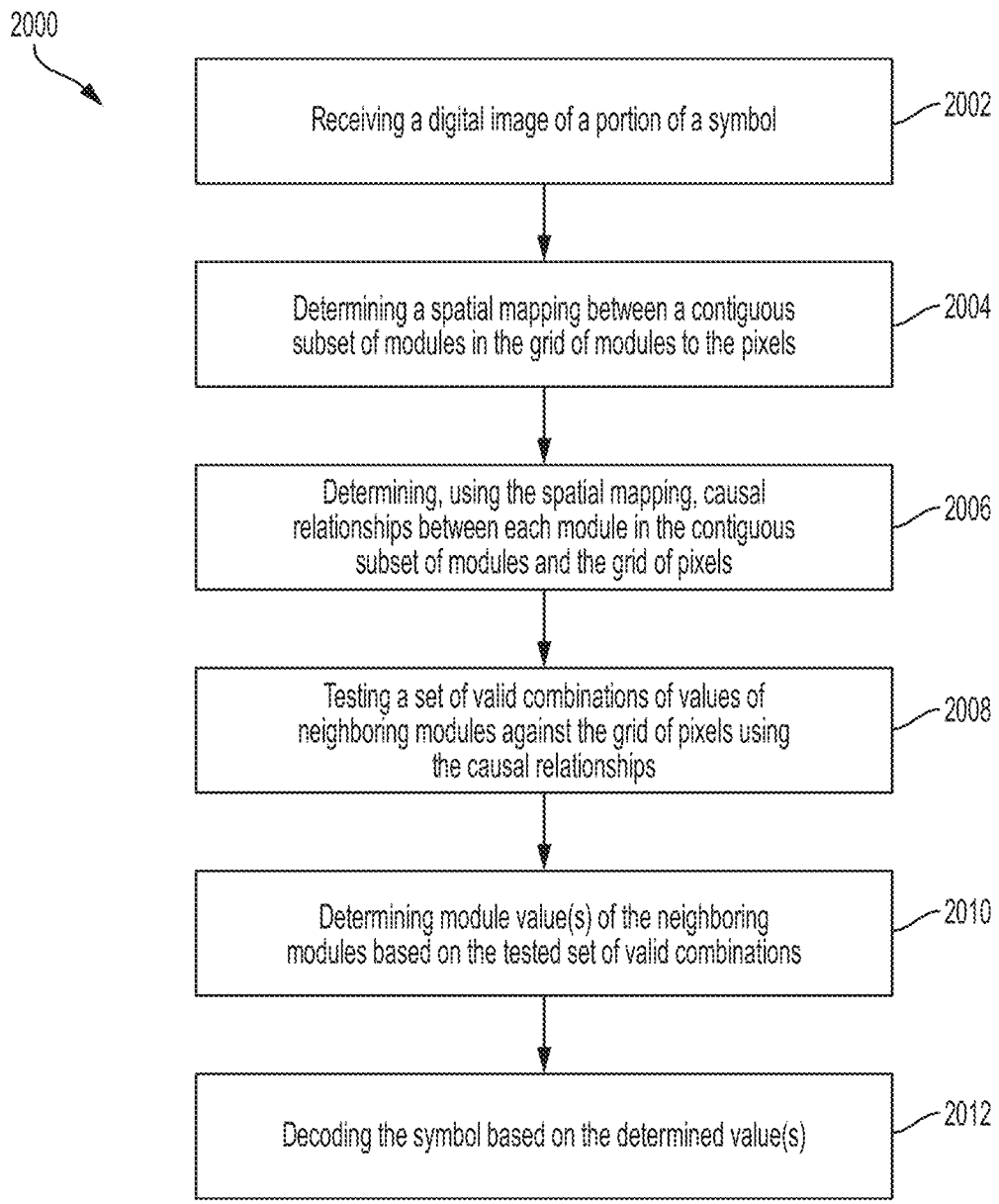
FIG. 20 shows an exemplary computerized method for decoding an under-resolved 2D symbol, according to some embodiments.

FIG. 20 shows an exemplary computerized method 2000 for decoding an under-resolved symbol, according to some embodiments. At step 2002, an image processing device receives a digital image of a portion of a symbol. The image processing device can be a barcode reader, an external computing device coupled to the barcode reader, and/or any other computing device configured to perform the techniques discussed herein. At step 2004, the image processing device determines a spatial mapping between a contiguous subset of modules in the grid of modules to the grid of pixels. At step 2006, the image processing device determines, using the spatial mapping, causal relationships between each module in the contiguous subset of modules and the grid of pixels. Each causal relationship can represent the degree of influence that the value of a module has on each of the values of a subset of pixels in the grid of pixels. At step 2008, the image processing device tests a set of valid combinations of values of two or more neighboring modules in the contiguous subset of modules against the grid of pixels using the causal relationships. At step 2010, the image processing device determines a value of at least one module of the two or more neighboring modules based on the tested set of valid combinations. At step 2012, the image processing device decodes the symbol based on the determined value of the at least one module.

Referring to step 2002, symbol readers, such as barcode readers, are devices for automatically decoding symbols. Symbol readers include image-based symbol readers that acquire a discrete image of the barcode, such as by using camera optics and an imaging sensor (e.g., a CCD array). The resulting image can be a 1D or 2D sampling of the entire barcode. Each image sample, or pixel, of that image is itself a measurement of the average reflectance of a small area of the barcode.

Figure 21:
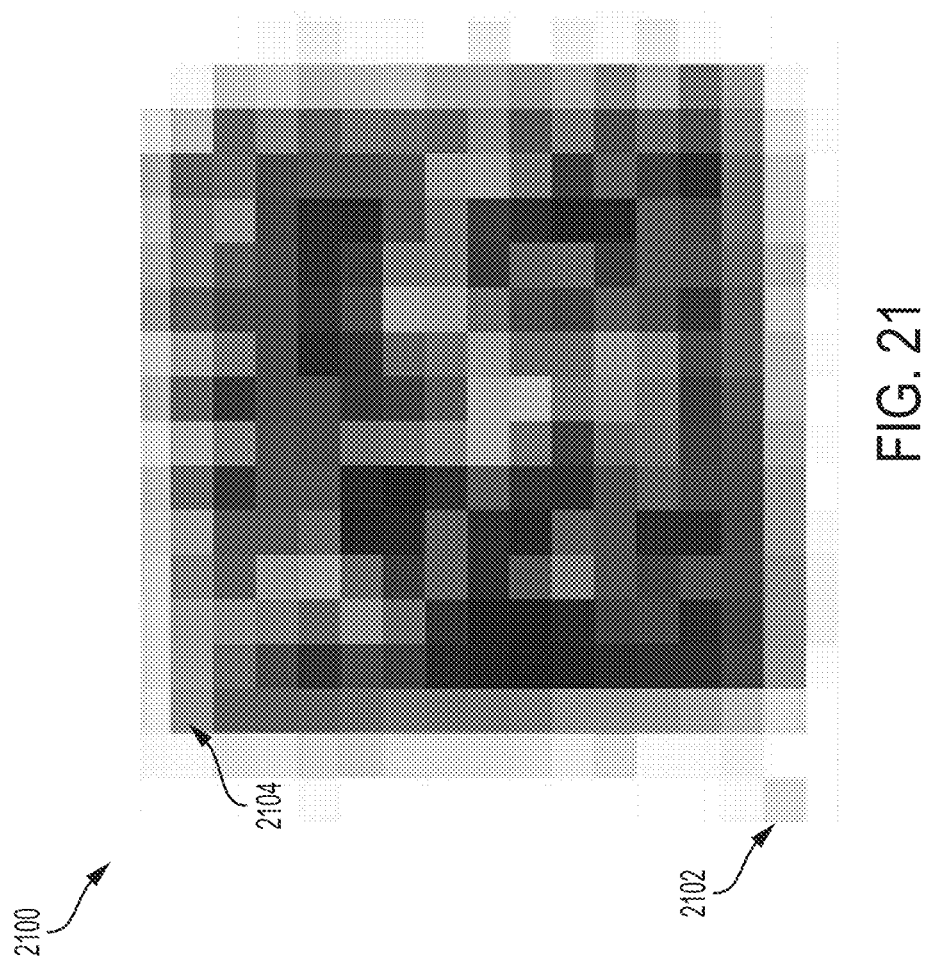
FIG. 21 shows an exemplary image of a 2D symbol, according to some embodiments.

FIGS. 21-25B are used as illustrative examples of applying the techniques disclosed herein to decode a 2D barcode. FIG. 21 shows an exemplary image 2100 of a 2D symbol, according to some embodiments. The image 2100 includes a set of pixels (e.g., pixels 2102 and 2104) with associated pixel values that indicate the darkness of each pixel. Each image may have a set of pixel values that can have a value within a predetermined brightness range, such as from 0 to 255 for 8-bit values. In some examples, such as for grayscale images, 0 may represent black and 255 may represent white. However, in practice the imaging system may not achieve the full range of colors, such that the range may be more limited than the values otherwise allowed for pixels in the image.

In some embodiments, the techniques use the envelope of the image signal to decode symbols. The envelope includes the maximum and minimum pixel values of the signal across the image, where the maximum value of the envelope indicates white for the image (e.g., but does not necessarily correspond to the theoretical maximum value allowable for the image), and the minimum value indicates black for the image (e.g., but does not necessarily correspond to the theoretical minimum value allowed for the image). Thus, the pixel values can be mapped between the local foreground (dark) and local background (light), yielding a pixel value that ranges between 0 and 1. Thus, the specific envelope for the image can allow the system to normalize the signal values to determine a measure of how "black" or "white" a pixel is for the particular application. For example, a symbol in an image could have a gradient due to the angle of the lighting, where the symbol is a uniform gray on one side, but black on another side. Determining a signal envelope can normalize, for example, for lighting differences between different parts of an image, for shadows, and/or the like. The signal envelope can be determined, for example, in a manner similar to what is described herein, but using 2D rather than 1D processing. As another example, the signal envelope can be determined by computing the tails of the histogram within a local region around each pixel.

Figure 22A:
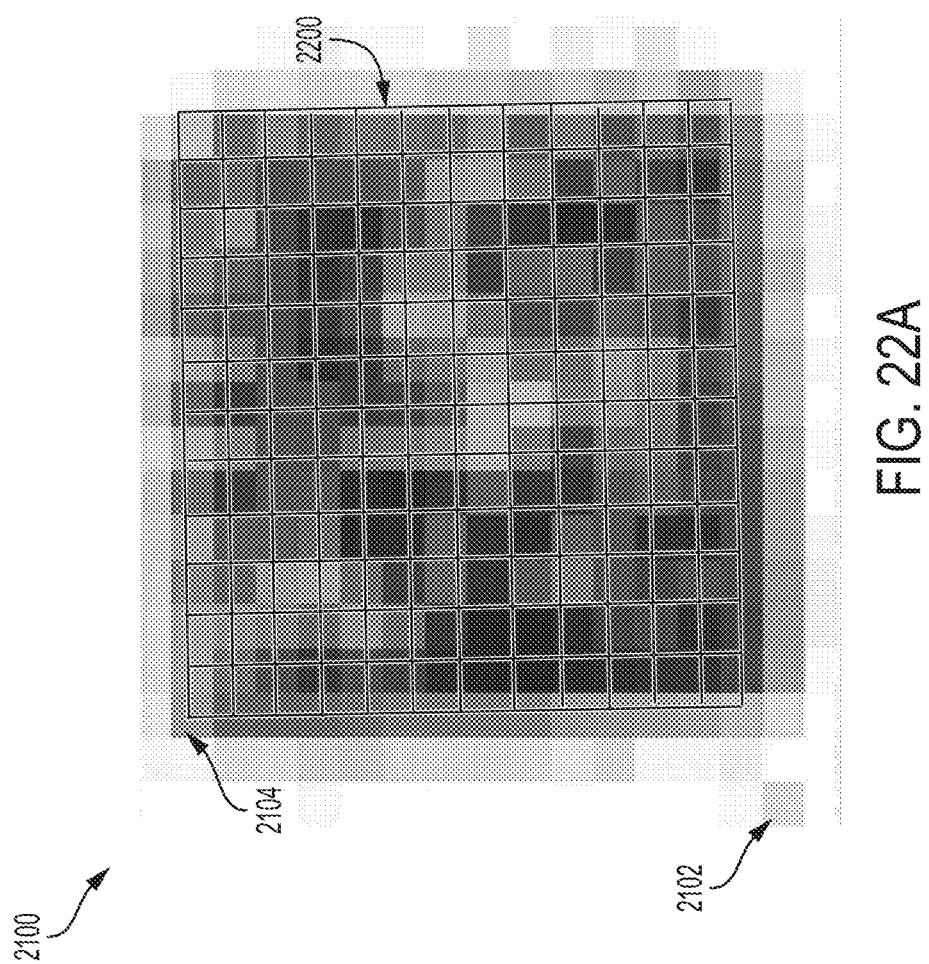
FIG. 22A shows an exemplary module grid for a 2D symbol overlaid on top of the image from FIG. 21, according to some embodiments.

Referring to step 2004, FIG. 22A shows an exemplary module grid 2200 for a 2D symbol overlaid on top of the image 2100 from FIG. 21, according to some embodiments. In this particular example, the pitch of the module grid (e.g., module size) is approximately the same as the pixel grid pitch, which means that the resolution is approximately one pixel per module. However, this not always the case. Extremely low resolution images can result in the module pitch being significantly larger than the pixel grid pitch, while high resolution images can result in the module grid pitch being much smaller than the image grid pitch. The techniques can include first locating the module grid of the symbol with respect to the pixel grid of the image. In the case of 2D symbols, the grid can be located, for example, using finder patterns on the symbol (e.g. the "L" pattern of a DataMatrix symbol, or the bullseye patterns of a QR Code).

The image processing device can store one or more module grids for 2D symbols, which represent the two-dimensional layout of modules for the symbol. The image processing device can locate the module grid 2200 with respect to the image 2100 to determine a spatial mapping between the modules in the module grid and the grid of pixels in the image. The relationship between the module grid 2200 and the pixel grid in the image 2100 can reflect, for example, how much each module overlaps pixel(s) in the image 2100. FIG. 22A illustrates such a relationship at a high level by showing the 2D grid of modules 2200 superimposed on the pixel grid. The relationship between the module grid 2200 and the pixel grid of the image 2100 can therefore reflect how much each module influences each of the pixels. Most of the influences will be zero (e.g., for the majority of the pixels in the image that do not overlap a particular module).

FIG. 22B shows an example of a portion of the sampling matrix 2270 that indicates the percentage that each of the pixels in the pixel grid 2250 are overlapped by an exemplary module 2262 of the module grid 2260, according to some embodiments. In some embodiments, the percentages for a given module can largely add up to the module size. In this example, the module size is approximately 1, or more approximately 0.9. In some embodiments, the percentages across all modules for a particular pixel can add to approximately 100%. As shown, the module 2262 overlaps four pixels in the pixel grid 2250, pixels 2252, 2254, 2256 and 2258. The portion of the sampling matrix 2270 shows the overlap percentages, namely 15%, 20%, 25%, and 30%, which indicate the amount that the module 2262 overlaps pixels 2252, 2254, 2256 and 2258, respectively (that is, the portion of each of these pixels that is covered by module 2262). The remaining values in the sampling matrix portion 2270 are 0%, since the module 2262 does not overlap any of the other pixels in the pixel grid 2250. For simplicity, FIG. 22B only shows a portion of the pixel grid 2250 and the sampling matrix 2270, as indicated by the dotted arrows. In some embodiments, smaller sampling matrices are used other than those that represent the entire image, such as just a 3×3 sampling matrix, and/or a 1×9 sampling matrix, as discussed further herein. Such smaller sampling matrices can be stored as such, and/or derived from a larger sampling matrix.

In some embodiments, the relationship between the module grid and the pixel grid can be determined using one or more locating techniques. The techniques may be determined based on, for example, the number of pixels per module (PPM). For example, certain techniques can be used for certain PPM values or ranges, and the techniques can be run (e.g., individually, sequentially, and/or the like) until one technique is able to identify certain characteristics of the symbol in the image. In some embodiments, the PPM may not be known. In such a case, one or more techniques, such as those discussed further herein, may be run to locate the module grid to determine the PPM. For example, techniques used for images with the highest PPM can be tried first, then the techniques for the next lowest PPM, and so on, until the symbol position and orientation is determined in the image.

The example that follows discusses different techniques used for different PPM ranges. This example is intended to be illustrative only, as different ranges, numbers of ranges, values, and/or the like can be used without departing from the spirit of the techniques discussed herein. According to this non-limiting example, down to a certain PPM (e.g., 2 PPM), the module grid relationship can be determined by locating known pattern(s) in the symbol. For example, for a Data Matrix symbol, the techniques can locate the "L" pattern on two of the sides of the symbol. Once the "L" pattern is located, the techniques can find the timing pattern on each of the other two sides by detecting edges along a 1D scan passing through them. An example of such a technique is the reference decode algorithm described in the ISO/IEC 16022 specification for the Data Matrix symbology, which is hereby incorporated by reference herein in its entirety. While this example is for a Data Matrix symbology, it should be appreciated that decoding other symbologies can be done in a similar manner by locating known features in the symbol. For example, a QR Code can be determined in a similar manner by locating the bullseye portions, as specified in the "Reference decode algorithm for QR Code 2005" section of the ISO/IEC 18004 specification for the QR Code symbology, which is hereby incorporated by reference herein in its entirety. The grid size can also be determined in the manner described in the reference decode algorithm.

For lower resolutions (e.g., from 2 PPM down to 1.2 PPM), the techniques may not be able to locate known symbol patterns (e.g., the "L" pattern for the Data Matrix symbology). For example, the system may not be able to locate known symbol patterns because aspects of the symbol, such as the symbol edges, are under-sampled. The techniques can first perform pixel processing to enhance the symbol features, such as up-sampling the image, to increase visibility of features of the symbol. Up-sampling can include, for example, interpolating values between pixels in a non-linear fashion. For example, one could employ polynomial interpolation.

For even lower resolutions (e.g., below 1.2 PPM), the image may be so degraded (aliased) that, e.g., even with pixel processing, certain symbol features may be nearly impossible to detect. For example, the system may not be able to detect known features and/or timing patterns. If the techniques associated with higher PPMs fail, the techniques can be configured to locate the outer rectangle of the symbol (e.g., with subpixel accuracy), and to determine the grid size using a greyscale digital waveform rather than looking for edges. For example, a vision technique such as blob analysis, generalized Hough transform, and/or the like can be used to locate the boundary of the 2D symbol (e.g., a rectangle as shown in FIGS. 19A and 19B). In some embodiments, the techniques used may depend on the lighting conditions of the particular vision system. For example, more robust methods may be used. For example, in some embodiments the system can be configured to detect edges, group the edges into contours, reduce the number of vertices in the resulting polylines (e.g., using a technique like the Ramer-Douglas-Peucker algorithm), and analyze the resulting image shapes to recognize four-corner-polygons with roughly 90 degree angles. The subpixel location of the four sides of the rectangle could then be determined by fitting a line to each of the groups of sub-pixel edges along of the four sides of the rectangle.

In some embodiments, the grid size of the symbol is known before decoding the symbol. For example, the grid size can be fixed, and/or the grid size can be trained on prior images. For example, the system can be trained with high-resolution images (e.g., images with a high PPM). During run-time, even if the system can't easily determine how many rows there in the grid from a very low resolution image, the system can assume the symbol has the same grid size with which it was trained.

If the grid size is not known, the system can be configured to automatically determine the grid size along each dimension. For example, the grid size can be determined by scanning two opposite sides of the rectangle (e.g., inwards from the outer boundary of the rectangle) by performing a 1D projection. In some embodiments the scanning can be performed, for example, in much the same way that a 1D barcode is scanned. For example, techniques for scanning a 1D barcode are discussed above. Once the system determines where the timing pattern begins and ends, the system can simply try all timing patterns corresponding to each of the practical integer number of modules in between. This technique can be used only in certain situations, such as for a certain PPM range. For example, the technique can be used for codes with a PPM below an upper PPM limit (e.g., 1.2, which would otherwise be handled by the retries described above), and a practical lower PPM limit (e.g., 0.8) that can be decoded. The minimum number of modules can be determined based on the integer closest to the length of the timing pattern divided by the upper PPM limit (e.g., 1.2 continuing with the example above), while the maximum is given by the length divided by the lower limit (again, e.g., 0.8). Using such constraints can, for example, keep the number of possible patterns to try to a minimum.

To determine which of the possible module size patterns is best, in some embodiments the system can be configured to determine, for each timing pattern, a sampling coefficient matrix, and to use the sampling coefficient matrix to determine a score. The pattern with the highest score can be determined to correspond to the correct module size for that dimension of the symbol. Such a technique is discussed above for decoding characters of a 1D barcode symbol.

Figure 23:
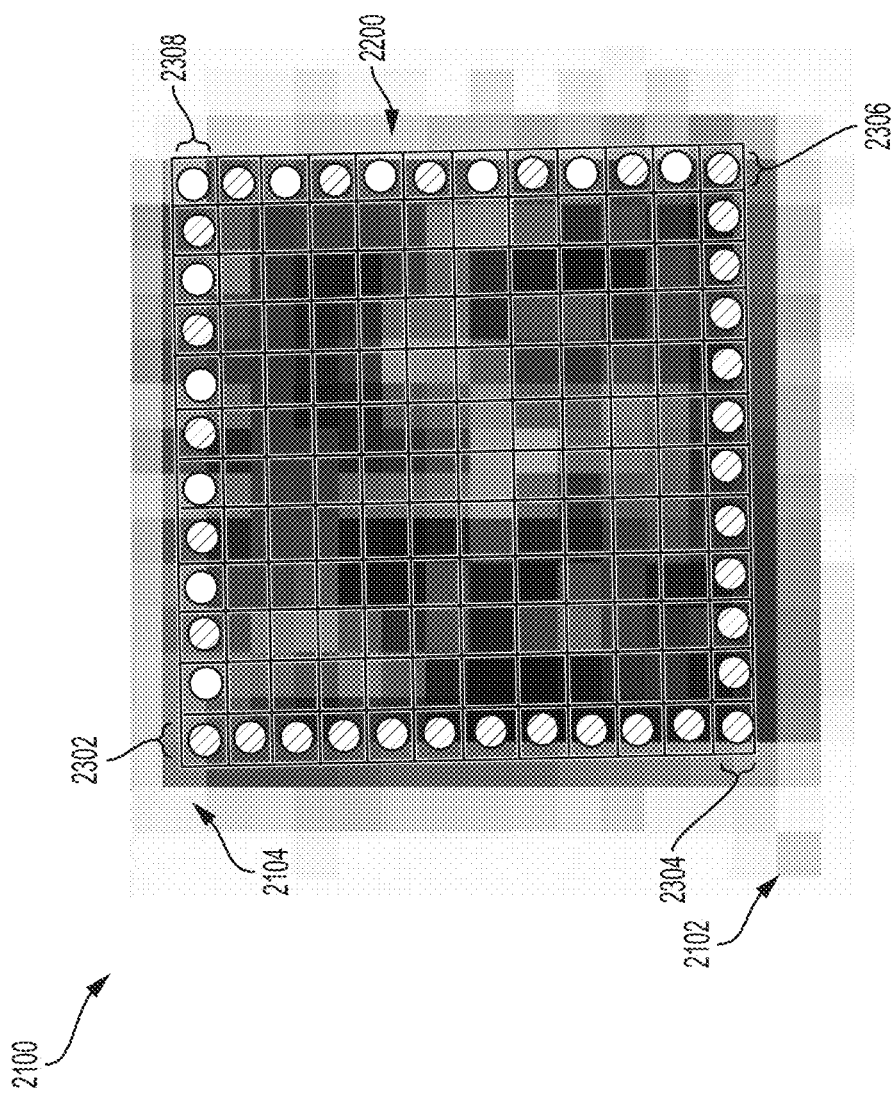
FIG. 23 shows the exemplary module grid in FIG. 22A, populated with known structure values of the 2D symbol, according to some embodiments.

Once the system determines the module grid relationship, the system can set module values that correspond to known structures in the symbol. FIG. 23 shows the exemplary module grid 2200 in FIG. 22A, populated with known structure values of the 2D symbol, according to some embodiments. In this example, the left-most column 2302 of the module grid 2200 is populated with the upper portion of the "L" of the Data Matrix symbology, the lower-most row 2304 is populated with the lower portion of the "L," and the right-most column 2306 and the upper-most column 2308 are populated with the timing pattern. While this embodiment populates known structures for a Data Matrix symbology, it should be appreciated that known structures for other symbologies being decoded could be populated, such as the bullseye patterns for a QR Code symbology, and/or the like.

The known structures can be filled into the module grid based on the orientation of the symbol. In some embodiments, the system can learn the orientation of the grid, e.g., to determine whether the "L" is on the left/bottom as shown in FIG. 23, or whether it has a different position, such as along the top/right of the symbol, and/or the like. In some embodiments, the orientation can be determined during training. In some embodiments, other techniques can be used to determine where known features are located in the image (e.g., whether the "L" is on the left/bottom of the symbol). For example, if the system already knows the grid size, but does not know the orientation of the symbol, then the system can be configured to use techniques to identify the orientation once the system identifies the grid. In some embodiments, the system can average the pixels under the grid location along top, bottom, left, and right sides, and take the averages with the lowest gray value to correspond to the L pattern. Other techniques can be used as well to identify known features of the symbol to determine orientation.

In some embodiments, some of the known structures may be data modules of the symbol that have been determined with high confidence in a prior image acquired of the same physical symbol. These modules may have been determined in higher resolution images (e.g. because the symbol is moving away from the camera over time), or in low resolution images (e.g., using one or more of the techniques described herein). For lower resolution images, it is often the case that the symbol somehow wasn't successfully decoded, but that certain modules were deduced with high certainty, and that those modules deduced with high certainly are those that are difficult to deduce in the current acquired image due to a significant shifting of the module grid relative to the pixel grid.

Figure 24:
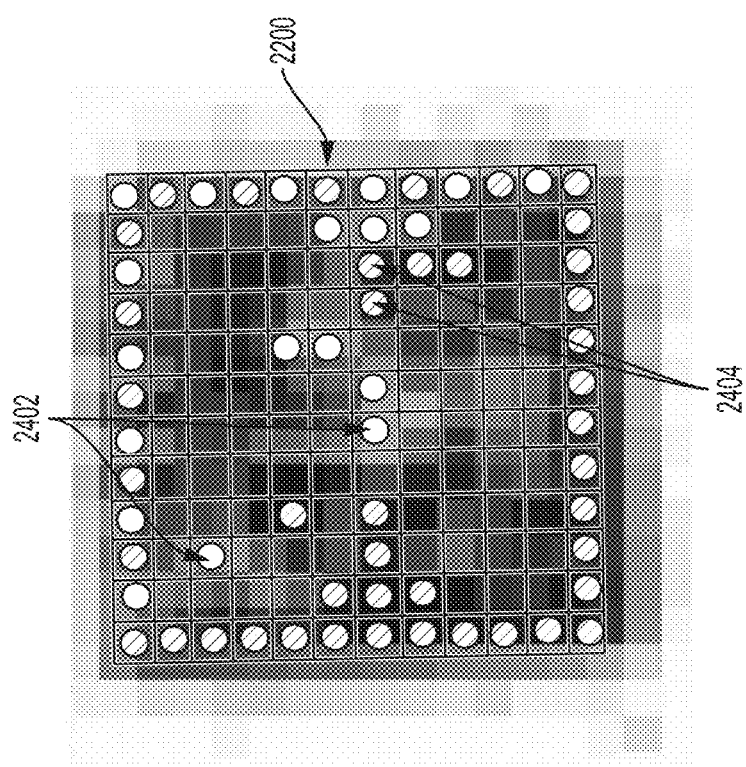
FIG. 24 shows modules of the exemplary module grid deduced based on relationships between the modules and the pixels, according to some embodiments.

Referring to step 2006, the image processing device can use the causal relationships determined between the modules in the module grid and the pixels in the image to deduce a first set of modules (e.g., modules that have a high degree of overlap with associated pixels). FIG. 24 shows modules of the exemplary module grid 2200 deduced based on relationships between the modules and the pixels, according to some embodiments. The deductions shown in FIG. 24 include deduced white modules, such as modules 2402, and deduced black modules, such as modules 2404. For example, the image processing device can populate each module that overlaps to a very high degree, such as modules where the sampling coefficients are above an overlap threshold. For example, an overlap threshold of 90% (or some other percentage) may be set to configure the system to set module(s) if 90% of the area of the module is overlapping a set of one or more pixels that all have values within 90% of each other. The threshold can be much smaller than 90%. For example, it may be that modules with a percentage overlap (e.g., the percentage of the pixel overlapped by the module) of just 30% is sufficient to determine the module value. For example, a lower threshold may be used depending on the accuracy of the grid. As a general matter, the techniques can use logic to exploit the fact that it is unlikely for the module to have one value and the pixel it overlaps substantially to have a value corresponding to the opposite extreme. For example, a black module that significantly overlaps a pixel should result in a grey or black (but not white) pixel value, and a white module that significantly overlaps a pixel should result in a grey or white (but not black) pixel value. Therefore, modules that overlap a foreground (darkest) pixel to a certain degree can be set to black, and modules that overlap a background (lightest) pixel to a certain degree can be set to white.

The modules deduced in this step may be associated with pixels that are close to the foreground, and/or close to the background. Therefore, in some embodiments, the pixels populated in step 2006 can be modules associated with uniform black or white areas of the image. As discussed above, when referring to a pixel as being either "white" or "black," the measure of whether a pixel is black or white can be determined relevant to the signal envelope of the image. Thus, in some embodiments, all of the darkest modules associated with the darkest pixels for the signal envelope are deduced, as well as all light modules associated with the lightest pixels of the signal envelope are deduced. The signal envelope of the image can therefore be used to normalize the range of white and black pixels to determine the range of a particular pixel for the signal envelope.

Figure 25B:
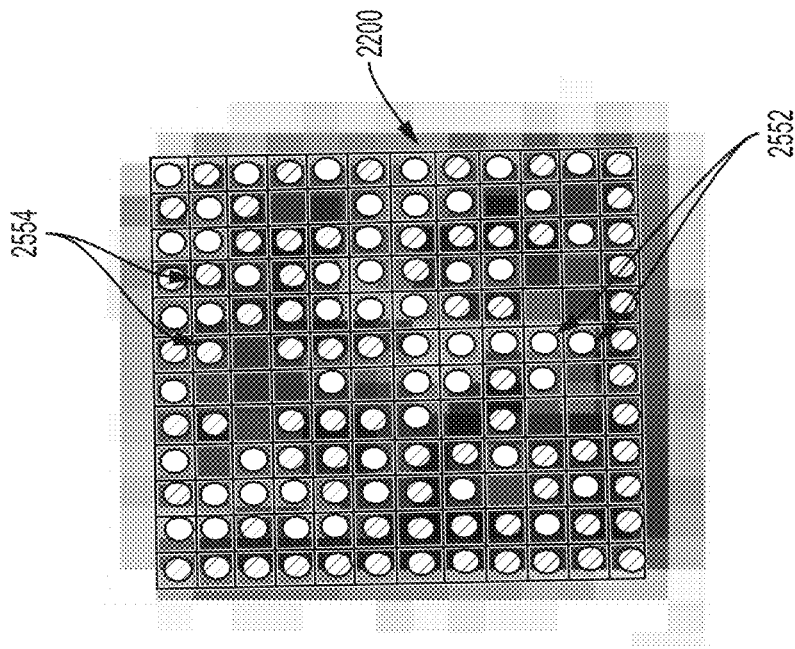
FIG. 25B shows additional module values determined, including based on the new modules determined in FIG. 25A, according to some embodiments.
Figure 25A:
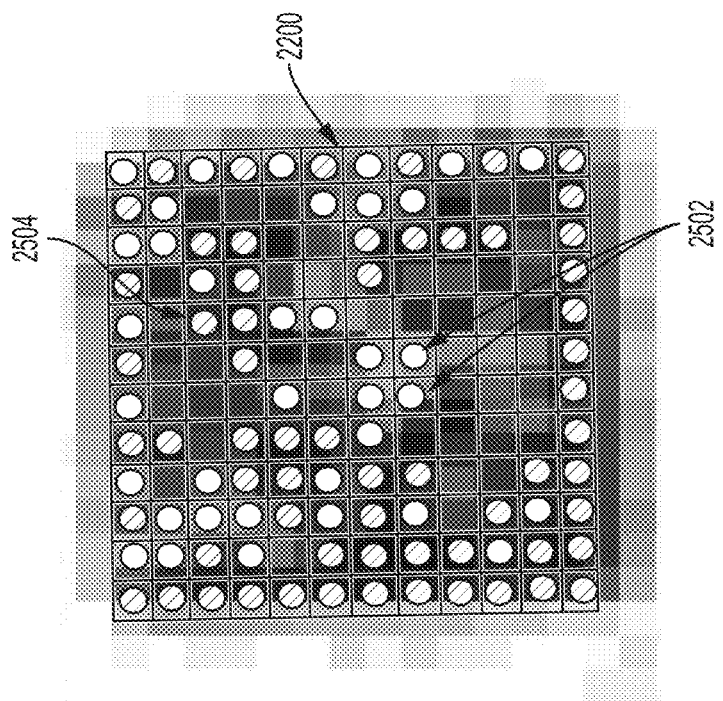
FIG. 25A shows new white and black module values determined based on known modules, according to some embodiments.

Referring further to step 2006, the image processing device can determine other unknown modules by leveraging known modules. FIGS. 25A and 25B show examples of additional modules of the exemplary module grid determined based on known modules, according to some embodiments. FIG. 25A shows new white module values determined (including, e.g., module values 2502) and new black module values determined (including, e.g., module values 2504) based on known modules, including modules determined in step 2004. Similarly, FIG. 25B shows additional module values that are determined, including new white module values (including, e.g., module values 2552) and new black module values (including, e.g., module values 2554), which can be determined based on the new modules determined in FIG. 25A. The image processing device can examine pixels having gray values in the center of the range (e.g., between foreground and background of the signal envelope). For example, the image processing device can deduce additional modules by determining pixels associated with a certain number of modules. For any such pixels that are (a) overlapped largely by only two modules, with (b) one of the module values already having been determined, the image processing device can set the other of these two modules to the opposite value as one that is known.

The new module values can be determined based on known module values based on the PPM. For example, for codes with PPM>0.5, there can be up to 9 modules overlapping any given pixel. The image processing device can rank each of the nearest 9 modules in the located grid by percentage overlap; that is, how much the pixel is overlapped by each module. The image processing device can add the top two percentages (the modules with the largest overlap) to determine if the sum is above a threshold (e.g., a threshold of 90%). If the threshold is met, and the value of just one of these two modules has already been determined, then the value of the other of these two modules can be set to the opposite. For example, if the value of one module significantly overlapping a grey module is white, then the value of the other is determined to be black (otherwise, we would have a light pixel, not a grey pixel). The deduction technique can include variations to the example discussed previously. For example, a threshold can instead be compared to the 3 modules having the greatest overlap, and if two of them are known and have the same value, then the other one must have the opposite value. Therefore, the techniques can use the known modules, coupled with degrees of overlap between the modules and pixels, to deduce values for new modules.

As an illustrative example, when using a sampling matrix such as shown in FIG. 22B, the coefficients of the sampling matrix can be percentages indicating the degree that each pixel is overlapped by an associated module (e.g., the percentage portion of each pixel that is covered by the associated module). The overlap percentages can be used to leverage already deduced module values (e.g., those associated with known features of the symbol) to figure out other neighboring modules that are around the known module. For example, for a sampling matrix with nine coefficients, a pixel that is overlapped largely by only two modules will have two coefficients that are roughly equal (e.g., approximately 0.5 each) and much larger than the other 7 coefficients (e.g., which are approximately 0 for the rest).

As new modules are determined, the image processing device can iteratively determine the additional set of unknown modules. The techniques can leverage the already known module values to figure out additional values based on the pixel/module overlap as discussed herein. Initially, there may be many groups of neighboring modules that are unknown, but by iteratively searching for pixels/modules that have a certain overlap, as module values are determined those additional determined values can be used to populate further module values.

Referring to steps 2008 and 2010, once no further module values can be deduced (e.g., as discussed above in conjunction with steps 2004 and 2006), the image processing device can test a set of valid combinations of values to determine further unknown modules. In some embodiments, now that a current set of pixels has been determined, the search space for the remaining modules has been reduced. The image processing device can determine (e.g., iteratively) the now smaller set of remaining unknown modules.

In some embodiments, for each module, the image processing device can try remaining valid combinations of module patterns (e.g., 2×2, 3×3, and/or the like) that include one or more determined pixels. For example, the image processing device can try 3×3 module patterns having the unknown module as the center, until no such more deductions can be made. Using a 3×3 pattern as an example, each module would have $2^9=512$ possibilities. But in many cases there will be far fewer than the maximum combination. For example, the module values of the 3×3 pattern that have already been determined can reduce the number of possibilities. As another example, some of coefficients for certain modules of the 3×3 can be sufficiently small such that the module value makes little difference to the computation. In some embodiments, the possible module patterns could be performed as described above for multi-width 1D symbologies.

Even with many of the modules having been determined in previous steps, recursively testing all of the possibilities may still be very time-consuming. Testing all combinations may also not work well, e.g., since the errors between the correct pattern and some of the incorrect patterns may be difficult to differentiate. In some embodiments, a sampling matrix can be used to determine additional modules. For example, for each pixel that is overlapped by a module which hasn't yet been determined, a 1×9 sampling matrix can be used to determine the module value. The system can multiply the 1×9 sampling matrix by an unknown vector of the 9 nearest binary (0 or 1) module values (representing a 3×3 module pattern) to determine the module value. The pixel sampling matrix can be a section of a row of a larger sparse sampling matrix that relates every pixel within the image to every module of the grid, where each element (i, j) in the matrix represents the percentage that the pixel corresponding to row i of the matrix is overlapped or covered by the module corresponding to column j of the matrix. For each possible combination of binary values for the nine modules of the 3×3 module pattern (up to 512, but fewer in general when accounting for the module values that have already been determined), an error can be computed between the actual pixel value and the one that results when multiplying through the sampling coefficients. Any of the combinations that result in a pixel value error that is within an acceptable error threshold can be considered possible solutions, while those resulting in errors above the error threshold are eliminated from consideration. If there is only one combination below the error threshold, then the unknown module values of the corresponding 3×3 module pattern can be set accordingly. If there are multiple patterns, each of the combinations resulting in an error below the error threshold are recorded for that pixel as a nine-bit integer.

In some embodiments, the system can be configured to process certain pixels first (e.g., to lead to a more likely chance to decode module values). For example, the system can be configured to first process pixels with a large number of overlapping modules have already been determined. For example, the system can be configured to focus on first processing pixels around the outside of the symbol (e.g., near the timing patterns and L finder pattern, for which the modules will have been determined). Using such a technique, with each iteration, the values for the modules will be determined closer and closer to the inside of the symbol and/or inwards towards otherwise large spaces of unknown modules.

After all of the pixels within the region of the grid have been considered and their nine-bit integers recorded, additional modules can be determined through process of elimination. For example, the system can examine the consistency of the remaining possible combinations of each pixel against the remaining possible combinations of each of the neighbors associated with the module. For example, the system can examine the consistency of the 8 neighbors for a particular module, taking advantage of the fact that the 3×3 module patterns for a pixel overlap substantially with those if its 8 neighbors. In effect, the system can use the fact that each possible combination for a particular pixel is only compatible with certain combinations for the neighboring pixels to determine the correct combination.

In some embodiments, such a comparison of a module to its neighboring modules can be used to generate a non-directed constraint graph. The nine-bit integers representing the stored combinations of binary values for the nine modules of the 3×3 module pattern for each module can be populated as the nodes of the graph, and the linkages to each of the consistent nine-bit integers for neighbors can be the edges in the graph. Two nodes are considered consistent if the region of overlap between their respective 3×3 module patterns in the module grid have the same combination of binary values.

Determining the remaining modules can therefore include determining a consistent and unique set of edges between each pixel and its 8 neighboring pixels, such that only a single node is connected at each pixel, with the other nodes and their edges having been removed. The system can use the chosen node for a pixel to determine the correct combination of overlapping module values. The system may be able to remove certain nodes in the graph, as well as their associated edges. For example, the system can remove node(s) that are not connected by at least one edge to at least one node of each neighboring pixel. Removing such nodes may remove a number of nodes in the graph, particularly nodes for pixels that are adjacent to another pixel having only a single node. Such node removal can be performed iteratively until there are no such nodes left in the graph. Even removing certain nodes, such as described above, there may still be multiple nodes (combinations) remaining at certain pixels. In some embodiments, the system can be configured to test the removal of certain choices. For example, the system can be configured to select a node for one of the pixels (e.g. one that has only two possibilities), such as through random selection. The system can remove the other nodes for that pixel, and repeat the node removal process discussed previously. Performing such selection and removal may result in determining the other pixels, or it may result in removing all nodes for other pixels. In the latter case, the system can determine that the selected node should be removed. Otherwise, the system can be configured to attempt to decode the module by computing the module values for all possible choices stored for this one pixel (and/or also for other pixels), to determine whether it yields a successful decode. The system can rely on built-in error correction to keep the system from misreading the symbol. If the symbol doesn't decode, then the system again knows the selected node was incorrect, and therefore the node should be removed.

The following provides an example of determining a constraint graph. Let G be the $(n+2)\times(m+2)$ matrix of module values deduced so far for a 2D symbol, where n is the number of rows of the symbol, and m is the number of columns. In some embodiments, there can be additional rows and/or columns (e.g., two additional rows and two additional columns) in the matrix, which can be used on the side(s) of the symbol to encode a module-wide portion of the quiet zone.

Each element of G can be denoted $g(k, l)$, where k ranges from 0 to n+1, and l ranges from 0 to m+1, and $g(k, l)=0$ (dark), 1 (light), or ? (unknown). For each module $(k, l)$, let $S(k, l)$ be the 3×3 sub-matrix of G centered at module k, l. Each element of $S(k, l)$ is denoted $s(k, l, i, j)$, where i is the row index and ranges from −1 to 1, and j is the column index and ranges from −1 to 1. Also note that $s(k, l, i, j)=m(k+i, l+j)$ for all i and j.

For any given sub-matrix $S(k, l)$, there will be $2^u$ possible combinations of possible patterns, where $u(k, l)$ is the number of elements of $S(k, l)$ that are unknown (number of i,j coordinates for which $s(k, l, i, j)=?$). Let each possible pattern be denoted by the 3×3 matrix $M(k, l, z)$, where z ranges from 1 to $u(k, l)$. Each element of $M(k, l, z)$ is denoted $m(k, l, z, i, j)=0$ or 1. Note that $m(k, l, z, i, j)=s(k, 1, z, i, j)$ if $s(k, 1, z, i, j)$ is 0 or 1 (known) (e.g., such that only the unknown values can vary).

The system can test each of the matrix patterns $M(k, l, z)$ against the image pixels to see if it is below the error threshold, according to the sampling matrix that relates each element $m(k, l, z, i, j)$ to the pixel grid.

Let the eight (8) directions from any module $(k, l)$ be donated by a row offset $d_r$ ranging from −1 to 1, and column offset $d_c$ ranging from −1 to 1 ($d_r$ and $d_c$ cannot both be 0, otherwise it would not be a direction from the module $(k, l)$).

In other words, the eight directions are $(d_r, d_c)=(0,1), (0,-1), (1,0), (-1,0), (1,1), (1,-1), (-1,1),$ and $(-1,-1)$.

For each pattern $M(k, l, z)$ that is below the error threshold, we establish a node $N(k, l, z)$.

We can then establish edges in an undirected graph that link nodes together. For any pair of nodes $N(k, l, z_1)$ and $N(k+d_r, l+d_c, z2)$, where $(k+d_r, l+d_c)$ is a neighboring module in one of 8 possible directions from module $(k, l)$; $z_1$ ranges from 1 to $u(k, l)$; and $z_2$ ranges from 1 to $u(k+d_r, l+d_c)$, then a link $L(k, l, z_1, k+d_r, l+d_c, z_2)$ is established only if the overlapping sub-patterns are the same. That is, where for all $i=i_{min}$ to $i_{max}$, and all $j=j_{min}$ to $j_{max}$, $m(k, l, z_1, i, j)=m(k+d_r, l+d_c, z_2, i-d_r, j-d_c)$, where $i_{min}, i_{max}, j_{min}, j_{max}$, are determined based on the direction:

$i_{min}=-1$ if $d_r<=0$, and 0 otherwise
$i_{max}=1$ if $d_r>=0$, and 0 otherwise
$j_{min}=-1$ if $d_c<=0$, and 0 otherwise
$j_{max}=1$ if $d_c>=0$, and 0 otherwise For $d_r=0$, the overlap region is 3×2, for $d_c=0$ the overlap region is 2×3, and for diagonal directions the overlap region is 2×2.

Any node that fails to make a link to at least one other node in each of all eight directions is be removed from further consideration. As nodes are removed, so are their respective links, which in turn cause more nodes without links to each of the eight directions to be removed, and so on. This removal process can result in only a single node remaining for each module $(l, k)$, at which point all module values are therefore known. However, even if there is still a single node remaining at one or modules, there may still be only a single choice at each module that results in 8-connected neighbors at each module. In such circumstances, an additional search can be performed to determine such nodes (e.g. via a brute force search through all the remaining combinations).

Figure 32:
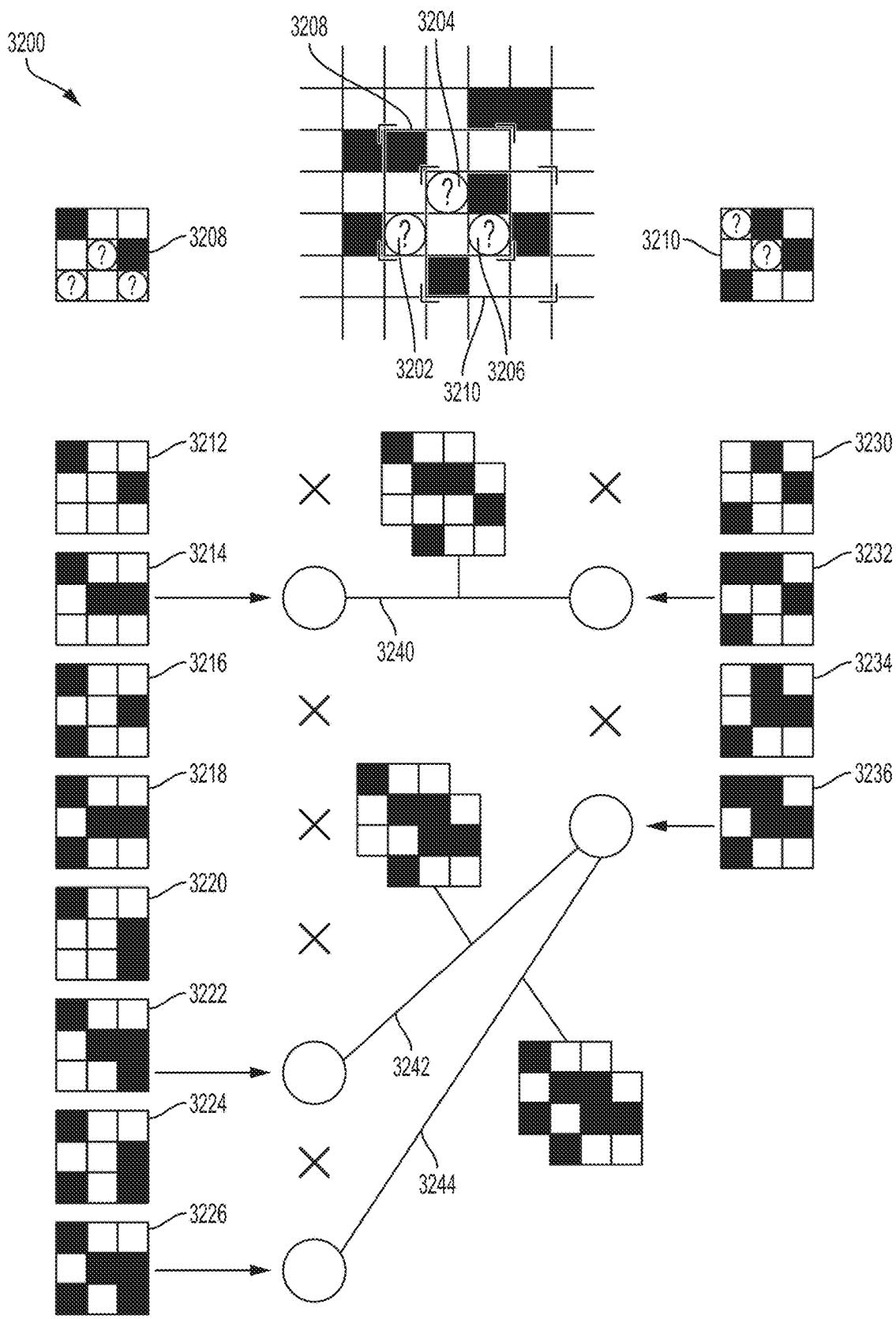
FIG. 32 shows an example of a non-directed constraint graph, according to some embodiments.

FIG. 32 shows an example of a non-directed constraint graph, according to some embodiments. The portion of the module grid 3200 includes a number of deduced modules and three remaining modules left to be deduced, shown as modules 3202, 3204 and 3206. The box 3208 highlights the centrally surrounding modules in the portion of the module grid 3200, and box 3210 highlights the southeast neighboring modules in the portion of the module grid 3200. Since the centrally surrounding modules have three unknown modules, there are eight possible remaining combinations. In particular, the possible combinations for the centrally located modules are shown as possible combination 3212 (all three unknown modules are white modules), possible combination 3214 (unknown module 3204 is black, while unknown modules 3202 and 3206 are white), possible combination 3216 (unknown module 3202 is black, and unknown modules 3204 and 3206 are white), possible combination 3218 (unknown modules 3202 and 3204 are black, and unknown module 3206 is white), possible combination 3220 (unknown modules 3202 and 3204 are white, and unknown module 3206 is black), possible combination 3222 (unknown module 3202 is white and unknown modules 3204 and 3206 are black), possible combination 3224 (unknown modules 3202 and 3206 are black, and unknown module 3204 is white), and possible combination 3226 (all three unknown modules are black). Since the southeast modules only have two unknown modules, there are four possible remaining combinations. The possible combinations for the southeast located modules are shown as possible combination 3230 (both modules white), possible combination 3232 (unknown module 3204 black, unknown module 3206 white), possible combination 3234 (unknown module 3204 white, unknown module 3206 black), and possible combination 3236 (both unknown modules black).

In this example, the image processing device performs error testing for the remaining combinations for each set of modules, which removes possible combinations 3212, 3216, 3218, 3224, and 3234. Since possible combination 3220 does not have a possible match to the remaining combinations for the southeast modules (to possible combinations 3232 or 3236), the image processing device removes possible combination 3220 from consideration. After such processing, a first possible match 3240 exists between possible combination 3214 and possible combination 3232, a second possible match 3242 exists between possible combination 3222 and possible combination 3236, and a third possible match 3244 exists between possible combination 3226 and possible combination 3236.

At step 2012, the image processing device decodes the symbol based on the determined module values, including those determined in steps 2004-2010. At this point, it is possible that all of the modules will have been determined, but it is also likely (e.g., in low resolution images) that some module values are still unknown. For example, the undetermined modules may be associated with pixels in uniform gray areas, such as where pixels that straddle modules flip back-and-forth between black and white values. However, the image processing device can still likely decode the symbol even without all modules being complete. For example, most 2D symbols are encoded with some degree of redundancy, such as by using Reed-Solomon error correction, and/or other error correction. As another example, unknown modules are often afforded a higher error rate (e.g., twice the error rate) as incorrectly determined modules. Therefore, at step 2012, the image processing device can have a sufficient number of modules decoded, even if not all modules, to decode the symbol.

FIGS. 26-31 are used as illustrative examples of applying the techniques discussed herein to decode a multi-width 1D barcode (e.g., such as the 1D barcode shown in FIG. 2). FIG. 26 shows an exemplary 1D image 2600 of a multi-width 1D symbol, according to some embodiments. The 1D image 2600 can be captured in a similar manner as described above, by sampling along a scan line through a 2D image that has been acquired as discussed above for image 2100 in FIG. 21. Like image 2100, image 2600 includes a set of pixels (e.g., pixels 2602, 2604) with associated pixel values that indicate the darkness of each pixel. While pixels 2602, 2604 are referred to as pixels (e.g., as extracted using a laser scanner), in some embodiments each pixel may be a sample as discussed above. In such embodiments, the image 2600 is processed to compute the samples. As also discussed herein and further below, the envelope of the image signal can be used to decode 1D barcodes.

Figure 27:
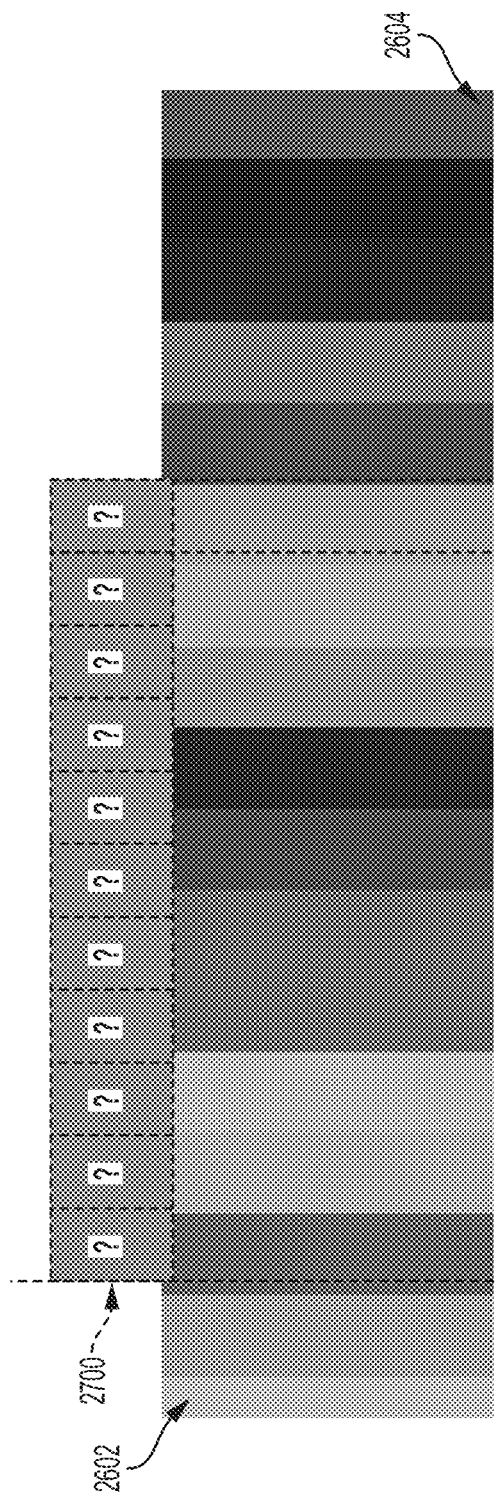
FIG. 27 shows an exemplary module grid for a multi-width 1D symbol overlaid on top of the image from FIG. 26, according to some embodiments.
Figure 28:
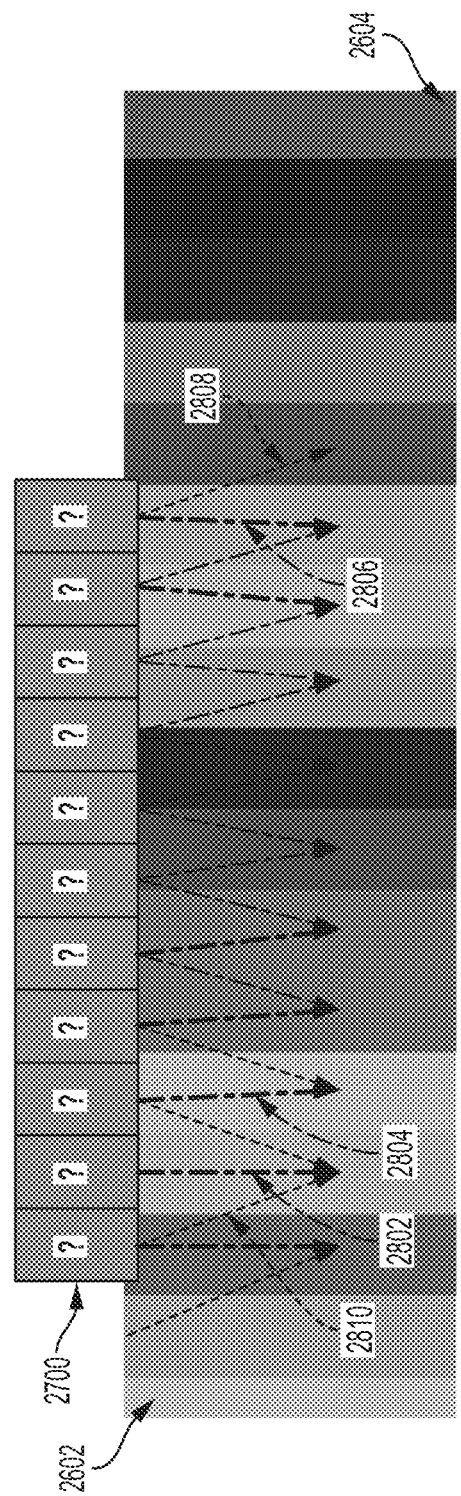
FIG. 28 is an exemplary illustration of the degree of overlap between modules of the module grid and pixels of the image, according to some embodiments.

The method 2000 described in FIG. 20 can be used to decode a multi-width 1D symbol. FIG. 27 shows an exemplary module grid 2700 for a multi-width 1D symbol overlaid on top of the image 2600 from FIG. 26, according to some embodiments. Referring to step 2004, similar to with a 2D barcode, the system determines a spatial mapping between the modules in the module grid 2700 to the pixels of the image 2600. For example, the module grid 2700 may need to be shifted and/or scaled to map to the pixels of image 2700. The relationship between the module grid 2700 and the pixel grid of the image 2600 can reflect how each module influences each of the pixels. FIG. 28 is an exemplary illustration of the degree of overlap between modules of the module grid 2700 and pixels of the image 2600, according to some embodiments. A thicker, solid arrow (e.g., arrows 2802, 2804 and 2806) indicate a large degree of overlap, whereas a thinner, dotted arrow (e.g., arrows 2808, 2810) indicate a small degree of overlap. As discussed herein, the description above provides a technique for locating a 1D grid (e.g., the one-dimensional pixel grid 2700) relative to a 1D signal of samples (e.g., a one-dimensional image (or single row) of pixels in image 2600).

Figure 29:
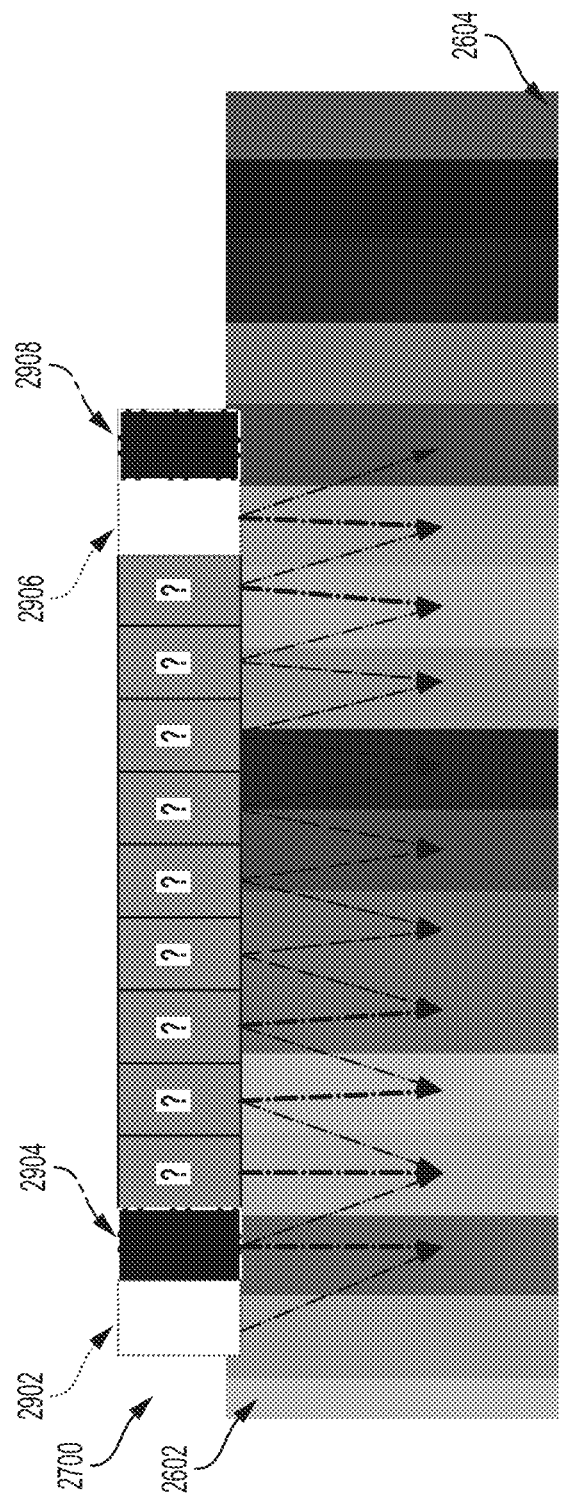
FIG. 29 shows an example of deducing modules of the module grid for arbitrary module patterns, according to some embodiments.

The techniques can include first locating the module grid of the symbol with respect to the pixel grid of the image. As discussed above, an arbitrary module pattern can be deduced without needing to separately examine individual characters. In the case of 1D symbols, the grid can be located, for example, using arbitrary module patterns, such as the delimiter characters (e.g. the left-most and right-most characters of the 1D symbol) and/or known aspects of characters (e.g., ending and/or beginning bars or spaces of characters). FIG. 29 shows an example of deducing modules of the module grid 2700 for arbitrary module patterns, according to some embodiments. Modules 2902 and 2906 are deduced as spaces (white modules), and modules 2904 and 2908 are deduced as bars (black modules). For example, for a code128 symbol, the character begins with a bar (e.g., bar 2904) and ends with a space (e.g., space 2906), and the previous character ends with a space (e.g., space 2902), and the next character begins with a bar (e.g., bar 2908).

Figure 30A:
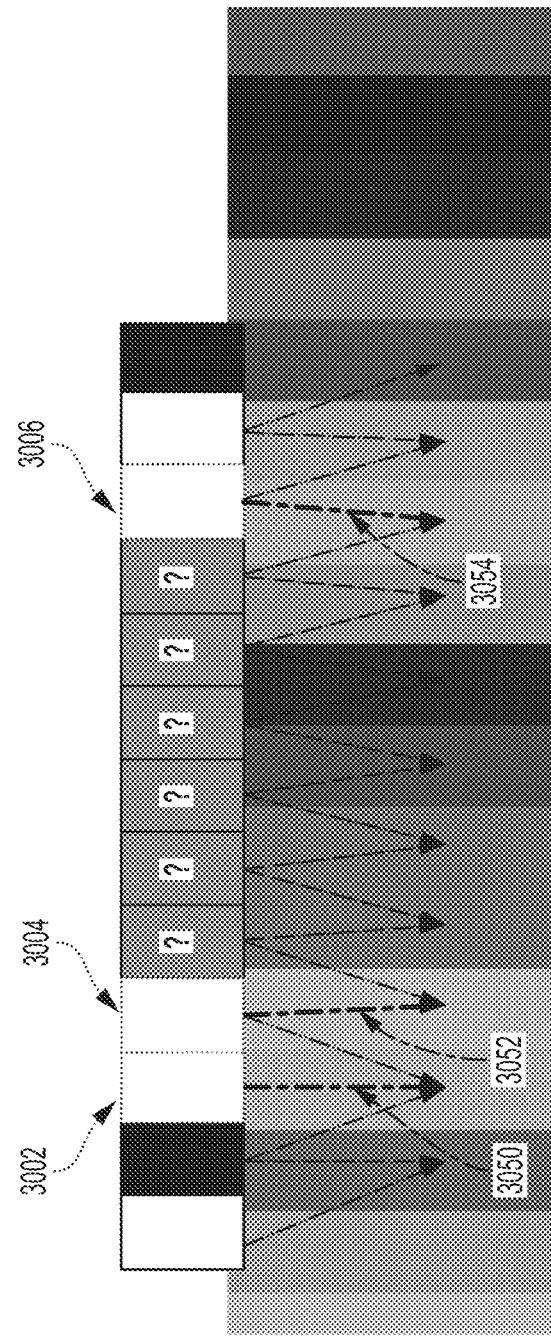
FIG. 30A shows modules of the exemplary module grid deduced based on relationships between the modules and the pixels, according to some embodiments.

FIGS. 30A and 30B show modules of the exemplary module grid 2700 deduced based on relationships between the modules and the pixels, according to some embodiments. Referring to step 2006 in FIG. 20, the image processing device can use the causal relationships determined between the modules in the module grid and the pixels in the image to deduce a first set of modules (e.g., modules that have a high degree of overlap with associated pixels), similar to how this step is performed for 2D barcodes. The deductions shown in FIG. 30A include additional deduced white modules 3002, 3004 and 3006 (e.g., in addition to the arbitrary module pattern(s) deduced in conjunction with step 2004), and FIG. 30B includes additional deduced black modules 3008 and 3010. For example, as discussed in conjunction with 2D barcodes, the image processing device can populate each module that overlaps to a very high degree (e.g., 90%, 30%, etc.), such as modules where the sampling coefficients are above an overlap threshold. FIG. 30A indicates the overlap with arrows 3050, 3052, and 3054, for example. As noted above, the techniques can use logic to exploit the fact that it is unlikely for the module to have one value and the pixel it overlaps substantially to have a value corresponding to the opposite extreme. Therefore, modules that overlap a foreground (darkest) pixel to a certain degree can be set to black (e.g., modules 3008, 3010), and modules that overlap a background (lightest) pixel to a certain degree can be set to white (e.g., modules 3002, 3004 and 3006). As discussed above, when referring to a pixel as being either "white" or "black," the measure of whether a pixel is black or white can be determined relevant to the signal envelope of the image (e.g., such that the signal envelope of the image can be used to normalize the range of white and black pixels to determine the range of a particular pixel for the signal envelope).

FIG. 31 shows additional modules in the module grid 2700 determined based on known modules, according to some embodiments. The techniques can decode a second set of modules leveraging the first set of modules decoded in the previous step. Referring to steps 2008 and 2010 in FIG. 20, once no further module values can be deduced (e.g., as discussed above in conjunction with steps 2004 and 2006), the image processing device can test a set of valid combinations of values to determine further unknown modules. In some embodiments, now that a current set of pixels has been determined, the search space for the remaining modules has been reduced. The image processing device can determine (e.g., iteratively) the now smaller set of remaining unknown modules. As shown in FIG. 31, modules 3102, 3104, 3106 are deduced in this step. In this example, and as discussed further below in general, logic can be used to determine the remaining modules. For example, modules 3102, 3104, and 3106 in this example alternate in order to produce the uniform gray values of the associated pixels 3150 and 3152. Module 3106 is white (a space) in order to produce the associated uniform gray pixel value 3154 together with the neighboring black module 3008. Module 3108 is a space in order to produce the associated light gray pixel value 3156.

In some embodiments, for each module, the image processing device can try remaining valid combinations of module patterns (e.g., 1×2, 1×3 and/or the like) that include one or more determined pixels. For example, the image processing device can try 1×3 module patterns having the unknown module as the center, until no such more deductions can be made. Using a 1×3 pattern as an example, each module would have $2^3=8$ possibilities. Additionally, the number of possibilities can be reduced since known modules will reduce the number of possibilities, as discussed above for 2D barcodes.

As noted above, even with many of the modules having been determined in previous steps, recursively testing all of the possibilities may still be very time-consuming and/or may not work well. In some embodiments, a sampling matrix can be used to determine additional modules. For example, for each pixel that is overlapped by a module which hasn't yet been determined, a 1×3 sampling matrix can be used to determine the module value. The system can multiply the 1×3 sampling matrix by an unknown vector of the 3 nearest binary (0 or 1) module values to determine the module value. As discussed above, for each possible combination of binary values, an error can be computed between the actual pixel value and the one that results when multiplying through the sampling coefficients. Any of the combinations that result in a pixel value error that is within an acceptable error threshold can be considered as possible solutions, while those resulting in errors above the error threshold are eliminated from consideration. If there is only one pattern below the error threshold, then the unknown module values of the combination can be set accordingly. Otherwise, possible solutions can be recorded as three-bit integers.

As discussed above, in some embodiments, the system can be configured to process certain pixels first (e.g., to lead to a more likely chance to decode module values). For example, the system can be configured to first process pixels with a large number of overlapping modules have already been determined. For example, the system can be configured to focus on first processing pixels around the outside of the symbol (e.g., near the delimiter characters and/or beginning/ending modules of characters, for which the modules will have been determined as discussed above). Using such a technique, with each iteration, the values for the modules will be determined closer and closer to the inside of the symbol and/or inwards towards otherwise large spaces of unknown modules.

After all of the pixels within the region of the grid have been considered and their three-bit integers recorded, additional modules can be determined through process of elimination. For example, the system can examine the consistency of the remaining possible combinations of each pixel against the remaining possible combinations of each of the neighbors associated with the module. For example, the system can examine the consistency of the 2 neighbors for a particular module, taking advantage of the fact that the 1×3 module patterns for a pixel overlap substantially with those if its 2 neighbors. In effect, the system can use the fact that each possible combination for a particular pixel is only compatible with certain combinations for the neighboring pixels to determine the correct combination.

As discussed above in the 2D context, in some embodiments a comparison of a module to its neighboring modules can be used to generate a non-directed constraint graph. The three-bit integers representing the stored combinations of binary values for the three modules of the 1×3 module pattern for each module can be populated as the nodes of the graph, and the linkages to each of the consistent three-bit integers for neighbors can be the edges in the graph. Two nodes are considered consistent if the region of overlap between their respective 1×3 module patterns in the module grid have the same combination of binary values. Determining the remaining modules can therefore include determining a consistent and unique set of edges between each pixel and its two neighboring pixels, such that only a single node is connected at each pixel, with the other nodes and their edges having been removed. The system can use the chosen node for a pixel to determine the correct combination of overlapping module values. The system may be able to remove certain nodes in the graph, as well as their associated edges, as discussed above.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A computerized method for decoding a symbol in a digital image, the method comprising:
   receiving a digital image of a portion of a symbol, the digital image comprising a grid of pixels, and the symbol comprising a grid of modules;
   determining a spatial mapping between a contiguous subset of modules in the grid of modules to the grid of pixels;
   determining a first set of values for a first set of modules in the contiguous subset of modules using the spatial mapping based in part on: (i) a degree of overlap between each of the first set of modules and respective pixels in the grid of pixels, and/or (ii) a pre-determined value for an adjacent module overlapping a respective pixel mapped to at least one of the first set of modules;
   determining, using the spatial mapping, causal relationships between each module in the contiguous subset of modules and the grid of pixels, each causal relationship representing the degree of influence the value of a module has on each of the values of a subset of pixels in the grid of pixels;
   determining a set of valid combinations of values of two or more neighboring modules in the contiguous subset of modules, wherein each valid combination of values of the set of valid combinations comprises:
      a first value from the determined first set of values for a first module of the two or more neighboring modules, wherein the first module is from the first set of modules; and
      a first valid value for a second module of the two or more neighboring modules, wherein the first valid value is different than a second valid value for the second module when included in a different valid combination of values of the set of valid combinations of values;
   testing the set of valid combinations of values of the two or more neighboring modules in the contiguous subset of modules against the grid of pixels using the causal relationships;
   determining a final value of the second module of the two or more neighboring modules based on the tested set of valid combinations; and
   decoding the symbol based on the determined value of the at least one module.

2. The method of claim 1, wherein the two or more neighboring modules in the contiguous subset of modules in the grid of modules comprises a three-by-three sub-grid of the grid of modules.

3. The method of claim 2, wherein the second module of the two or more neighboring modules is a center module of the three-by-three sub-grid.

4. The method of claim 1, wherein the adjacent module is a module within a finder or timing pattern of the symbol.

5. The method of claim 1, wherein the pre-determined value for the adjacent module is deduced based solely upon the value of a single pixel in the grid of pixels, due to the single pixel having a dominant causal relationship with the adjacent module, as compared to the causal relationships between the other pixels in the subset of pixels and the adjacent module.

6. The method of claim 1, wherein determining the causal relationships comprises identifying using the spatial mapping a degree to which each module in the contiguous subset of modules overlaps each pixel in the grid of pixels to generate a set of degrees of overlap.

7. The method of claim 6, wherein the degree to which each module in the contiguous subset of modules overlaps with each pixel in the grid of pixels is represented by a set of sampling coefficients, and as part of a sampling matrix.

8. The method of claim 1, wherein the grid of pixels and the grid of modules are both two-dimensional.

9. The method of claim 1, wherein the grid of pixels is a one-dimensional grid of samples from a one-dimensional scan through a two-dimensional image, and the grid of modules is a one-dimensional grid of modules.

10. The method of claim 1, wherein the symbol is selected from the group consisting of a one dimensional (1D) barcode and a two dimensional (2D) barcode.

11. An apparatus for decoding a symbol in a digital image, the apparatus comprising a processor in communication with memory, the processor being configured to execute instructions stored in the memory that cause the processor to:

receive a digital image of a portion of a symbol, the digital image comprising a grid of pixels, and the symbol comprising a grid of modules;

determine a spatial mapping between a contiguous subset of modules in the grid of modules to the grid of pixels;

determine a first set of values for a first set of modules in the contiguous subset of modules using the spatial mapping based in part on: (i) a degree of overlap between each of the first set of modules and respective pixels in the grid of pixels, and/or (ii) a pre-determined value for an adjacent module overlapping a respective pixel mapped to at least one of the first set of modules;

determine, using the spatial mapping, causal relationships between each module in the contiguous subset of modules and the grid of pixels, each causal relationship representing the degree of influence the value of a module has on each of the values of a subset of pixels in the grid of pixels;

determine a set of valid combinations of values of two or more neighboring modules in the contiguous subset of modules, wherein each valid combination of values of the set of valid combinations comprises:

a first value from the determined first set of values for a first module of the two or more neighboring modules, wherein the first module is from the first set of modules; and a first valid value for a second module of the two or more neighboring modules, wherein the first valid value is different than a second valid value for the second module when included in a different valid combination of values of the set of valid combinations of values;

test the set of valid combinations of values of the two or more neighboring modules in the contiguous subset of modules against the grid of pixels using the causal relationships;

determine a final value of the second module of the two or more neighboring modules based on the tested set of valid combinations; and decode the symbol based on the determined value of the at least one module.

12. The apparatus of claim 11, wherein the two or more neighboring modules in the contiguous subset of modules in the grid of modules comprises a three-by-three sub-grid of the grid of modules.

13. The apparatus of claim 11, wherein determining the causal relationships comprises identifying using the spatial mapping a degree to which each module in the contiguous subset of modules overlaps each pixel in the grid of pixels to generate a set of degrees of overlap.

14. The apparatus of claim 11, wherein the grid of pixels and the grid of modules are both two-dimensional.

15. The apparatus of claim 11, wherein the grid of pixels is a one-dimensional grid of samples from a one-dimensional scan through a two-dimensional image, and the grid of modules is a one-dimensional grid of modules.

16. The apparatus of claim 11, wherein the symbol is selected from the group consisting of a one dimensional (1D) barcode and a two dimensional (2D) barcode.

17. At least one non-transitory computer-readable storage medium storing processor-executable instructions that, when executed by at least one computer hardware processor, cause the at least one computer hardware processor to perform the acts of:

receiving a digital image of a portion of a symbol, the digital image comprising a grid of pixels, and the symbol comprising a grid of modules;

determining a spatial mapping between a contiguous subset of modules in the grid of modules to the grid of pixels;

determining a first set of values for a first set of modules in the contiguous subset of modules using the spatial mapping based in part on: (i) a degree of overlap between each of the first set of modules and respective pixels in the grid of pixels, and/or (ii) a pre-determined value for an adjacent module overlapping a respective pixel mapped to at least one of the first set of modules;

determining, using the spatial mapping, causal relationships between each module in the contiguous subset of modules and the grid of pixels, each causal relationship representing the degree of influence the value of a module has on each of the values of a subset of pixels in the grid of pixels;

determining a set of valid combinations of values of two or more neighboring modules in the contiguous subset of modules, wherein each valid combination of values of the set of valid combinations comprises:

a first value from the determined first set of values for a first module of the two or more neighboring modules, wherein the first module is from the first set of modules; and a first valid value for a second module of the two or more neighboring modules, wherein the first valid value is different than a second valid value for the second module when included in a different valid combination of values of the set of valid combinations of values;

testing the set of valid combinations of values of the two or more neighboring modules in the contiguous subset of modules against the grid of pixels using the causal relationships;

determining a final value of the second module of the two or more neighboring modules based on the tested set of valid combinations; and decoding the symbol based on the determined value of the at least one module.

* * * * *

UNITED STATES PATENT AND TRADEMARK OFFICE
CERTIFICATE OF CORRECTION

PATENT NO. : 10,599,902 B2
APPLICATION NO. : 16/198203
DATED : March 24, 2020
INVENTOR(S) : Ivan Bachelder et al.

Page 1 of 1

It is certified that error appears in the above-identified patent and that said Letters Patent is hereby corrected as shown below:

In the Claims

Column 46, Claim 1, Line 31 should read:
the second module.

Column 47, Claim 11, Line 44 should read:
the second module.

Column 48, Claim 17, Line 54 should read:
the second module.

Signed and Sealed this
Fourteenth Day of July, 2020

Andrei Iancu
*Director of the United States Patent and Trademark Office*